(12) United States Patent
Hoshida et al.

(10) Patent No.: US 7,233,742 B2
(45) Date of Patent: Jun. 19, 2007

(54) OPTICAL COMMUNICATION SYSTEM, METHOD FOR SUPPLYING PUMP LIGHT, AND DISTRIBUTED RAMAN AMPLIFYING APPARATUS

(75) Inventors: Takeshi Hoshida, Richardson, TX (US); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 877 days.

(21) Appl. No.: 10/021,079

(22) Filed: Dec. 19, 2001

(65) Prior Publication Data
US 2002/0044324 A1  Apr. 18, 2002

Related U.S. Application Data

(63) Continuation of application No. PCT/JP00/05750, filed on Aug. 25, 2000.

(51) Int. Cl.
*H04J 14/02*  (2006.01)
(52) U.S. Cl. ............... 398/79; 398/92; 398/97
(58) Field of Classification Search ........... 398/34, 398/62, 64, 68, 79, 82, 92, 97, 157
See application file for complete search history.

(56) References Cited

U.S. PATENT DOCUMENTS

| | | | |
|---|---|---|---|
| 4,401,364 A | 8/1983 | Mochizuki | |
| 4,616,898 A | 10/1986 | Hicks, Jr. | |
| 4,805,977 A | 2/1989 | Tamura et al. | |
| 6,233,091 B1 * | 5/2001 | Kosaka et al. | 359/341.1 |
| 6,263,139 B1 * | 7/2001 | Kawakami et al. | 385/123 |
| 6,292,288 B1 * | 9/2001 | Akasaka et al. | 359/334 |
| 6,344,922 B1 * | 2/2002 | Grubb et al. | 359/334 |
| 6,423,963 B1 * | 7/2002 | Wu | 250/227.14 |
| 6,445,492 B1 * | 9/2002 | Nielsen et al. | 359/334 |

(Continued)

FOREIGN PATENT DOCUMENTS

EP  1 018 666 A1  7/2000

(Continued)

OTHER PUBLICATIONS

Karsten Rottwitt, et al., "Transparent 80 km Bi-Directionally Pumped Distributed Raman Amplifier with Second Order Pumping", pp. II-144-145, ECOC '99, Sep. 26-30, 1999, Nice, France.

(Continued)

*Primary Examiner*—Dzung Tran
(74) *Attorney, Agent, or Firm*—Staas & Halsey LLP

(57) ABSTRACT

An optical communication system according to the invention comprises: a transmitting station 11; an optical transmission line 12 for transmitting an optical signal sent from the transmitting station 11; a receiving station 13 for receiving the optical signal outputted from the optical transmission line 12; a repeater station 14 provided at one point or more in the optical transmission line 12; and pump light sources 21 provided in at least two of the stations 11, 13, 14, for supplying pump light to the optical transmission line 12, wherein the pump light has two types or more of wavelength. It is possible to obtain a substantially flat gain as a function of wavelength in the whole optical communication system since the pump lights with different wavelengths are supplied from a plurality of points in the optical transmission line 12 and an optical signal is amplified with various Raman gain coefficients.

27 Claims, 24 Drawing Sheets

U.S. PATENT DOCUMENTS 6,501,593 B2    12/2002   Akasaka et al. ....... 359/341.31
6,611,368 B1 *   8/2003   Grant et al. ................ 359/334

FOREIGN PATENT DOCUMENTS

| JP | 4-324335 | 11/1992 |
| JP | 5-291667 | 11/1993 |
| JP | 7-240717 | 9/1995 |
| JP | 2000-98433 | 4/2000 |
| WO | WO00/05622 | 2/2000 |

OTHER PUBLICATIONS

"Progress in Wavelength Braodbands and Optical Amplifier", Japanese Journal of Optics, vol. 29, No. 3, pp. 136-198, Mar. 10, 2000.

* cited by examiner

| Pump light numbers | Pump light wavelenghts |
|---|---|
| 1 | $\lambda_1$ |
| 2 | $\lambda_2$ |
| 3 | $\lambda_3$ |
| 4 | $\lambda_4$ |
| 5 | $\lambda_5$ |
| 6 | $\lambda_6$ |
| 7 | $\lambda_7$ |
| 8 | $\lambda_8$ |

(b)

| Pump light numbers | Pump light wavelenghts |
|---|---|
| 1 | $\lambda_7$ |
| 2 | $\lambda_2$ |
| 3 | $\lambda_5$ |
| 4 | $\lambda_6$ |
| 5 | $\lambda_4$ |
| 6 | $\lambda_3$ |
| 7 | $\lambda_8$ |
| 8 | $\lambda_1$ |

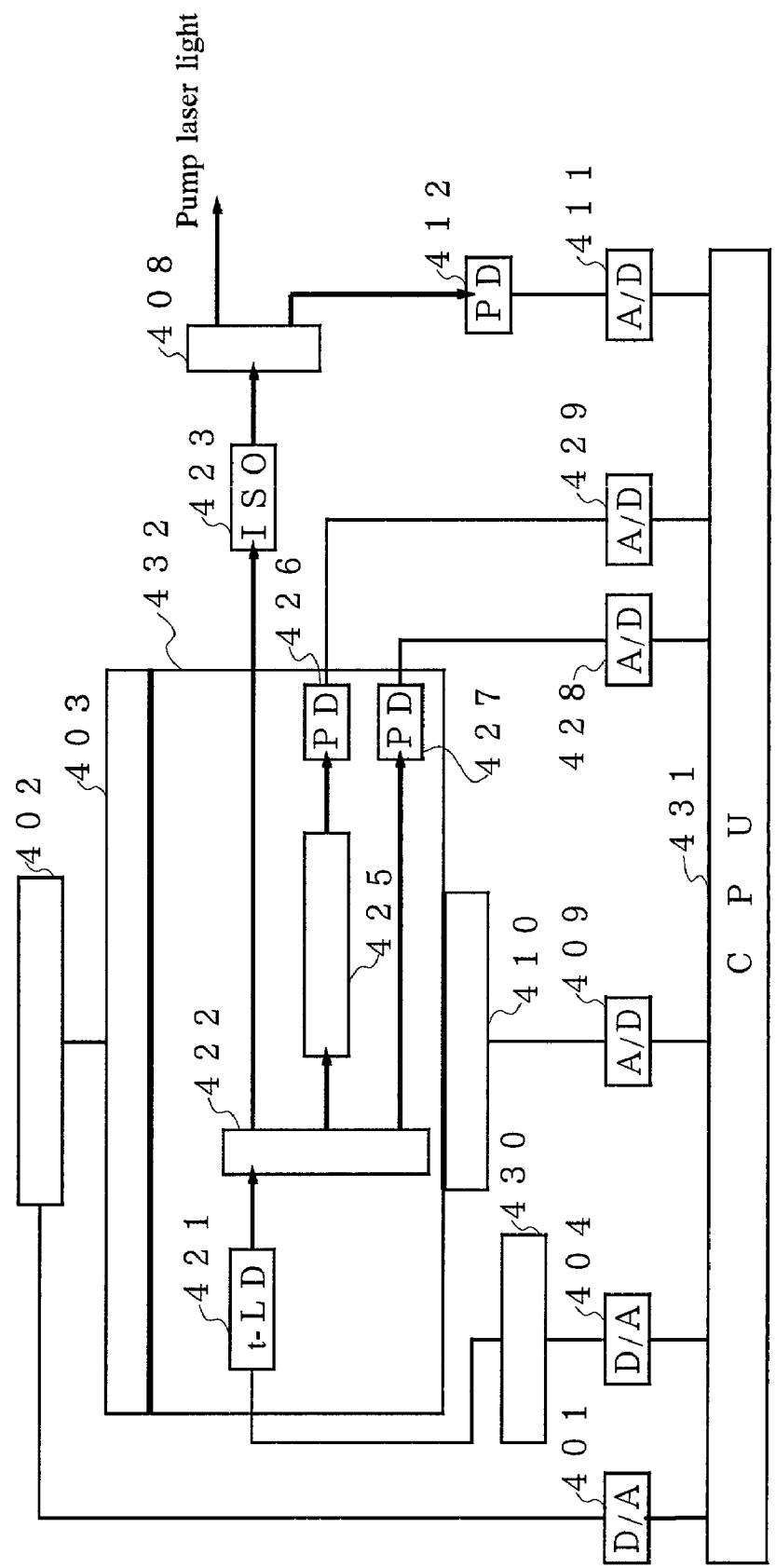

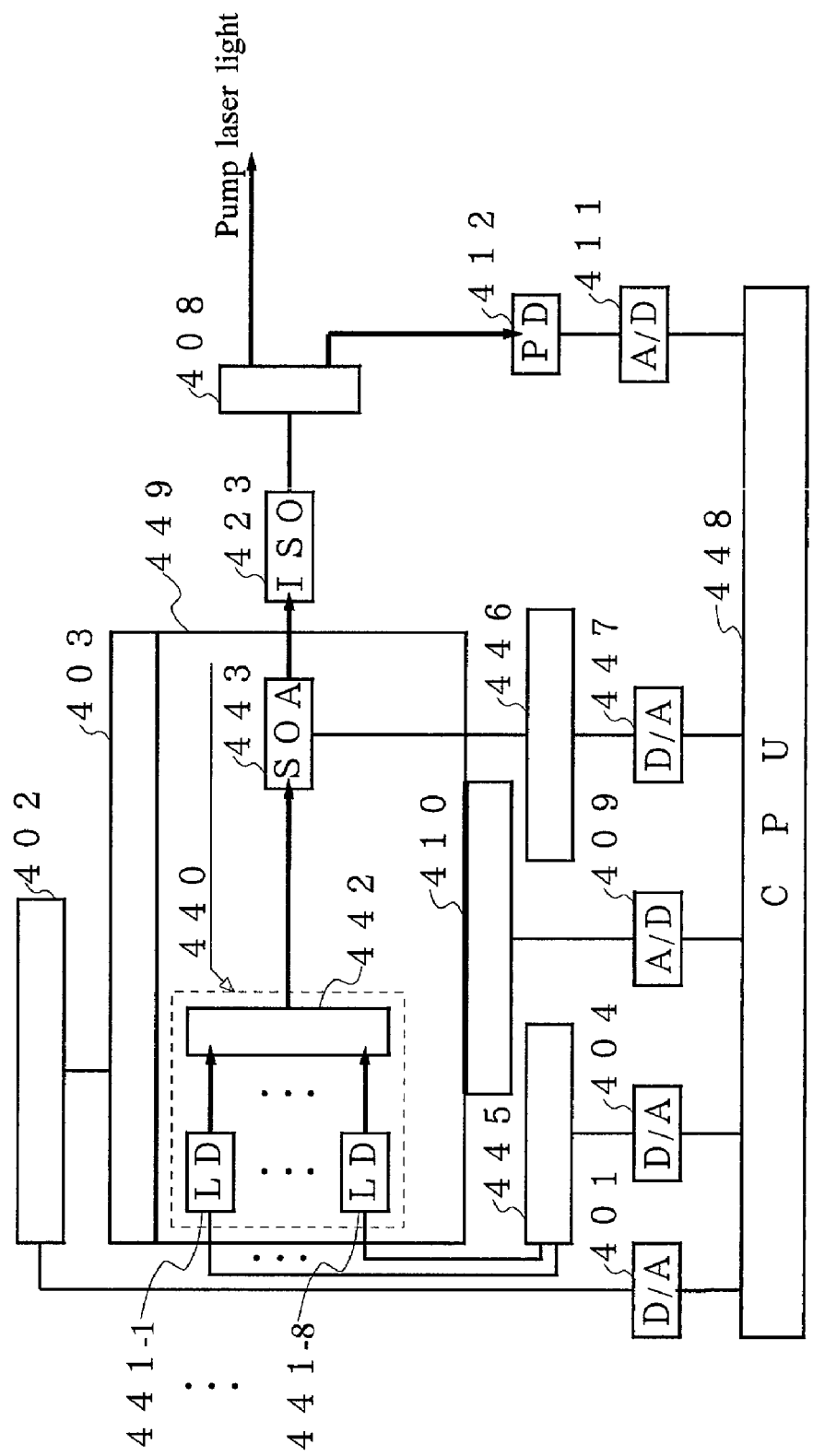

OPTICAL COMMUNICATION SYSTEM, METHOD FOR SUPPLYING PUMP LIGHT, AND DISTRIBUTED RAMAN AMPLIFYING APPARATUS

CROSS REFERENCE TO RELATED APPLICATION

This application is a continuation application of International Application PCT/JP00/05750, Filed Aug. 25, 2000, and designating the U.S.

BACKGROUND OF THE INVENTION

1. Field of the Invention

This invention relates to an optical communication system, a pump light supplying method and a distributed Raman amplifying apparatus which supply pump light in such a manner to secure flatness of gain as a function of wavelength, safety of an operator and avoidance of optical damage, in the optical communication system where Raman amplification is performed in an optical transmission line.

2. Description of the Related Art

Recently, with the objective of constructing a future multimedia network, optical communication apparatus with ultra-long distance and large capacity is required. Research and development on wavelength-division multiplexing (hereinafter abbreviated to "WDM") is carried on in order to realize the large capacity, because it has the advantages of utilizing efficiently the properties of broadband/large-capacity of an optical fiber and the like.

Especially in an ultra-long distance optical communication system, the WDM optical signal needs to be amplified since the WDM optical signal is attenuated while transmitting in the ultra-long distance.

A conventional optical communication system includes a transmitting station in which the WDM optical signal is generated by multiplexing/demultiplexing a plurality of optical signals with different wavelengths from each other, an optical communication line which transmits the WDM optical signal sent out from the transmitting station, and a receiving station which receives the transmitted WDM optical signal, and further, one or more repeater station which has a function of amplifying the WDM optical signal is provided at some midpoint in the optical transmission line, as necessary.

In the optical communication system like the above, waveforms of the respective optical signals are equalized due to nonlinear optical effect in the optical transmission line. In order to avoid the waveform equalization, it is effective to reduce optical power (optical intensity) of the WDM optical signal which is made incident on the optical transmission line. Meanwhile, when the optical power is reduced, an optical signal-to-noise ratio becomes worse. As the nonlinear optical effects, for example, self-phase modulation, cross-phase modulation, four-wave mixing, stimulated Raman scattering (hereinafter abbreviated to "SRS"), stimulated Brillouin scattering (hereinafter abbreviated to "SBS") and the like are known.

For this reason, it is proposed using a distributed optical amplifying apparatus which uses the optical transmission line also as an optical amplifying medium, together with a concentrated optical amplifying apparatus which is provided in the repeater station. For example, effectiveness of the Raman amplification is reported in P. B. Hansen, A. Stentz, T. N. Nielsen, R. Espinodola, L. E. Nelson, A. A. Abramov, uDense wavelength-division multiplexed transmission in "zero-dispersion" DSF by means of hybrid Raman/erubium-doped fiber amplifier" (OFC/100C '99), PD8, 1999, and N. Takachio, H. Suzuki, H. Masuda, and M. Koga, "32*10 Gb/s distributed Raman amplification transmission with 50-GHz channel spacing in the zero-dispersion region over 640 km of 1.55-μm dispersion-shifted fiber" (OFC/100C '99), PD9, 1999.

Moreover, in the Official Gazette of the Japanese Unexamined Patent Application No. Hei 03-013836, a method for Raman amplification is disclosed, in which test light is made incident on an optical transmission line and backward scattering is detected to obtain its loss in the optical transmission line, thereby performing the Raman amplification.

In the Official Gazette of the Japanese Unexamined Patent Application Publication No. Hei 10-073852, Raman amplification which broaden a wavelength band by using a plurality of pump lights with different wavelengths is disclosed.

Further, in the Official Gazette of the Japanese Unexamined Patent Application Publication No. Hei 10-022931, it is disclosed that a pump light source for Raman amplification is provided in a repeater station.

It should be mentioned that the optical amplifying apparatus can be classified into the concentrated optical amplifying apparatus and the distributed optical amplifying apparatus. The concentrated amplifying apparatus is an optical amplifying apparatus in which the optical amplifying medium and the pump light source are provided in a concentrated manner at one spot. For example, a laser diode amplifier and an optical fiber amplifier in which an optical fiber as the optical amplifying medium is wound around a bobbin or the like are well known. Meanwhile, the distributed optical amplifying apparatus is an optical amplifying apparatus in which the optical amplifying medium is laid over a fixed distance and the pump light source is provided at one side or both sides thereof. For example, there is an optical fiber amplifying apparatus. As the optical fiber amplifying apparatus, there are an optical fiber amplifier added with a rare earth element, an optical fiber amplifier using nonlinear scattering in the optical fiber and the like.

Physical process of amplifying the light is the same between the concentrated optical amplifying apparatus and the distributed optical amplifying apparatus, and the main difference is whether the optical amplifying medium is put together at one spot or distributed over the fixed distance. Further, the distributed optical amplifying apparatus has a characteristic that its optical amplifying medium also functions as the optical transmission line between the stations for transmitting the optical signals.

Moreover, as the nonlinear scattering, the SRS, the SBS and the like are known.

The SRS is a scattering occurring by an interaction with optical phonon of lattice vibration, which has a wide gain width and a large frequency shift. The SBS is a scattering occurring by an interaction with acoustic phonon of the lattice vibration, which has the narrower gain width and the smaller frequency shift than the SRS, but its gain coefficient is larger by more than two digits.

Characteristics of the optical fiber amplifier using the nonlinear scattering are that the common optical fiber such as an NZ-DSF and an SMF can be used, that a pump wavelength can be set to any amplification wavelengths, that the gain agrees with a polarization direction of the pump light, and so on. As the common optical fibers, for example, there are a dispersion-shifted optical fiber, a non-zero dispersion-shifted optical fiber (hereinafter abbreviated to "NZ- DSF"), a dispersion flat optical fiber, a single-mode optical fiber (hereinafter abbreviated to "SMF") and the like.

It should be noted that all the above Official Gazettes disclose the Raman amplification, but do not specifically disclose how to control the pump light used for the Raman amplification. When it is disclosed, a complicated circuit is needed for the control.

Therefore, it is an object of the present invention to provide an optical communication system, a method for supplying pump light, and a distributed Raman amplifying apparatus in which the Raman amplification with substantially flat gain as a function of wavelength can be realized.

It is another object of the present invention to provide the optical communication system, the method for supplying pump light, and the distributed Raman amplifying apparatus which are preferable for securing the safety of operators who work with the optical communication system.

It is still another object of the present invention to provide the optical communication system, the method for supplying pump light, and the distributed Raman amplifying apparatus where occurrence of optical damage in the optical communication system is preferably prevented.

SUMMARY OF THE INVENTION

The above object is achieved by an optical communication system comprising: a transmitting station; an optical transmission line for transmitting an optical signal sent from the transmitting station; a receiving station for receiving the optical signal outputted from the optical transmission line; a repeater station provided at one point or more in the optical transmission line; and pump light sources provided in at least two of the transmitting station, the receiving station, and the repeater station, for supplying pump light to the optical transmission line, and wherein the pump light has two types or more of wavelength.

Further, the above object is achieved by an optical communication system comprising: a transmitting station; an optical transmission line for transmitting an optical signal sent from the transmitting station; a receiving station for receiving the optical signal outputted from the optical transmission line; the repeater station provided at one point or more in the optical transmission line; a pump light source provided in at least one of the transmitting station; the receiving station and the repeater station, for supplying the pump light to the optical transmission line; detecting means provided in a station according to a pumping method of the pump light, for detecting optical power of the optical signal amplified by the pump light; and stopping means provided in a station supplied with the pump light, for stopping supply of the pump light when a comparison result between first and second detection results is within a predetermined range. The first detection result is obtained by the detecting means when a pump light having a first optical power is supplied to said power transmission line and the second detection result is obtained by the detecting means when a pump light having a second optical power larger than the first optical power is supplied to the optical transmission line.

Furthermore, the above object is achieved by an optical communication system comprising: a transmitting station; an optical transmission line for transmitting an optical signal with a plurality of wavelength bands sent from the transmitting station; a receiving station for receiving the optical signal outputted from the optical transmission line; the repeater station provided at one point or more in the optical transmission line; a pump light source provided in at least one of the transmitting station, the receiving station, and the repeater station, for supplying a plurality of pump lights corresponding to the plurality of wavelength bands to the optical transmission line; band detecting means provided in a station according to a pumping method of the pump light, for detecting the optical power of the optical signal amplified by the pump light in each of the plurality of wavelength bands; and band adjusting means provided in a station provided with the pump light source, for adjusting the optical powers of the plurality of pump lights according to a detection result from the band detecting means so as to keep the optical power of the optical signal detected in each of the wavelength bands within a predetermined fixed range,.

The above object is also achieved by a distributed Raman amplifying apparatus, in which a plurality of pump lights: is supplied from at least two points in the optical transmission line, which transmits an optical signal; and has two types or more of wavelength.

In the optical communication system and the distributed Raman amplifying apparatus, it is possible to obtain substantially flat gain as the function of wavelength since the wavelength and the optical power of the pump light are adjusted.

Furthermore, the above object is achieved by detecting the optical powers of the residual pump light, the optical signal, and the reflected pump light to control the optical power of the pump light according to the detection result, in the above optical communication system.

In the optical communication system, the safety of an operator can be secured since the optical power of the pump light can be controlled while a disconnection of the transmission lines is monitored.

Moreover, the above object is achieved by applying a method for supplying pump light comprising: a first step of supplying the pump light having the first optical power to the optical transmission line; a second step of detecting the optical power of light Raman-amplified by the pump light having the first optical power, a third step of supplying the pump light having the second optical power larger than the first optical power, to the optical transmission line; a fourth step of detecting the optical power of light Raman-amplified by the pump light having the second optical power; and a fifth step of stopping supply of the pump light when a comparison result between detection results of the second step and the fourth step is within a predetermined range.

In the pump light supplying method, it is possible to monitor occurrence of optical damage at a supplying destination of the pump light and prevent occurrence of optical damage during normal operation in the optical transmission line.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

Figure 3:
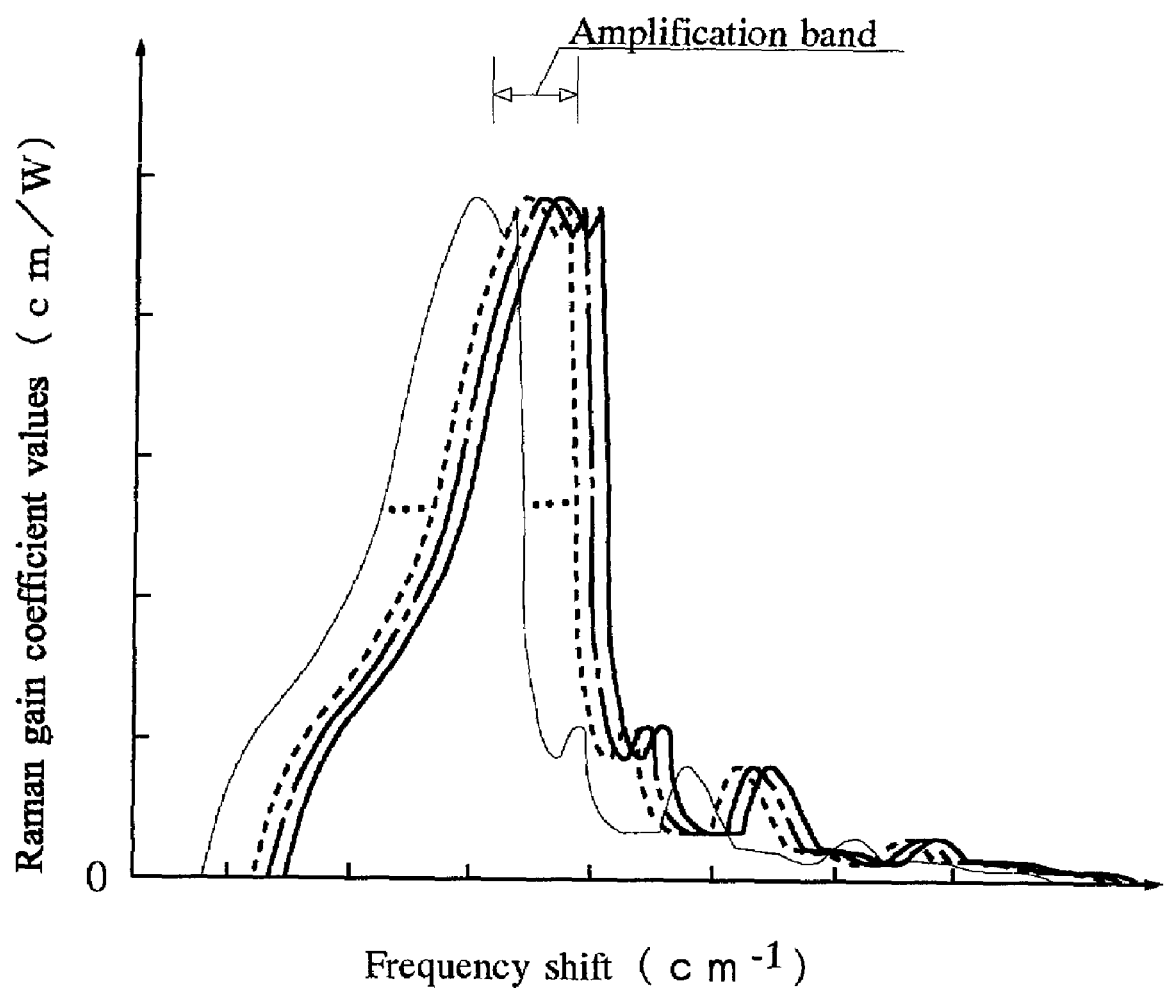
Figure 4:
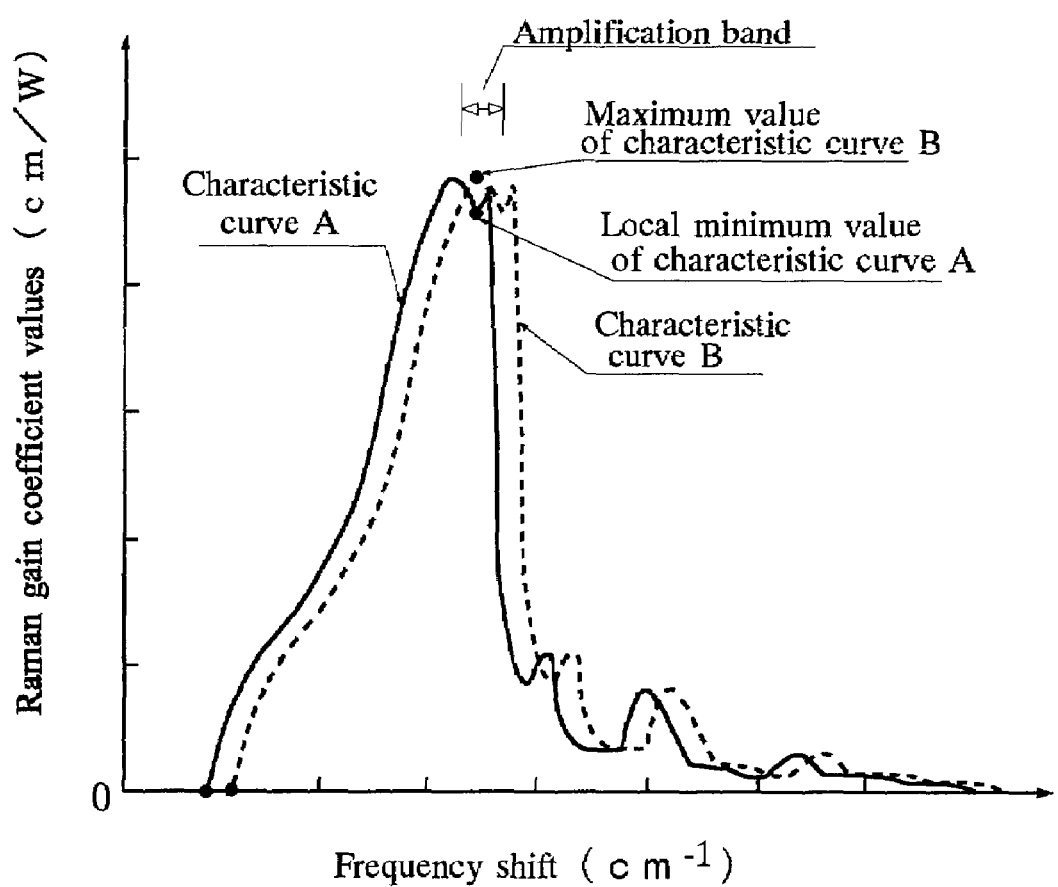
Figure 5:
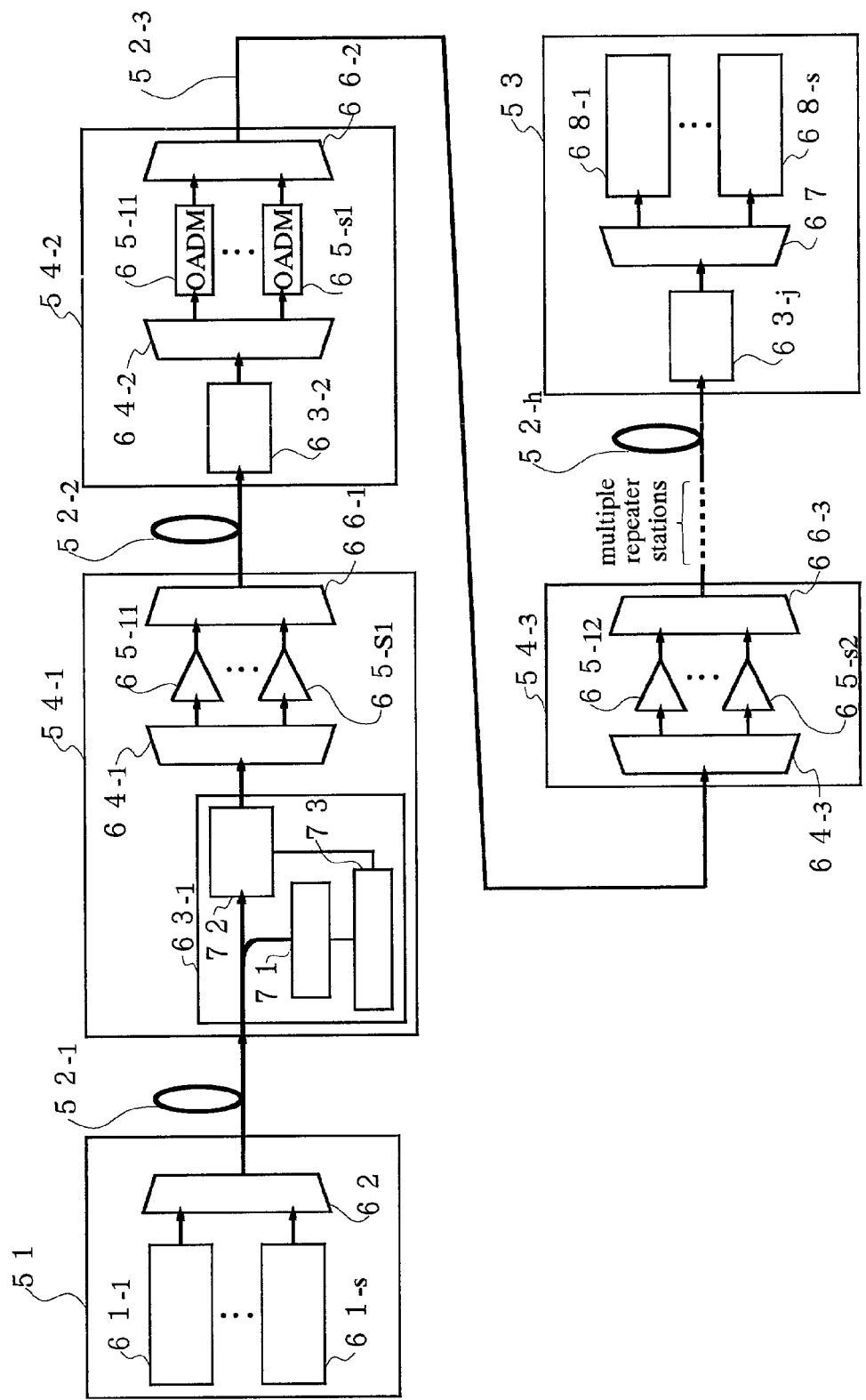
Figure 6:
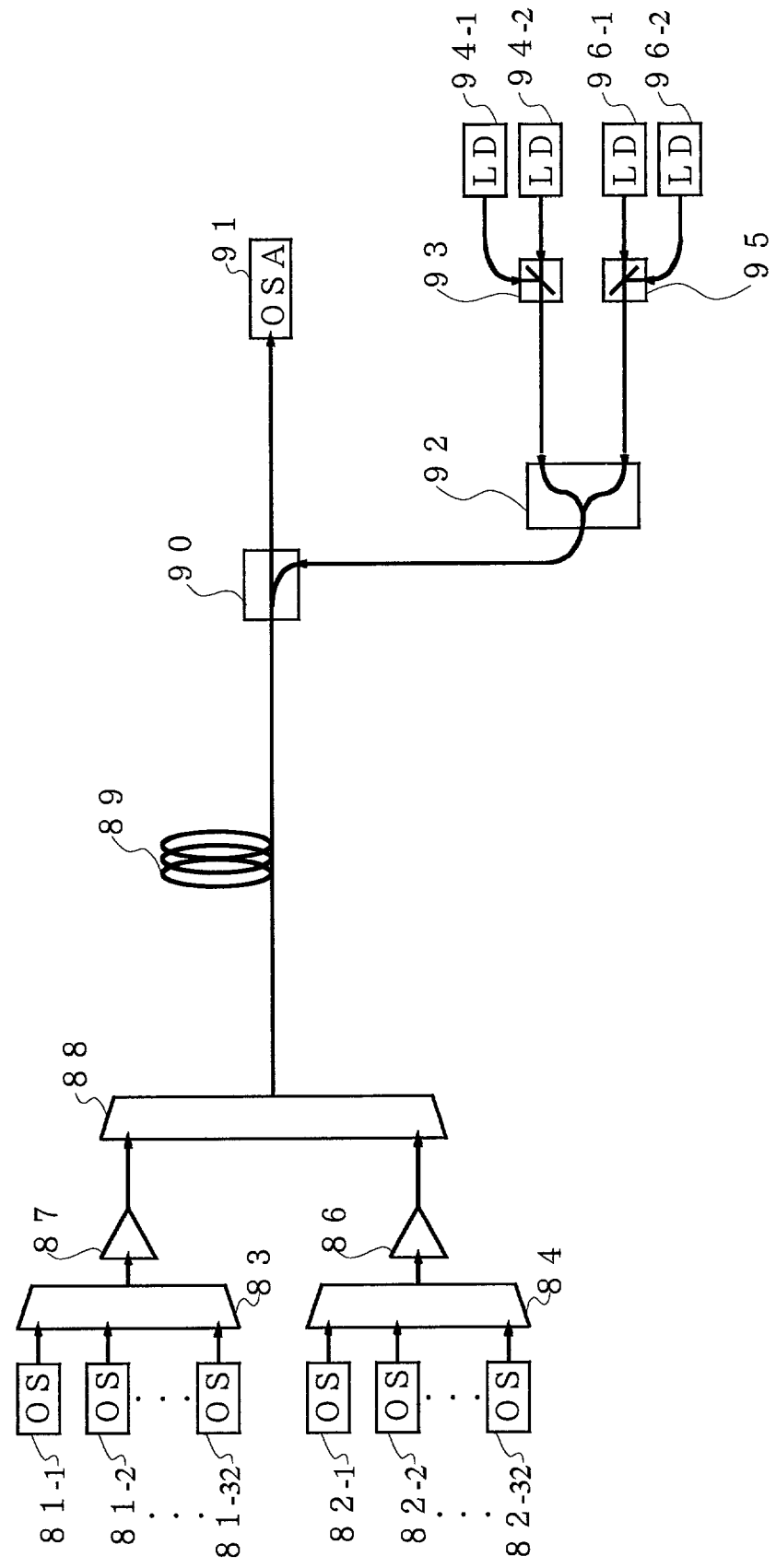
Figure 7:
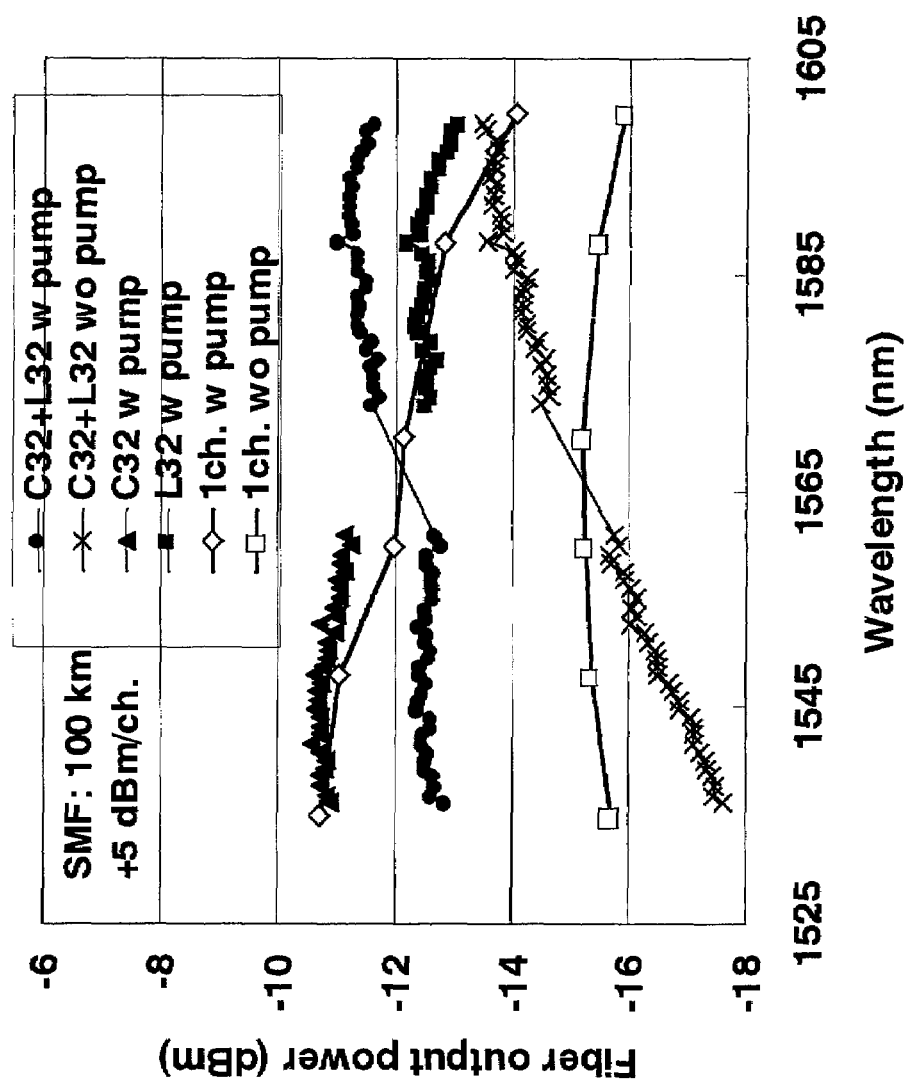
Figure 8:
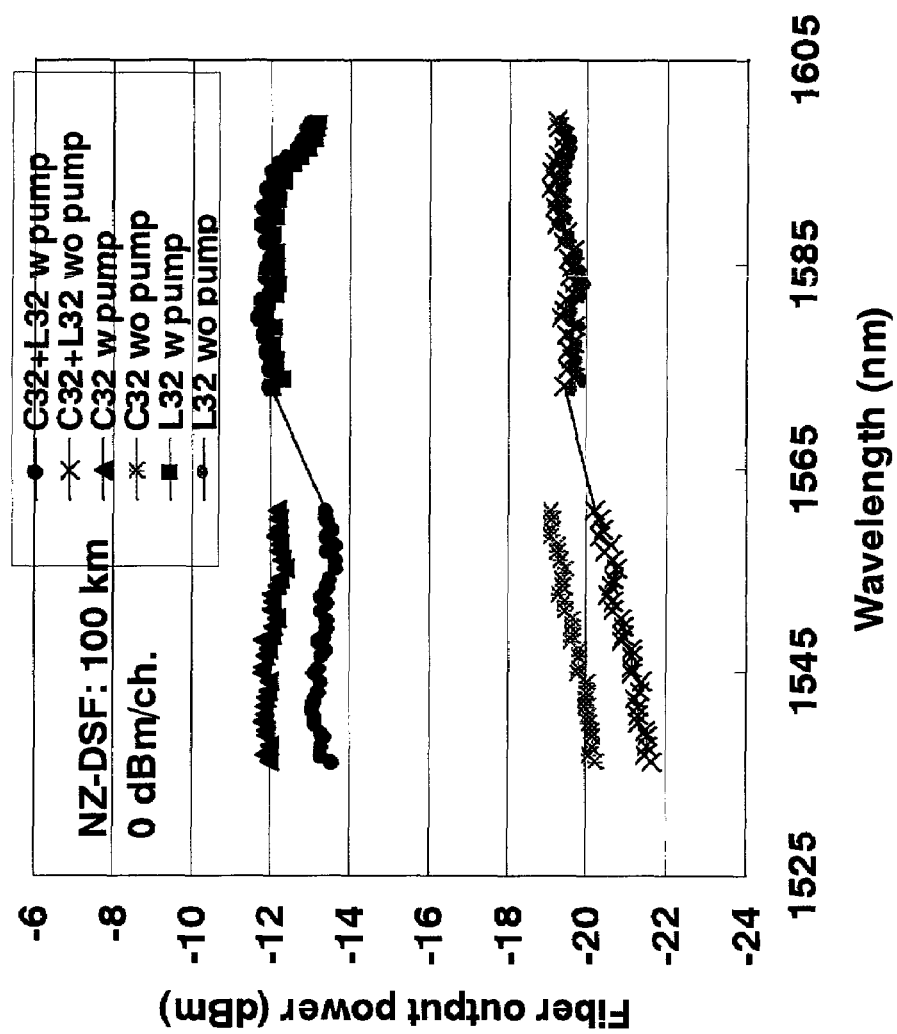
Figure 9:
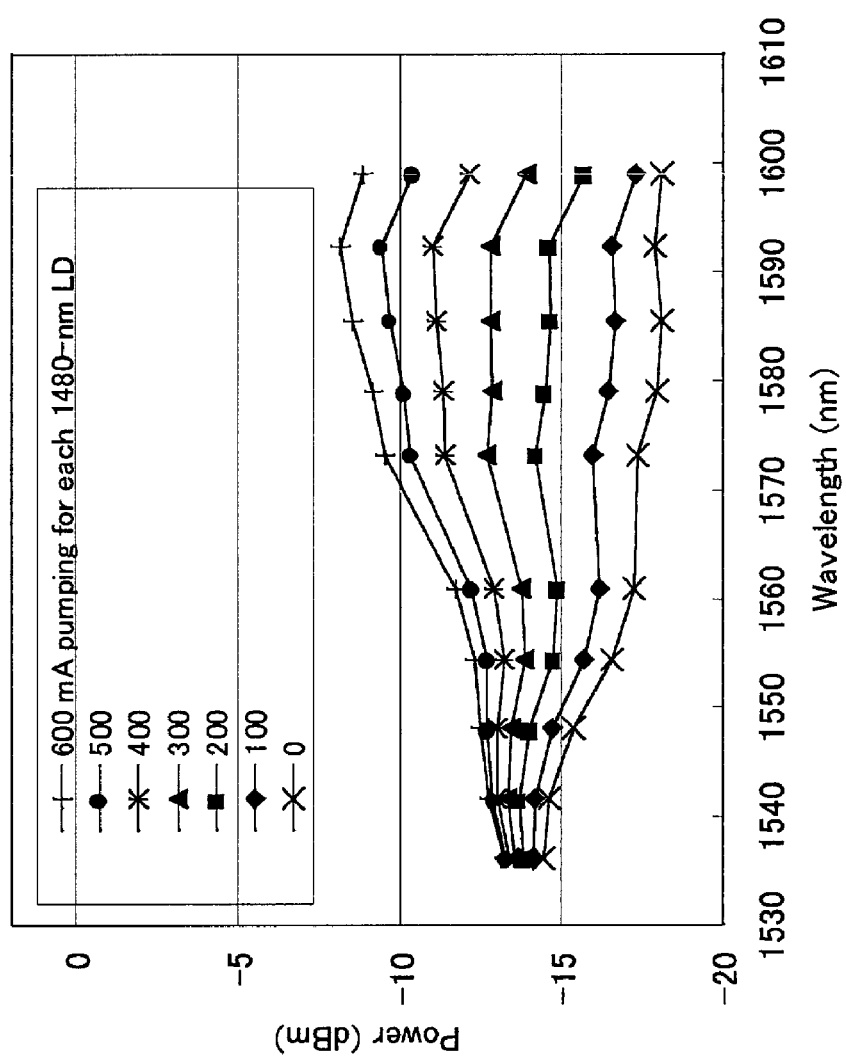
Figure 10:
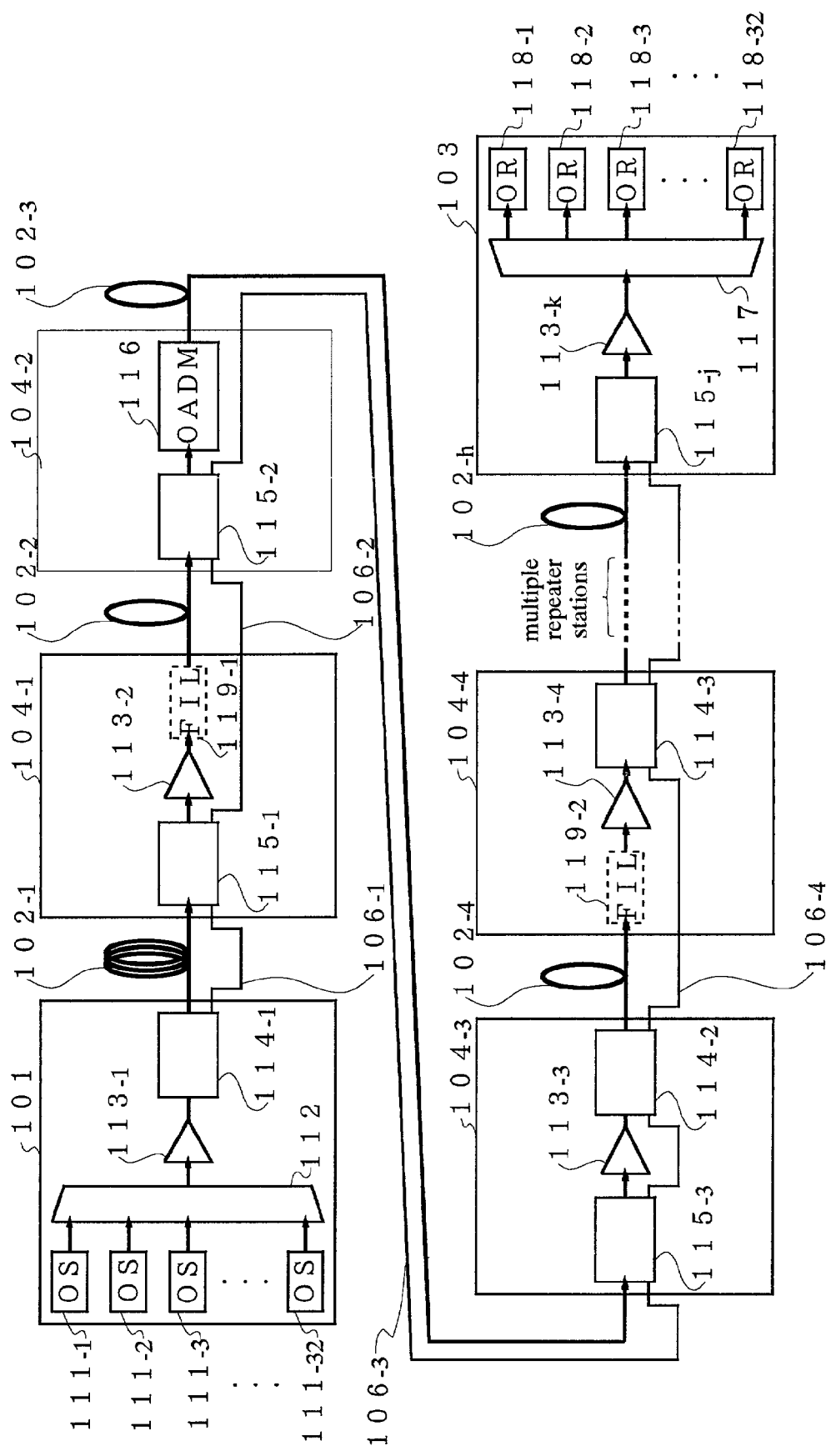
Figure 11:
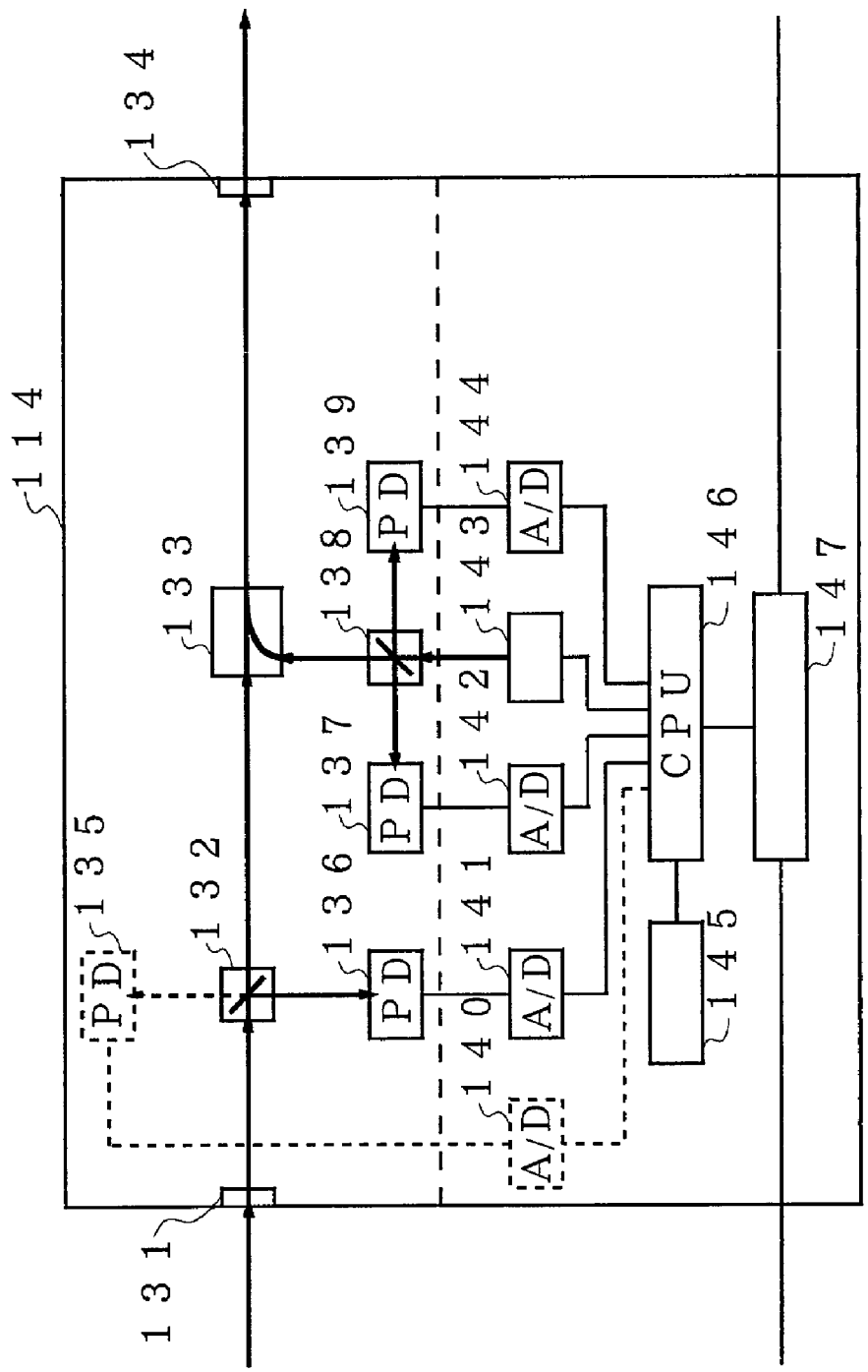
Figure 12:
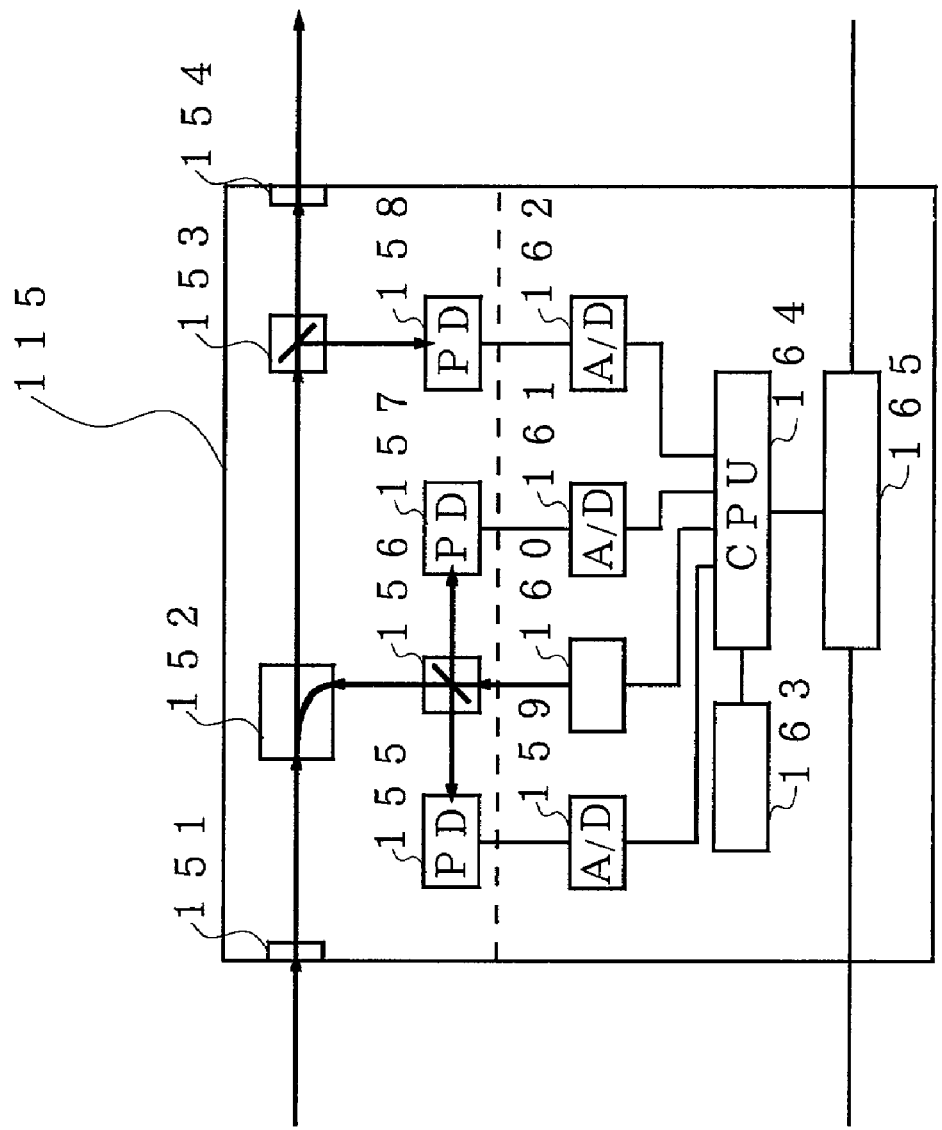
Figure 13:
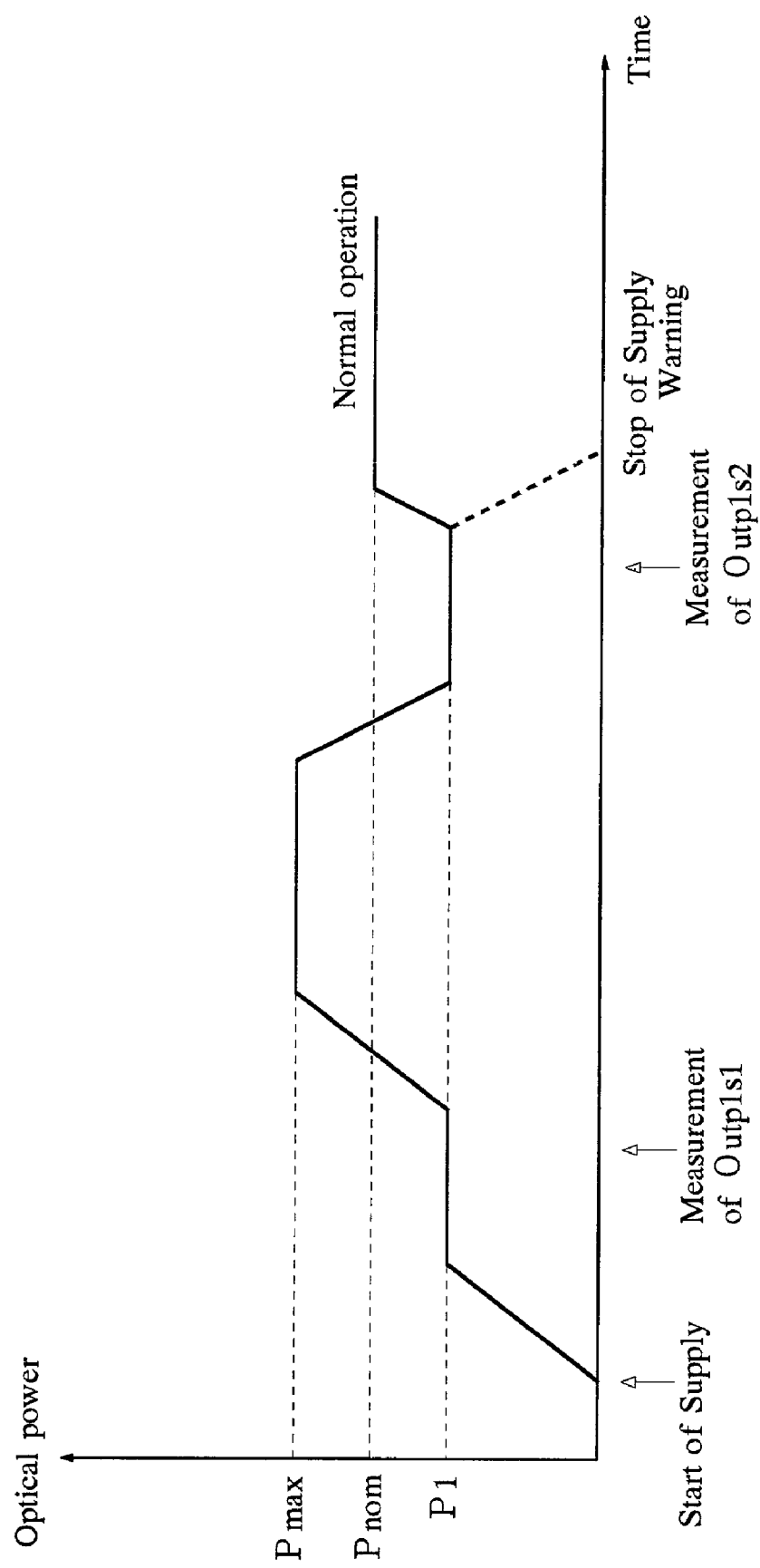
Figure 15:
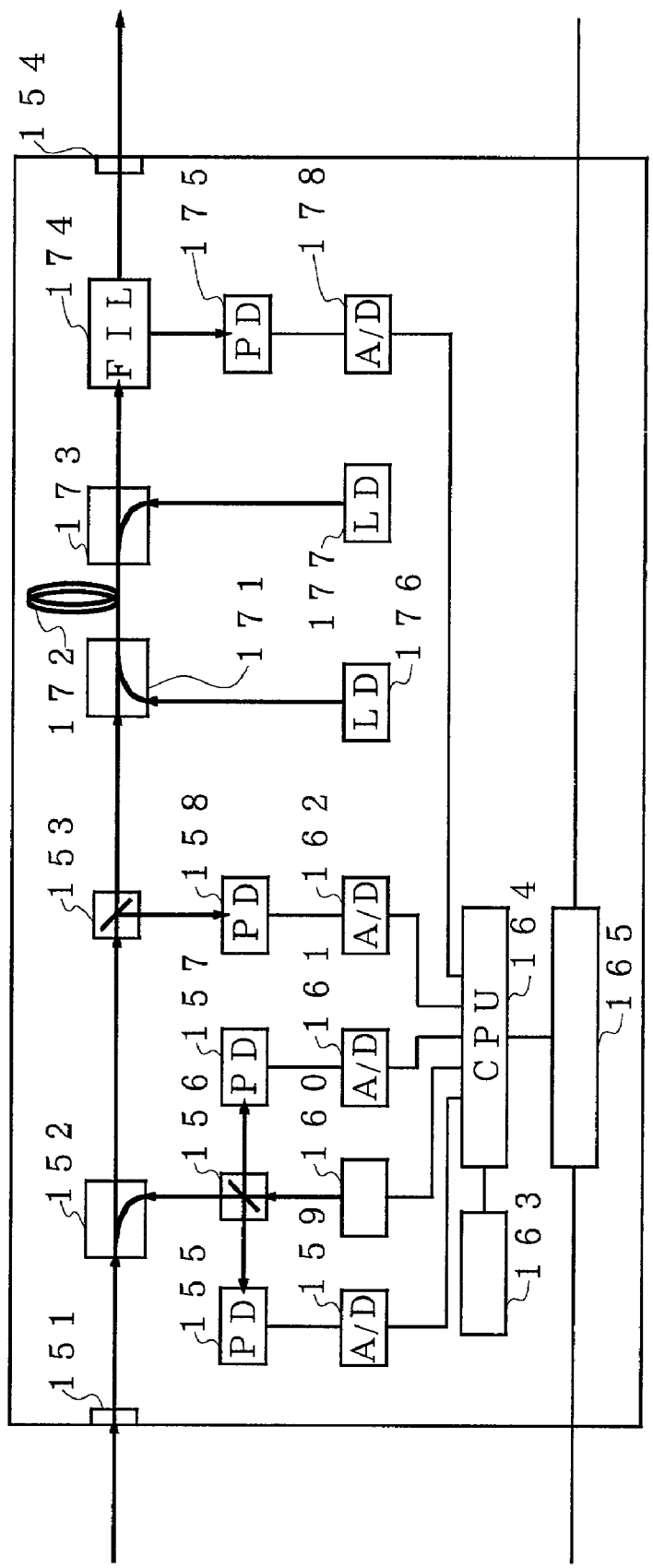
Figure 16:
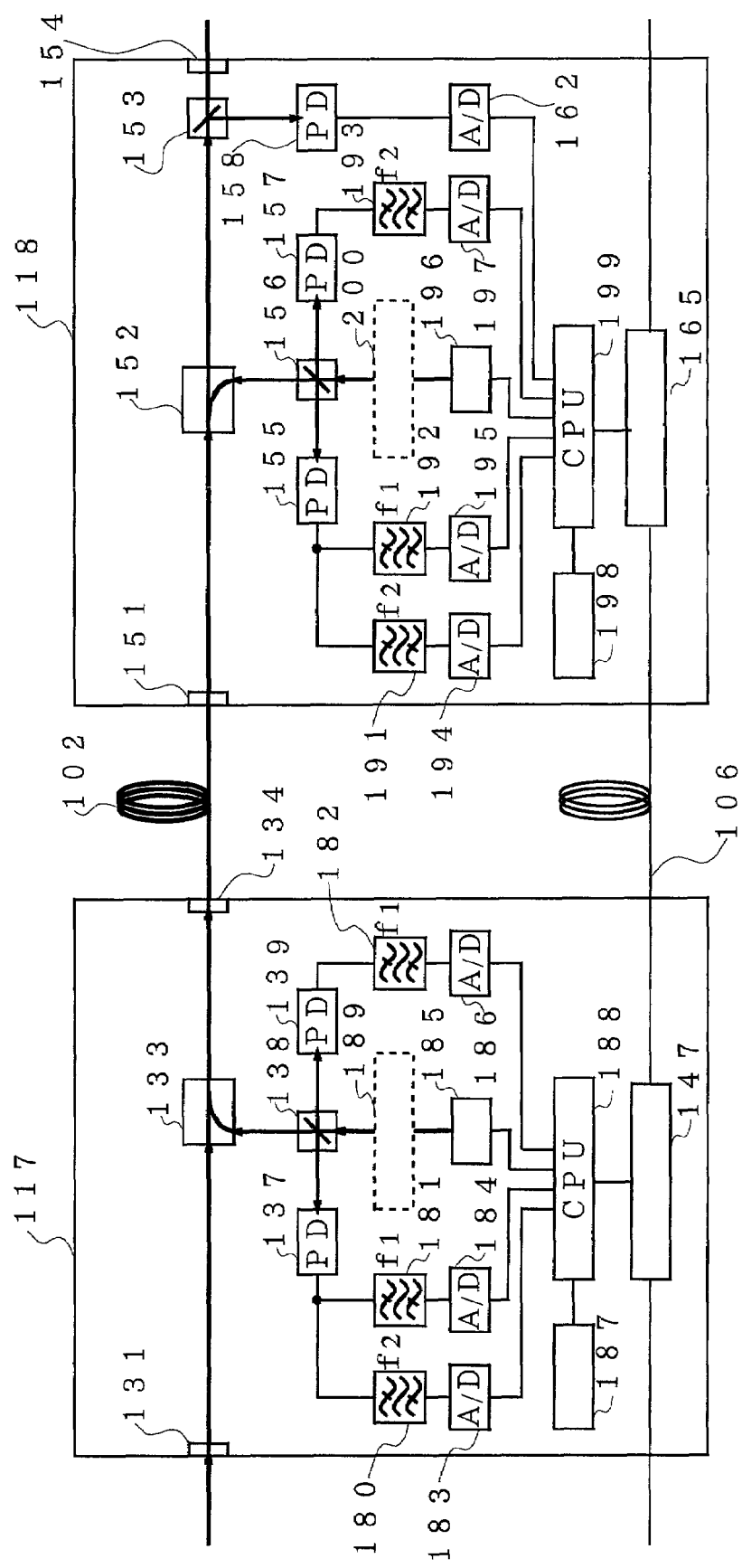
Figure 17:
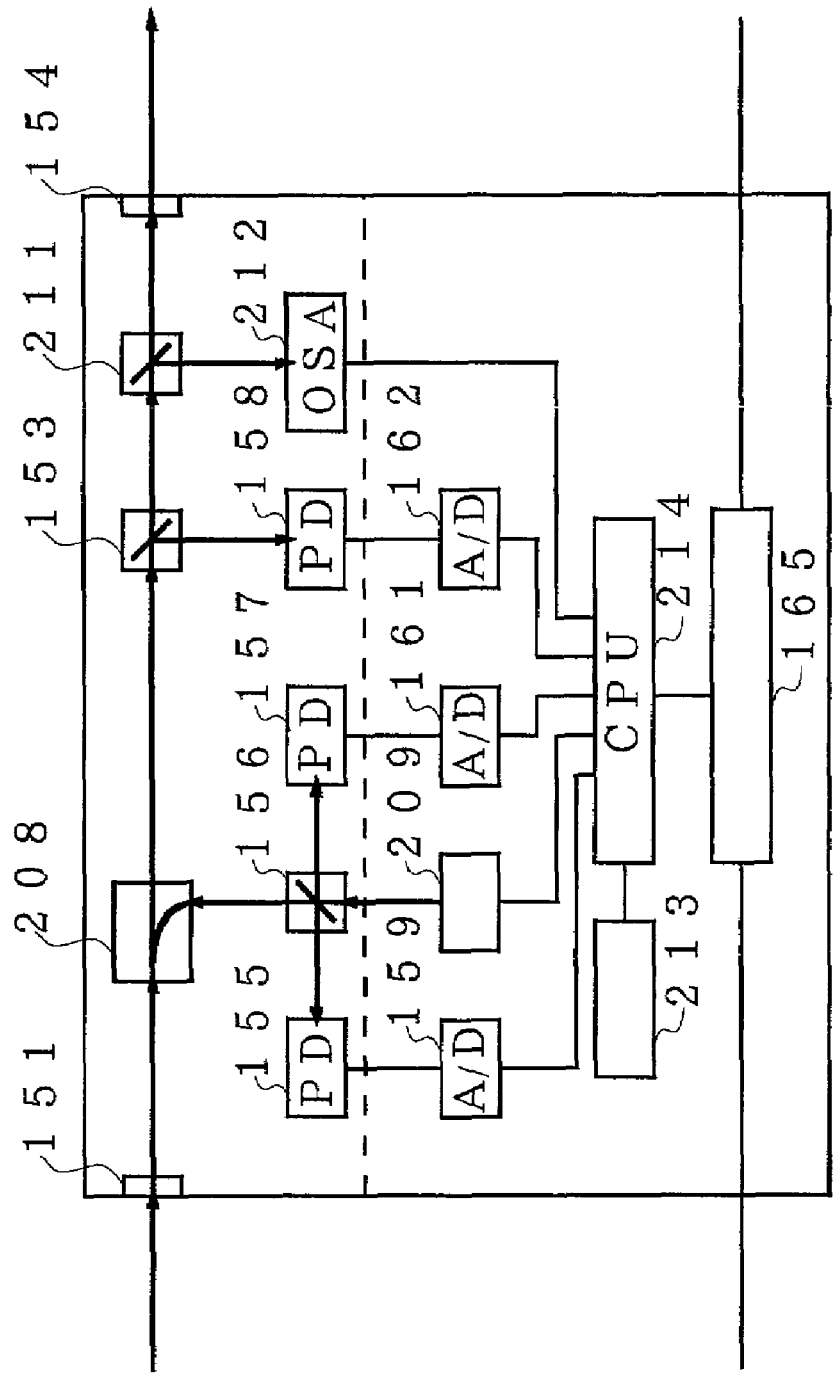
Figure 18:
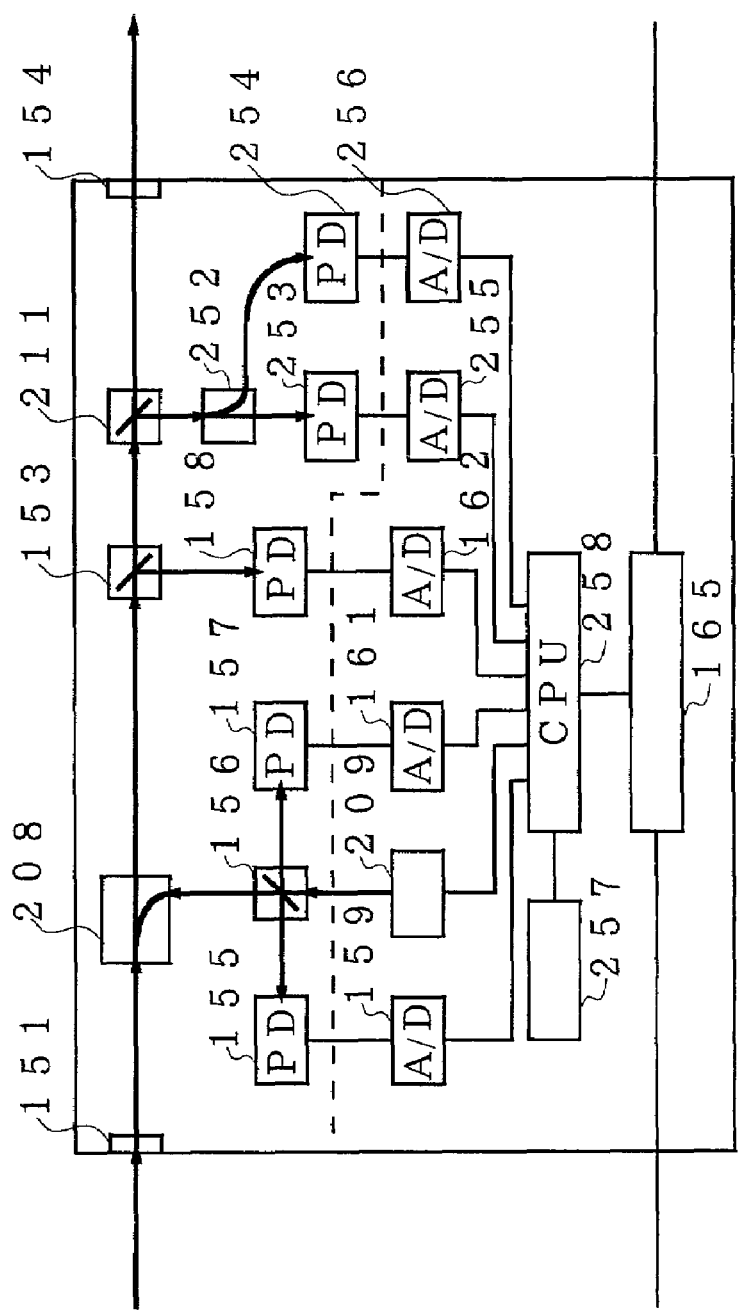
Figure 19:
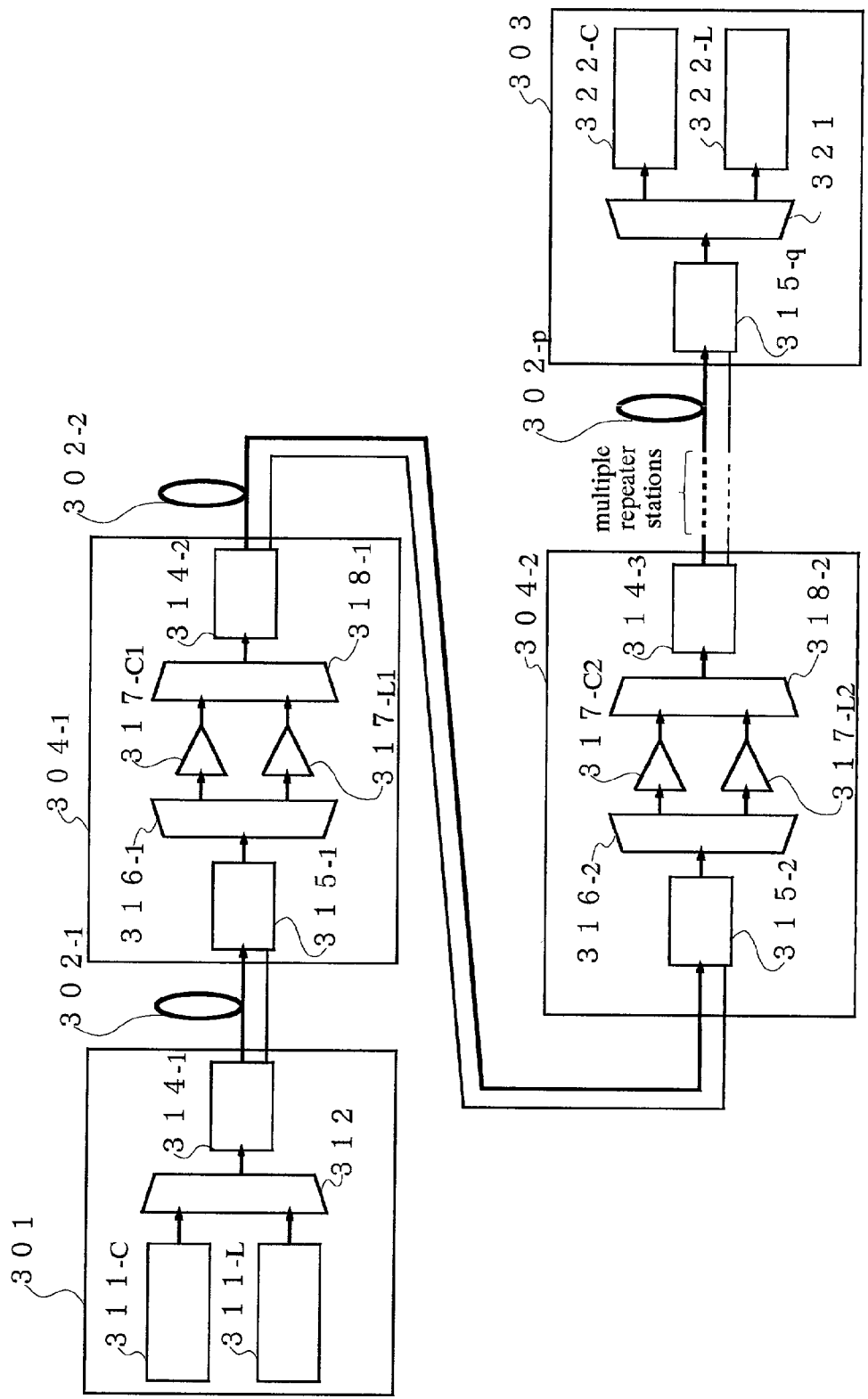
Figure 20:
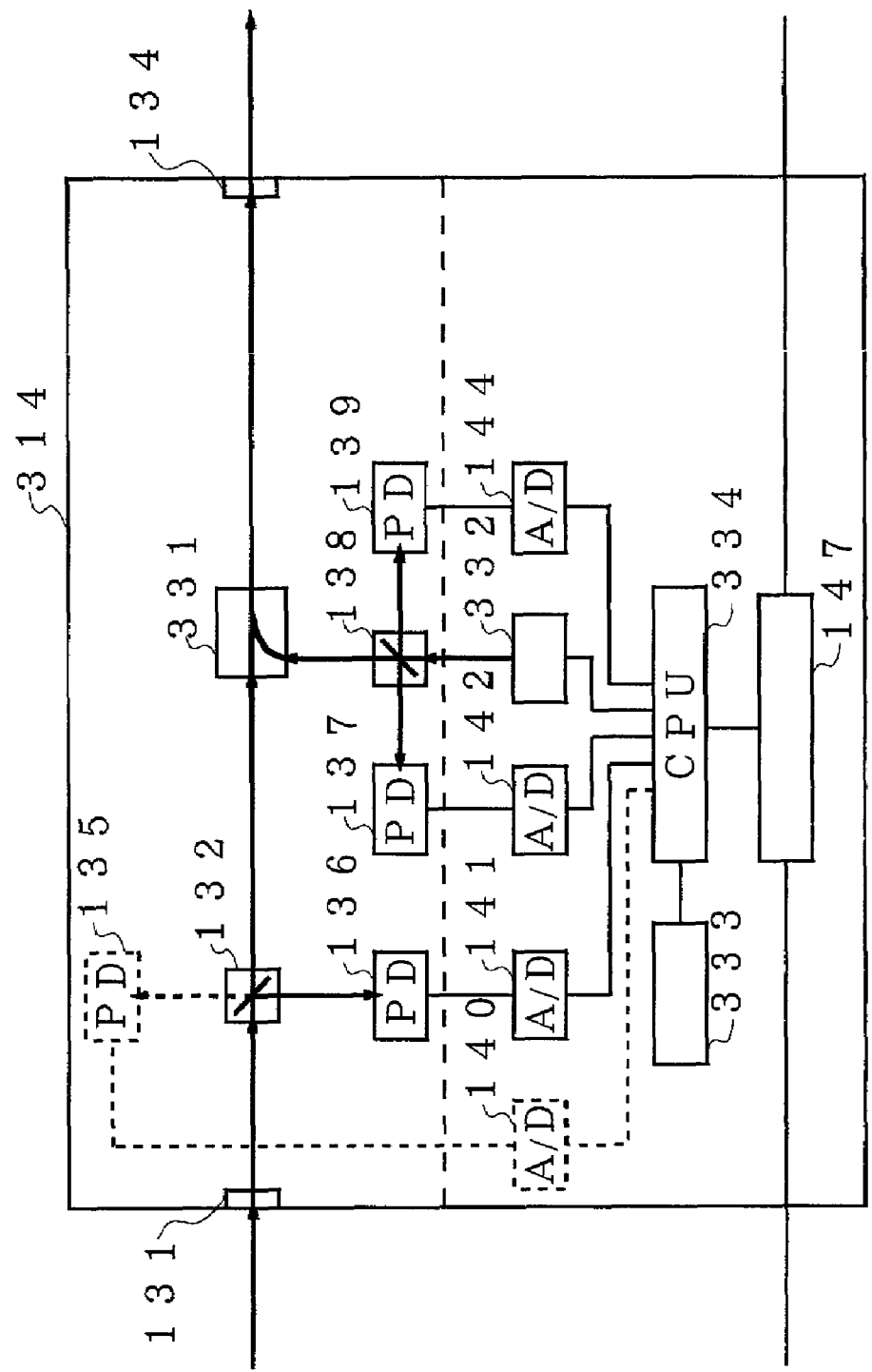
Figure 21:
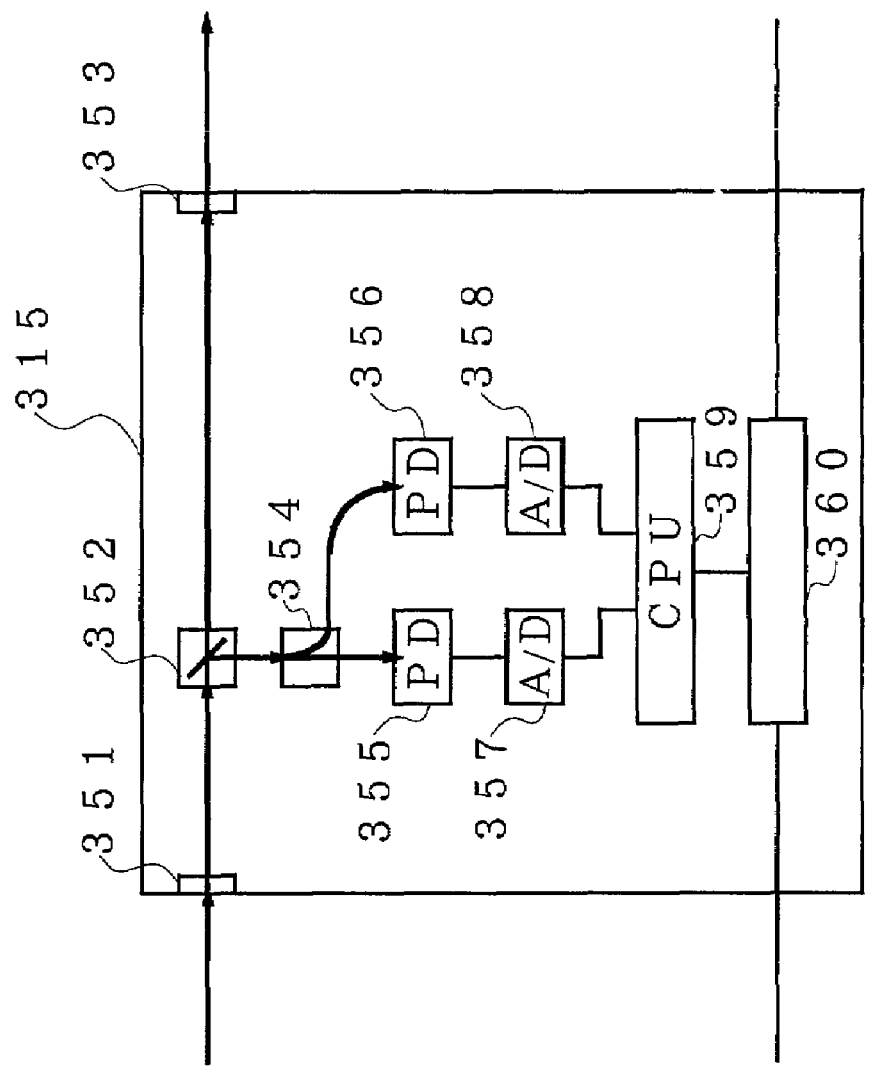

FIG. shows a Raman gain coefficient of an optical fiber;

FIG. 3 shows pump light with a plurality of wavelengths which are different from each other;

FIG. 4 shows pump light with two wavelengths;

FIG. 5 shows the structure of an optical communication system according to a second embodiment;

FIG. 6 shows the structure of an experimental system;

FIG. 7 shows Raman amplification by each pump light in the case of an SMF;

FIG. 8 shows the Raman amplification by each pump light in the case of an NZ-DSF;

FIG. 9 shows the Raman amplification according to optical power ratio of each pump light;

FIG. 10 shows the structure of an optical communication system according to a third embodiment;

FIG. 11 shows the structure of a forward pumping part according to the third embodiment;

FIG. 12 shows the structure of a backward pumping part according to the third embodiment;

FIG. 13 shows time variation in optical power of pump laser light in an optical damage test;

FIG. 14 shows a corresponding table of a pump light number and a pump light wavelength;

FIG. 15 shows the structure of a repeater station which includes a residual pump light detecting part according to the third embodiment;

FIG. 16 shows the structure when a low frequency is superimposed on the pump light according to the third embodiment;

FIG. 17 shows the structure of a backward pumping part according to a fourth embodiment;

FIG. 18 shows the structure of a backward pumping part according to a fifth embodiment;

FIG. 19 shows the structure of an optical communication system according to a sixth embodiment;

FIG. 20 shows the structure of a forward pumping part according to the sixth embodiment;

FIG. 21 shows the structure of a band detecting part according to the sixth embodiment;

FIG. shows a first structural example of a light source;

FIG. 23 shows a second structural example of the light source, and

FIG. 24 shows a third structural example of the light source.

DESCRIPTION OF THE PREFERRED EMBODIMENTS

Hereinafter, preferred embodiments of the present invention will be explained based on the drawings. Incidentally, the same numerals are given to the same components in the respective drawings and explanations thereof are omitted.

Structure of a First Embodiment

The first embodiment relates to an optical communication system according to the present invention.

Figure 1:
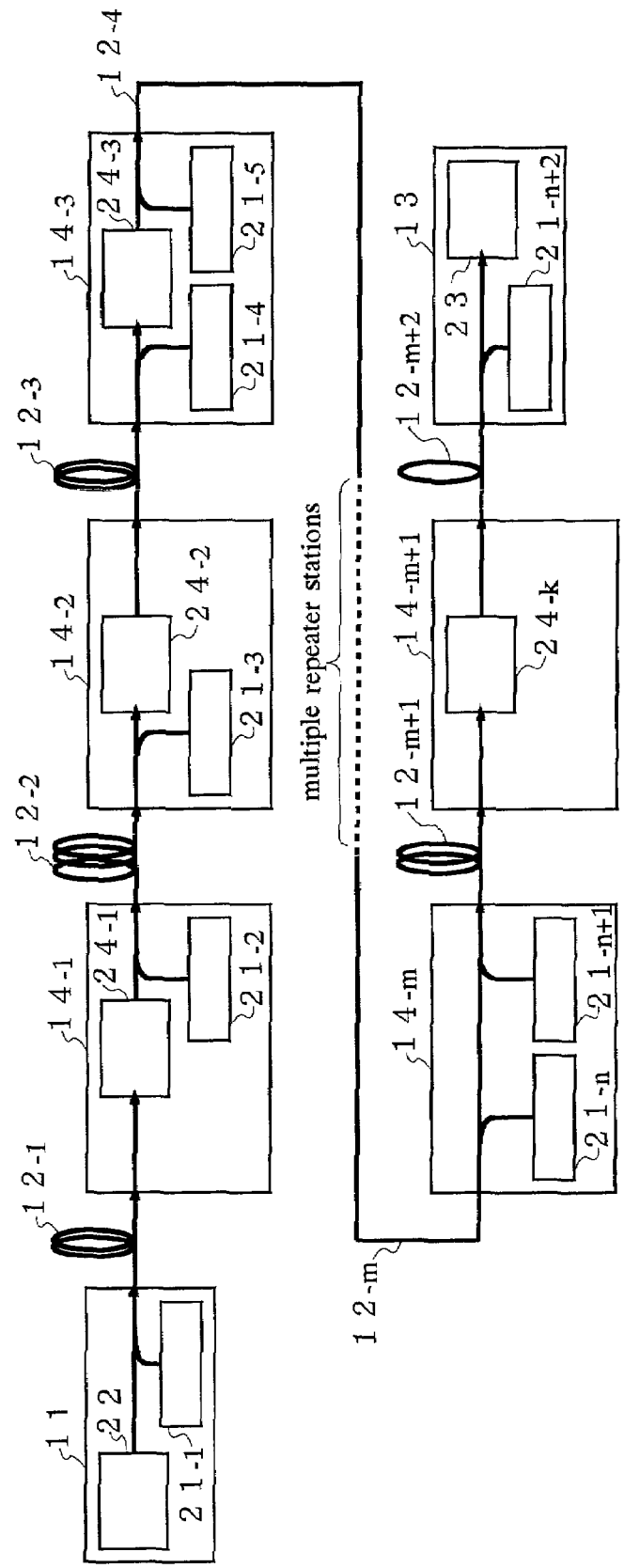
FIG. 1 shows the structure of an optical communication system according to a first embodiment.

FIG. 1 shows the structure of the optical communication system according to the first embodiment.

In FIG. 1, the optical communication system is structured by including a transmitting station 11, a optical transmission line 12 which transmits an optical signal sent out from the transmitting station 11, a receiving station 13 which receives the optical signal outputted from the optical transmission line 12, and a repeater station 14 which is provided at one point or more in the optical transmission line 12. Pump light sources 21 which supply pump light to the optical transmission line 12 are provided in at least two of the transmitting station 11, the receiving station 13 and the repeater stations 14. In the first embodiment, a pump light source 21-1 is provided in the transmitting station 11, a pump light source 21-2 is provided in a repeater station 14-1, a pump light source 21-3 is provided in a repeater station 14-2, pump light sources 21-4, 21-5 are provided in a repeater station 14-3, pump light sources 21-n, 21-n+1 are provided in a repeater station 14-m, and a pump light source 21-n+2 is provided in the receiving station 13. The pump light source is not provided in a repeater station 14-m+1.

Being multiplexed by the pump light which is supplied from the pump light source 21-2, the optical signals generated in a transmitter 22 in the transmitting station 11 are sent out to an optical transmission line 12-1. The optical signals are subjected to Raman amplification by the pump light while transmitting through the optical transmission line 12-1.

When the light to be amplified and the pump light are transmitted in the same direction as above, it is called as a forward pumping. Further, when the light to be amplified and the pump light are transmitted in the opposite directions, it is called as a backward pumping, and when the forward pumping and the backward pumping are performed simultaneously, it is called as a bidirectional pumping.

The optical signals transmit through the optical transmission line 12-1 to be made incident on an optical signal processing part 24-1 in the repeater station 14-1.

When the repeater station 14 has functions of recovering and repeating the optical signals, the optical signal processing part 24-1 and optical signal processing parts 24-2, 24-3, 24-k which will be described later are structured by including an optical amplifier, a dispersion compensator and the like, and when the repeater station 14 has functions of branching/inserting/transmitting the optical signal which is multiplexed from the optical signals, these are structured by including an optical add/drop multiplexer.

The optical signals outputted from the optical signal processing part 24-1 are sent out to an optical transmission line 12-2 after being multiplexed by the pump light supplied from the pump light source 21-2. The optical signals transmit through the optical transmission line 12-2 to be made incident on the optical signal processing part 24-2 in the repeater station 14-2. Meanwhile, the pump light outputted from the pump light source 21-3 in the repeater station 14-2 is supplied to the optical transmission line 12-2. Therefore, the optical signals are Raman-amplified by the bidirectional pumping while these transmit through the optical transmission line 12-2.

The optical signals outputted from the optical signal processing part 24-2 are sent out to an optical transmission line 12-3. The optical signals transmit through the optical transmission line 12-3 to be made incident on the optical signal processing part 24-3 in the repeater station 14-3. Meanwhile, the pump light outputted from the pump light source 21-4 in the repeater station 14-3 is supplied to the light transmission line 12-3. Therefore, the optical signals are Raman-amplified by the backward pumping while these transmit through the optical transmission line 12-3.

The optical signals outputted from the optical signal processing part 24-3 are sent out to an optical transmission line 12-4 after being multiplexed by the pump light supplied from the pump light source 21-5.

Similarly to the above, the optical signals which transmit through the optical transmission line 12 are repeated through multiple stages by the repeater stations 14 to be made incident on the repeater station 14-m. Further, the pump light outputted from the pump light source 21-n in the repeater station 14-m is supplied to an optical transmission line 12-m. The optical signals which are made incident on the repeater station 14-m are sent out to an optical transmission line 12-m+1 after being multiplexed by the pump light supplied from the pump light source 21-n+1. Therefore, the optical signals are Raman amplified by the forward pumping while these transmit through the optical transmission line 12-*m*+1. Thus, the repeater station 14 may have only the function of supplying the pump light, without the optical signal processing part 24 being included therein.

The optical signals transmit through the optical transmission line 12-*m*+1 to be made incident on the optical signal processing part 24 in the repeater station 14-*m*+1. The optical signals outputted from the optical signal processing part 24-*k* are sent out to an optical transmission line 12-*m*+2 to be received in a receiver 23 in the receiving station 13. Meanwhile, the pump light outputted from the pump light source 21-*n*+2 in the receiving station 13 is supplied to the optical transmission line 12-*m*+3. Therefore, the optical signals Raman-amplified by the backward pumping while these transmit through the optical transmission line 12-*m*+2.

Moreover, the respective pump lights have two types or more of wavelength. For example, the wavelengths of the respective pump lights may be different from each other.

Furthermore, for example, there may be three types of wavelengths of the pump lights which are supplied from the pump light sources 21-1, 21-4, 21-*n*+2, the pump lights which are supplied from the pump light sources 21-2, 21-5, 21-*n*+1 and the pump lights which are supplied from the pump light sources 21-3, 21-*n*. The wavelengths of the respective pump lights are suitable as long as there are two or more types thereof, and various cases are suitable as described above.

Operation and Effects of the First Embodiment

Figure 2:
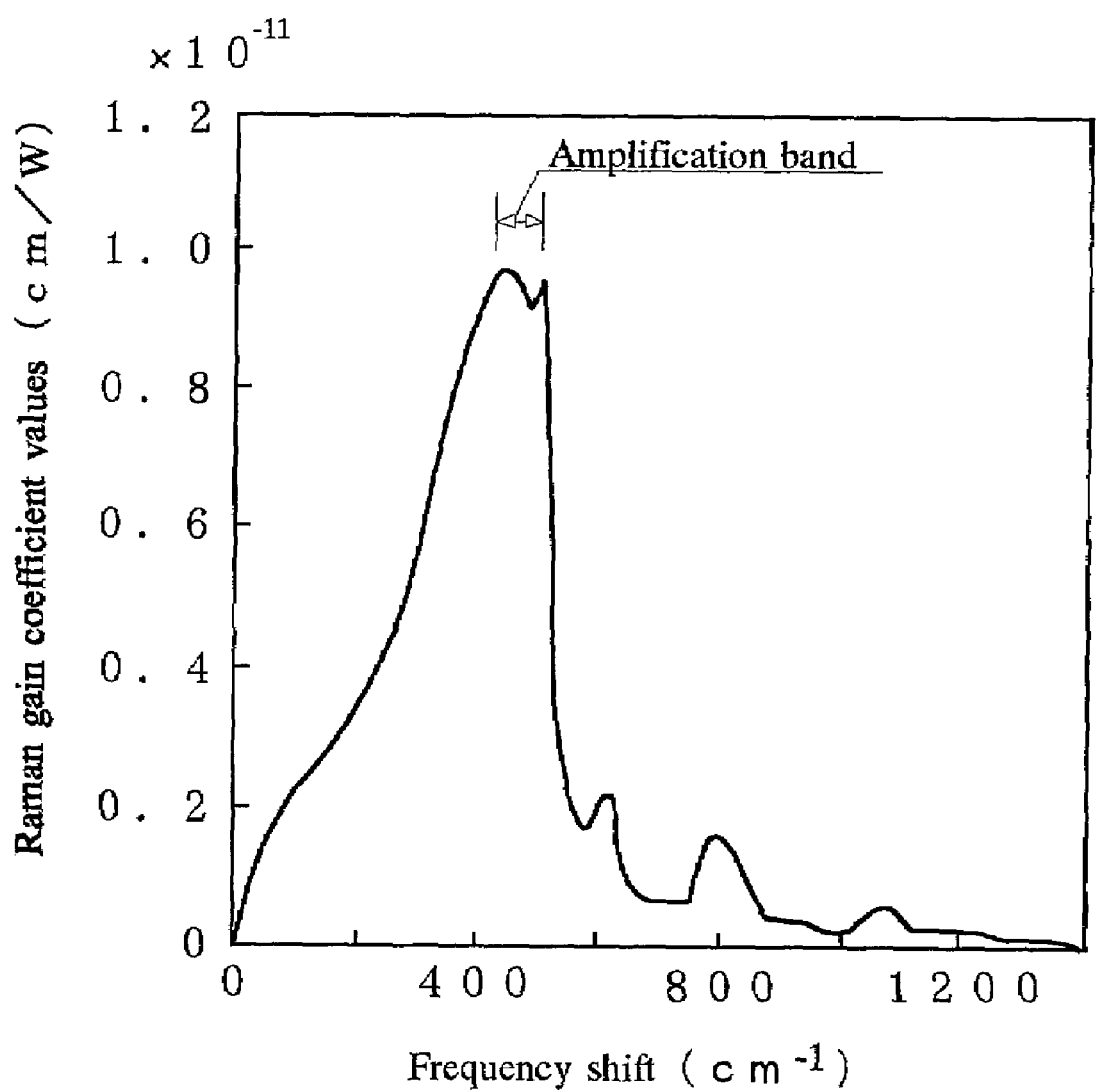

FIG. 2 shows a Raman gain coefficient of an optical fiber.

FIG. 3 shows a case of the pump light with a plurality of the wavelengths which are different from each other.

FIG. 4 shows a case of the pump light with the two wavelengths.

FIG. 2 is the view extracted from R. G. Stolen: "Nonlinearity in fiber transmission," Proc. IEEE, Vol.68, P1232–1236,1980. The vertical axes of FIG. 2 and FIG. 4 show the Raman gain coefficient displayed in cm/W, and the lateral axes thereof show a frequency shift displayed in $cm^{-1}$. The curve in FIG. 2 shows the Raman gain coefficient when the wavelength of the pump light is 1 μm only. Incidentally, the Raman gain coefficient becomes $1/\lambda$ ($\lambda$ is the wavelength) when the pump light is 1.5 μm.

As shown in FIG. 2, the Raman gain coefficient starts to appear at the frequency shifted from the frequency of the pump light in approximately 200 ($cm^{-1}$), reaches its maximum value at the frequency shifted in approximately 430 ($cm^{-1}$), takes on a local minimum value, takes on a local maximum value again at the frequency shifted in approximately 200 ($cm^{-1}$), plummets and disappears after repeating local maximum values and local minimum values. It is needless to say that a Raman gain also changes similarly to the Raman gain coefficient.

In the Raman amplification, a range with the high Raman gain coefficient values is normally set to be its amplification band. As shown in FIG. 2, in amplifying C-band, for example, a range with the high Raman gain coefficient values which are from 420 ($cm^{-1}$) to 480 ($cm^{-1}$) is set to be its amplification band.

In this case, the Raman gain is wavelength dependent as described above. Therefore, when the light to be amplified is a WDM optical signal, optical powers of the respective optical signals in the WDM optical signal after the amplification are different from each other, even when the respective optical powers of the optical signals are equal to each other before the amplification. Namely, even when a spectrum of the WDM optical signal before the amplification is almost flat, the spectrum after the amplification is tilted.

In view of the above circumstances, the pump light is allowed to have a plurality of the wavelengths, instead of one wavelength. Thereby, the local maximum value (maximum value) and the local minimum value are offset by each other because gain as a function of the wavelength of the optical communication system as a whole is a composition of the Raman gains by each pump light as shown in FIG. 3, whereby the gain as the function of wavelength becomes almost flat.

Focusing on an optical signal in the WDM optical signal, the signal is amplified with the Raman gain coefficient of the local minimum value by the pump light supplied from a station and meanwhile, it is amplified with the Raman gain coefficient with the local maximum value (maximum value) by the pump light supplied from another station, while it is transmitted from the transmitting station 11 to the receiving station 13. For this reason, the optical powers of the respective optical signals in the WDM optical signal which are Raman-amplified, become almost equal to each other while these are transmitted from the transmitting station 11 to the receiving station 13.

Therefore, according to the first embodiment, the optical signals can be Raman-amplified in the optical transmission line without having a gain tilt, so that ultra-long distance transmission thereof is made possible.

According to the first embodiment, the pump light with the plurality of the wavelengths which are different from each other are supplied from the pump light sources provided in the respective stations, and the wavelengths of the respective pump light sources are set when the optical communication system is installed.

Incidentally, it is suitable to provide a central control unit which collectively controls the settings of the wavelengths, so as to designate the wavelengths through communication lines to the respective pump light sources. Further, it is also suitable to provide a table of the wavelengths to be set in the respective pump light sources so as to refer to the wavelengths of the other pump light sources and select the wavelength which is not used by the other pump light sources from the table to set it as the wavelength of its own. Furthermore, it is also suitable to set the wavelengths of the respective pump light sources to make the rounds thereof. In other words, for example, a first wavelength, a second wavelength, a third wavelength, the first wavelength, the second wavelength, the third wavelength, the first wavelength . . . are set to a first pump light source, a second pump light source, a third pump light source, a fourth pump light source, a fifth pump light source, a sixth pump light source, a seventh pump light source . . . , respectively.

Incidentally, FIG. 2 shows the Raman gain coefficient of the optical fiber made of silica glass. However, with regard to the Raman gain coefficient in an optical glass fiber, the Raman gain is a phenomenon occurring due to an interaction with optical phonon in the optical fiber, and the glass comprising the optical fiber is an amorphous solid, and therefore, the Raman gain coefficient of other optical fibers also has ripples of the local maximum value and the local minimum value in the range with the high Raman gain coefficient values.

Preferred Embodiments of the First Embodiment

In the optical communication system according to the first embodiment, it is preferable that an interval between a minimum value and a maximum value of a wavelength of each pump light coincides a width of the amplifying wavelength band when the first maximum value on a longer wavelength side of a wavelength, which starts showing Raman gain generated by one of the pump lights, coincides with a center wavelength of the amplifying wavelength band to be amplified, in the Raman gain as the function of wavelength.

Therefore, the gain as the function of wavelength of a desired amplification band can be nearly flattened since the Raman gain appears with a fixed interval from the wavelength of the pump light, as is clear from FIG. 2, Further, in the optical communication system according to the first embodiment, the pump light has the first wavelength and the second wavelength, and preferably, an interval between the first and the second wavelengths is set equal to an interval between a first maximum value on a longer wavelength side of a wavelength, which starts showing the Raman gain, and a first local minimum value on the longer wavelength side of the maximum value, in the Raman gain as the function of wavelength.

Furthermore, in the optical communication system according to the first embodiment, the pump light has the first wavelength and the second wavelength. The second wavelength is preferably set so that a first maximum value on the longer wavelength side of a wavelength, which starts showing a second Raman gain generated by the pump light with the second wavelength, substantially coincides with a local minimum value on a longer wavelength side of a wavelength, which starts showing a first Raman gain generated by the pump light with the first wavelength.

The local minimum value of the Raman gain by the first wavelength (a local minimum value of a characteristic curve A) is offset by the maximum value of the Raman gain by the second wavelength (a maximum value of a characteristic curve B) as shown in FIG. 4, thereby reducing wavelength dependency of the gain in the amplification band.

In the optical communication system according to the first embodiment, it is preferable to further provide a shielding part for shielding the pump light in the optical transmission line 12 inside the station opposing to the station supplied with the pump light in the transmission direction of the pump light.

When the optical power of the pump light is strong, the pump light reaches the opposing station as a residual pump light because the pump light is not completely consumed for the Raman amplification in the optical transmission line 12. When gain control or monitoring the connection of the optical transmission line or the like to an output side are performed by the opposing station detecting the optical power of the light at the output side, the control and the monitoring may malfunction due to the residual pump light. The malfunctions can be prevented by providing the shielding part as described above.

The opposing station is a subsequent station in the case of the forward pumping and a preceding station in the case of the backward pumping.

Furthermore, in the optical communication system according to the first embodiment, it is preferable to further include: a residual light detecting part provided in a station opposing, in the transmission direction of the pump light, to the station supplied with the pump light, for detecting the optical power of the residual pump light of the pump light; an adjusting part provided in the station supplied with the pump light, for adjusting the optical power of the pump light so that detection results from the residual light detecting part falls within a predetermined fixed range; and a detection result transmitting part which transmits the detection results from the residual light detecting part to the adjusting part.

The Raman amplification depends on an effective cross section area of the optical transmission line 12, loss in the optical fiber itself used as the optical transmission line 12, and splice loss in the optical transmission line 12 between the respective stations. Further, the existing optical fibers are usually used as the optical transmission line 12 for the Raman amplification. For this reason, it is unknown how the optical fibers are connected to each other, and hence the splice loss is also unknown.

As described above, it is possible to perform the actual measurement of the splice loss in the optical transmission line 12 with regard to the wavelength of the pump light by measuring the optical power of the residual pump light, thereby controlling the Raman gain with more accuracy.

Moreover, in the optical communication system according to the first embodiment, it is preferable to further include: the residual light detecting part provided in a station opposing to the station supplied with the pump light in the transmission direction of the pump light, for detecting the optical power of the residual pump light of the pump light; a stopping part provided in a station supplied with the pump light, for stopping supply of the pump light when the detection result from the residual light detecting part is lower than or equal to a predetermined value; and a detection result transmitting part which transmits the detection result from the residual light detecting part to the stopping part.

When the residual pump light is not detected even though the pump light is supplied, the optical transmission line 12 is not connected to the opposing station, or anomaly such as disconnection occurs in the optical transmission line 12. In the optical communication system, the disconnection and the anomaly can be detected to stop the supply of the pump light, which assures safety of operators.

Furthermore, in the optical communication system according to the first embodiment, it is preferable to further include an optical signal detecting part provided in a station supplied with the pump light, for detecting the optical power of the optical signals and a stopping part which stops the supply of the pump light when the detection result from the optical signal detecting part is outside a predetermined fixed range.

The optical power of the optical signal being outside the fixed range means that it is smaller or larger than a fixed value. In the former case, the optical transmission line 12 is not connected to an input side, and hence the safety of the operators can be assured by inhibiting the supply of the pump light. In the latter case, the pump light is too strong, and hence stopping the supply of the pump light prevents optical components such as an optical amplifier to be subsequently connected, from being broken.

Moreover, in the optical communication system according to the first embodiment, it is preferable to further include a reflected light detecting part provided in a station supplied with the pump light, for detecting the optical power of reflected pump light of the pump light and a stopping part which stops the supply of the pump light when the detection result from the reflected light detecting part is higher than a predetermined value. In the above structure, it is preferable to further include a superimposing part which superimposes a low frequency on the pump light, and the stopping part preferably detects the low frequency to verify that it is the pump light supplied from itself.

When the optical transmission line 12 which should supply the pump light is not connected or an anomaly such as a disconnection occurs in the optical transmission line 12, the pump light is reflected. Monitoring the reflected pump light makes it possible to detect the disconnection and the anomaly at a supplying destination, which assures the safety of the operators. Further, when the wavelengths of the respective pump lights are close to each other under the above condition, it may be difficult to distinguish the reflected pump light of the pump light supplied from itself to the optical transmission line 12 from the residual pump light of the pump light supplied from its opposing station. For this reason, the low frequency is superimposed on the pump light and it is verified whether the low frequency is included in the light which is detected by the reflected light detecting part, which makes it possible to verify that it is the pump light supplied from itself in the optical communication system. Thus, the detecting part can surely detect the reflected pump light, so that the malfunctions due to detection of the residual pump light can be prevented.

Furthermore, in the optical communication system according to the first embodiment, it is preferable to further include a detecting part provided in a station according to a pumping method of the pump light, for detecting the optical power of the optical signals amplified by the pump light and a stopping part provided in a station supplied with the pump light, for stopping the supply of the pump light when a comparison result between a first detection result and a second detection result is within a predetermined range. The first detection result is obtained by the detecting part when the pump light having a first optical power is supplied to the optical transmission line 12 and the second detection result is obtained by the detecting part when the pump light having a second optical power larger than the first optical power is supplied to the optical transmission line 12. The stopping part may give a warning of anomaly occurring at the supplying destination.

When the pump light is supplied to the optical transmission line 12, oil and dust adhering to connectors connecting the stations with the optical transmission line 12 and end surfaces of the optical fibers as the optical transmission line 12 may burn thereinto because of the pump light, which causes an optical damage in the optical transmission line 12. Namely, the anomaly occurs at the supplying destination of the pump light because of the optical damage.

For this reason, the pump light having the second optical power, which is larger than that of the pump light used during the operation of the optical communication system, is supplied to the optical transmission line before the operation, which may cause optical damage in the optical transmission line. Since the optical damage can be detected in the optical communication system by comparing the first detection result and the second detection result, the optical damage given during the operation can be avoided.

It should be mentioned that the detecting part is provided in the opposing station in the transmission direction of the pump light in the case of the forward pumping, and provided in the station which supplies the pump light in the case of the backward pumping.

Next, another embodiment will be explained.

Structure of a Second Embodiment

The second embodiment relates to an optical communication system according to the present invention.

FIG. 5 shows the structure of the optical communication system according to the second embodiment.

In FIG. 5, the optical communication system is structured by including a transmitting station 51, an optical transmission line 52 which transmit optical signals with a plurality of wavelengths sent out from the transmitting station 51, a receiving station 53 which receives the optical signals outputted from the optical transmission line 52, and a repeater station 54 which is provided at one point or more in the optical transmission line 52.

Further, a backward pumping part 63 is provided at least one of the transmitting station 51, the receiving station 53 and the repeater stations 54. In the second embodiment, the backward pumping parts 63 are provided in repeater stations 54-1, 54-2 and the receiving station 53, and the backward pumping part 63 is not provided in a repeater station 54-3.

The backward pumping part 63 is structured by including a pump light source 71, a band detecting part 72 and a band adjusting part 73 provided in the station in which the pump light source 71 is provided.

Incidentally, in the case of a forward pumping, the band detecting part 72 is provided in the station opposing, in a transmission direction of pump light, to the station in which the pump light source 71 and the band adjusting part 73 are provided, that is, in the station connected on a subsequent stage. Thus, the band detecting part 72 is provided in the respective stations correspondingly to a pumping method of the pump light.

The optical signals with a plurality of wavelength bands generated in the transmitting station 51 are sent out to an optical transmission line 52-1. The transmitting station 51 is structured by including a plurality of signal generating parts 61 each of which generates an optical signal with one wavelength band and a WDM coupler 62 which multiplexes the generated optical signals with the respective wavelength bands. Further, the signal generating part 61 is structured by including, for example, a plurality of transmitters each of which generates an optical signal with one wavelength and a WDM coupler which multiplexes the plurality of the generated optical signals.

The optical signals transmit through the optical transmission line 52-1 to be made incident on the band detecting part 72 in a backward pumping part 63-1 in the repeater station 54-1. The pump light source 71 in the backward pumping part 63-1 supplies a plurality of the pump lights corresponding to a plurality of the wavelength bands to the optical transmission line 52-1. Therefore, the optical signals with the plurality of the wavelength bands are subjected to Raman amplification by the plurality of the pump lights while transmitting through the optical transmission line 52-1.

The band detecting part 72 detects optical powers of the optical signals which are amplified by the pump light by each of the plurality of the wavelength bands. Then, the band detecting part 72 outputs its detection results to the band adjusting part 73.

The band adjusting part 73 adjusts the respective optical powers of the plurality of the pump lights so that the optical powers of the optical signals which are detected by each of the plurality of the wavelength bands fall within a predetermined fixed range, based on the detection results of the band detecting part 72.

The optical signals with the plurality of the wavelength bands outputted from the band detecting part 72 are made incident on a WDM coupler 64-1 and demultiplexed by each wavelength band. The demultiplexed optical signals are respectively made incident on optical amplifiers 65 and amplified therein. The amplified optical signals are made incident on a WDM coupler 66-1 and multiplexed therein to become the optical signals with the plurality of the wavelength bands again. The optical signals are sent out from the repeater station 54-1 to an optical transmission line 52-2.

The optical signals transmit through the optical transmission line 52-2 to be made incident on a backward pumping part 63-2 in the repeater station 54-2, and similarly to the above, the adjusted pump lights are supplied to the optical transmission line 52-1. Therefore, the optical signals are Raman-amplified by the plurality of the pump lights while transmitting through the optical transmission line 52-2.

The optical signals with the plurality of the wavelength bands outputted from the backward pumping part 63-2 are made incident on a WDM coupler 64-2 and demultiplexed by each wavelength band. The demultiplexed optical signals are respectively made incident on optical add/drop multiplexers (hereinafter abbreviated to "OADM") 67 from/to/through which the optical signals are branched/inserted/passed. The optical signals outputted respectively from the OADM 67 are made incident on a WDM coupler 66-2 and multiplexed therein to become the optical signals with the plurality of the wavelength bands again. The optical signals are sent out from the repeater station 54-2 to an optical transmission line 52-3.

The optical signals transmit through the optical transmission line 52-3 to be made incident on a WDM coupler 64-3 in the repeater station 54-3 and demultiplexed by each wavelength band. The demultiplexed optical signals are respectively made incident on optical amplifiers 65 and amplified therein. The amplified optical signals are respectively made incident on a WDM coupler 66-3 and multiplexed therein to become the optical signals with the plurality of the wavelength bands again. The optical signals are sent out from the repeater station 54-3 to the optical transmission line 52.

Similarly, the optical signals with the plurality of the wavelength bands are repeated through multiple stages, made incident on a backward pumping part 63-$j$ in the receiving station 53 from an optical transmission line 52-$h$, and the adjusted pump lights are supplied to the optical transmission line 52-$h$ as described above. Therefore, the optical signals are Raman amplified by the plurality of the pump lights while transmitting through the optical transmission line 52-$h$.

The optical signals with the plurality of the wavelength bands outputted from the backward pumping part 63-$j$ are made incident on a WDM coupler 64-8 and demultiplexed by each wavelength band. The demultiplexed optical signals are respectively received and processed by signal receiving parts 68.

The signal receiving part 68 is structured by including, for example, a WDM coupler for demultiplexing the optical signals by each wavelength, which are already demultiplexed by each wavelength band and a receiver for receiving and processing the optical signals.

Operation and Effects of the Second Embodiment

Experiments are carried out to find out how the respective optical powers of the plurality of the pump lights should be adjusted in order to keep the optical powers of the optical signals, which are detected by each of the plurality of the wavelength bands, within the predetermined fixed range, in the aforementioned optical communication system.

FIG. 6 shows the structure of an experimental system.
FIG. 7 shows the Raman amplification by each pump light in the case of an SMF.
FIG. 8 shows the Raman amplification by each pump light in the case of an NZ-DSF.
FIG. 9 shows the Raman amplification by optical power ratio of the respective pump lights.

The vertical axes of FIG. 7 and FIG. 8 show the optical power of the light outputted from the optical fiber, displayed in dBm, and the lateral axes thereof show the wavelength displayed in nm. The vertical axis of FIG. 9 shows the optical power displayed in dBm, and the lateral axis thereof shows the wavelength displayed in nm.

The experimental system will be explained.

In FIG. 6, optical signals which are generated in 32 transmitters (hereinafter abbreviated to "OS") 81 are made incident on a WDM coupler 83 and multiplexed therein. The respective wavelengths of the 32 optical signals which are generated in the OSs 81 are set to the C-band with intervals of 0.8 nm therebetween, in compliance with the ITU-T recommendation. Similarly, 32 OSs 82 and a WDM coupler 84 generate 32-wave WDM optical signals which are set to L-band with intervals of 0.8 nm therebetween. The 32-wave WDM optical signal of the C-band and the 32-wave WDM optical signal of the L-band are respectively amplified in optical amplifiers 86, 87. The amplified WDM optical signals are respectively made incident on a WDM coupler 88 and multiplexed therein to become the WDM optical signal with two wavelength bands. The WDM optical signal with the two wavelength bands is made incident on an optical fiber 89 in the length of 100 km. In this experiment, the experiments about the SMF and the NZ-DSF are carried out as the optical fiber 89.

Incidentally, the wavelengths of the C-band are from 1530 nm to 1570 nm and the wavelengths of the L-band are from 1570 nm to 1610 nm.

Meanwhile, respective laser lights outputted from two laser diodes (hereinafter abbreviated to "LD") 94 are multiplexed one another in a coupler 93 to be made incident on a WDM coupler 92. The laser light with the wavelength of 1430 nm are oscillated by the respective LDs 94. Similarly, respective laser lights with the wavelength of 1480 nm, which are outputted from LDs 96 are multiplexed one another in a coupler 95 to be made incident on the WDM coupler 92. The LDs 94, 96 are Fabry-Perot laser diodes whose wavelength is not stable. Hence, mode hopping and the like occur thereby.

The WDM coupler 92 multiplexes the laser light of 1430 nm and the laser light of 1480 nm. The multiplexed laser light is made incident on a WDM coupler 90 as the pump light including the two wavelengths.

The WDM optical signal with the two wavelength bands which is made incident on the optical fiber 89 is subjected to the Raman amplification while being supplied with the pump light with the two wavelengths through the WDM coupler 90 from the opposite end to the inputted end. The optical signals which are respectively set to the C-band are subjected to the Raman amplification mainly by the laser light of 1430 nm, and the optical signals which are respectively set to the L-band are subjected to the Raman amplification mainly by the laser light of 1480 nm.

After the Raman amplification, the WDM optical signal with the two wavelength bands is made incident on an optical spectrum analyzer (hereinafter abbreviated to "OSA") 91, and the spectrums of the optical signal is measured therein.

This experimental system simulates a relay block such as the transmitting station 51 to the repeater station 54-1, and the repeater station 54-1 to the repeater station 54-2. Further, the C-band and the L-band are set as the plurality of the wavelength bands. The LDs 94 and LDs 96 correspond to the pump light sources which supply the plurality of the pump lights, the OSA 91 corresponds to the band detecting part, and a drive circuit (not shown) for driving the LDs 94, 96 corresponds to the band adjusting part.

First, the SMF is used as the optical fiber 89, and the optical power of the optical signal when it is made incident on the optical fiber 89 is set to +5 dBm/channel, and the experiments are carried out by variously changing the channel number of the optical signals and supply conditions of the pump light. Hereinafter, the channel is abbreviated to "ch." The conditions are: the channel number is 64 and the pump light is supplied (●), the channel number is 64 and the pump light is not supplied (×), the channel number is 32 of the C-band and the pump light is supplied (▲), the channel number is 32 of the L-band and the pump light is supplied (■), the channel number is 1 and the pump light is supplied (◇), and the channel number is 1 and the pump light is not supplied(□). The pump light is oscillated by feeding a drive current of 800 mA to the LDs 94-1, 94-2, LDs 96-1, 96-2, respectively.

The results are shown in FIG. 7.

Next, the NZ-DSF is used as the optical fiber 89, and the optical power of the optical signal when it is made incident on the optical fiber 89 is set to +0 dBm/ch., and the experiments are carried out by changing the channel number of the optical signals and the supply conditions of the pump light. The conditions are: the channel number is 64 and the pump light is supplied (●), the channel number is 64 and the pump light is not supplied (×), the channel number is 32 of the C-band and the pump light is supplied (▲), the channel number is 32 of the C-band and the pump light is not supplied (⋇), the channel number is 32 of the L-band and the pump light is supplied (■), and the channel number is 32 of the L-band and the pump light is not supplied(cross-hatched ○). The pump light is oscillated by feeding the drive current of 800 mA to the LDs 94-1, 94-2, LDs 96-1, 96-2, respectively.

The results are shown in FIG. 8.

As is clear from FIG. 7 and FIG. 8, although the WDM optical signal with the two wavelength bands is amplified by the pump light in the optical fiber, the 32-wave WDM optical signal of the L-band is amplified to a larger extent than the 32-wave WDM optical signal of the C-band, which result in a deviation of the optical powers between the two. In other words, the deviation of the gain is caused between the wavelength bands.

This may be caused by wavelength dependency of the Raman gain coefficient and the fact that the optical signal on a short wavelength side functions as the pump light to the optical signal on a long wavelength side.

Next, experiments are carried out in order to eliminate the deviation of the gain between the wavelength bands.

In the experiments, the oscillation wavelength of the LDs 94 is changed to 1440 nm, the drive current fed to the LDs 94 is fixed to 800 mA, and meanwhile, the drive current fed to the LDs 96 is changed. The drive current is changed to 0 mA (×), 100 mA (♦), 200 mA (■), 300 mA (▲), 400 mA (⋇), 500 mA (●) and 600 mA (+). The NZ-DSF is used as the optical fiber 89 and the optical power of the optical signal when it is made incident thereon is set to +0 dBm/ch.

The results are shown in FIG. 9.

As is clear from FIG. 9, the deviation of the gain between the wavelength bands is kept to a minimum when the drive current of the LDs 96 is fixed to 300 mA, under the above-mentioned experimental system and experimental conditions.

Incidentally, the optical power of the pump light on the short wavelength side (optical power of the laser light outputted from the coupler 93) is +21.5 dBm, and the optical power of the pump light on the long wavelength side (optical power of the laser light outputted from the coupler 95) is +19.4 dBm.

Next, the SMF is used as the optical fiber 89, and the optical power of the optical signal when it is made incident thereon is set to +5 dBm/ch., and similar experiments are carried out. As this result, the deviation of the gain between the wavelength bands is minimized when the optical power of the pump light on the short wavelength side is +21.5 dBm and the optical power of the pump light on the long wavelength side is +20.4 dBm.

It should be noted that the oscillation wavelength of the LDs 94 is changed because the deviation of the gain between the wavelength bands become smaller in the case of 1440 nm than 1430 nm, although the experimental result is not shown. As is clear from FIG. 2, this may be because the characteristic curve is asymmetrical before/after the maximum value of the Raman gain coefficient.

As is clear from this experimental results, the deviation between the wavelength bands can be kept within the predetermined range which is required by the optical communication system, by adjusting the respective optical powers of the plurality of the pump lights in the band adjusting part 73 so that the optical powers of the optical signals which are detected by each of the plurality of the wavelength bands are kept within the predetermined range, based on the detection results which are detected by the band detecting part 72 by each wavelength band.

The current of 200 mA or 400 mA may be practically supplied without problems to the respective LDs 96 shown in FIG. 9, if the accuracy required for the optical communication system permits.

Incidentally, although the experiments are carried out based on the particular conditions, it is needless to say that the experiments can be carried out by changing its conditions according to the optical communication system.

Moreover, in the second embodiment, the respective optical powers of the plurality of the pump lights are subjected to feedback control based on the detection results of the band detecting part 72, but it is suitable to carry out experiments beforehand based on the type of the optical transmission line 52 between the stations, transmission distance and the optical power of the optical signal when it is made incident, similarly to the above, so that the optical powers of the respective pump lights are determined based on the experimental results to be set in the optical communication system during its initialization.

Further, the experiments are carried out beforehand by changing the type of the optical transmission line 52, the transmission distance and the optical power of the optical signal when its is made incident, similarly to the above, so that data including various patterns are prepared as a table. Then, a storing part in which the table is stored is provided in the backward pumping part 63, and information such as the transmission distance of the optical transmission line 52, the type of the optical fiber and a level diagram is provided to the backward pumping part 63, so that it selects the optical powers of the respective pump lights from the table.

Furthermore, theoretical calculation of the Raman amplification is possible without the experiments.

Preferred Embodiments of the Second Embodiment

In the optical communication system according to the second embodiment, the plurality of the wavelength bands are the C-band and the L-band, and the plurality of the pump lights preferably have the wavelengths of 1440 nm and 1485 nm.

When the plurality of the wavelength bands are the C-band and the L-band, the wavelengths of the respective pump lights are preferably 1440 nm and 1485 nm for the effective Raman amplification, in consideration of the wavelengths of the respective bands.

Moreover, in the optical communication system according to the second embodiment, the pump light source is the laser light source from which the laser lights with the wavelengths of 1440 nm, 1450 nm and 1485 nm are oscillated, and it is preferable to further include a controlling part, provided in the station in which the pump light source is provided, which controls the pump light source so that the laser light with the wavelength of 1450 nm is outputted when the optical signals in the C-band only are transmitted, the laser light with the wavelength of 1485 nm is outputted when the optical signals in the L-band only are transmitted, and the laser lights with the wavelengths of 1440 nm and 1485 nm are outputted when the optical signals in the C-band and the L-band are transmitted.

In consideration of the operation of the optical communication system, the optical signals in the C-band only may be transmitted, the optical signals in the L-band only may be transmitted or the optical signals in the C-band and the L-band may be transmitted. In such cases, the Raman amplification can be performed efficiently by changing the pumping wavelength on the short wavelength side, because the wavelength dependency of the Raman gain coefficient is asymmetrical.

Therefore, with the above structure, the wavelength of the pump light can be changed according to the operational condition of the optical communication system, thereby allowing to amplify the optical signals efficiently.

Next, another embodiment will be explained.

Structure of a Third Embodiment

The third embodiment relates to an optical communication system according to the present invention.

FIG. 10 shows the structure of the optical communication system according to the third embodiment.

In FIG. 10, the optical communication system includes a transmitting station 101 in which a WDM optical signal is generated, an optical transmission line 102 which transmits the generated WDM optical signal, and a receiving station 103 which receives and processes the transmitted WDM optical signal, and further, one or more repeater station 104 is provided at some midpoint in the optical transmission line 102, as necessary.

The repeater station 104 has, as will be later-described, a function of supplying pump light used for Raman amplification in the optical transmission line 102, a function of amplifying the optical signal inside its own station, an ADM (add/drop multiplexer) function for branching/inserting/passing the optical signal from/to/through the WDM optical signal, and the like, as necessary.

The transmitting station 101 is structured by including a plurality of OSs 111, a WDM coupler 112, an optical amplifier 113-1, and a forward pumping part 114-1.

The OS 111 generates an optical signal corresponding to each ch. of the WDM optical signal. For example, the OS 111 is structured by including an LD and an optical modulator. The LD emits laser light with a wavelength corresponding to each ch., and the laser light is externally modulated by the optical modulator according to information to be transmitted. Each of the channels is, for example, set to a predetermined wavelength band (band) with intervals of 0.8 mm or 0.4 mm therebetween, in compliance with the ITU-T recommendation.

The OSs 111 are prepared by the number corresponding to the number of ch. of the WDM optical signal, and in the case of the 32-wave WDM optical signal, for example, the 32 OSs are prepared.

The optical signals outputted from the respective OSs 111 are made incident on the WDM coupler 112, in which the wavelengths thereof are multiplexed to become the WDM optical signal. As the WDM coupler 112, for example, a dielectric multi-layered film filter which is one of interference filters, and an arrayed waveguide grating can be used.

The WDM optical signal outputted from the WDM coupler 112 is made incident on the optical amplifier 113-1 which amplifies the light. The optical amplifier 113-1 is a concentrated type optical amplifier and, for example, a laser diode amplifier, an optical fiber amplifier and the like are used.

The optical fiber amplifier is, for example, an optical fiber amplifier added with a rare earth element. The added rare earth element is selected according to the wavelength band to be amplified, and an erbium element is selected in the case of the wavelength band of 1550 nm. The erbium element is one of the rare earth elements of lanthanoid, whose elemental symbol is Er and atomic number is 68. The properties of the elements which belong to the lanthanoid are similar to each other. The rare earth elements which amplifies the other wavelengths are neodymium (Nd, 1060 nm wavelength band, 1300 nm wavelength band), praseodymium (Pr, 1300 nm wavelength band), thulium (Tm, 1450 nm wavelength band) and the like.

A lower limit value of an output optical level of the optical amplifier 113-1 is determined based on transmission loss, transmission distance and the like of an optical fiber 102-1 so that the WDM optical signal which is transmitted to a repeater station 104-1 on its subsequent stage can be recognized and recovered in the repeater station 104-1. An upper limit value of the output optical level of the optical amplifier 113-1 is determined based on the type of the optical transmission line 102-1 so that a nonlinear optical phenomenon does not occur in the optical communication line 102-1 to such an extent that the repeater station 104-1 on the subsequent stage cannot recognize and recover the WDM optical signal. This similarly applies to optical amplifiers 113-2, 113-3, 113-4, . . . , 113-$k$ which will be described later.

The WDM optical signal which is amplified in the optical amplifier 113-1 is made incident on the forward pumping part 114-1. In the forward pumping part 114-1, the wavelengths of the pump light for the Raman amplification and the WDM optical signal are multiplexed, and the pump light is outputted to the optical transmission line 102-1. Its structure will be described later with forward pumping parts 114-2, 114-3.

The WDM optical signal including the pump light which is outputted from the forward pumping part 114-1 is outputted to the optical transmission line 102-1 as the output from the transmitting station 101, and made incident on a backward pumping part 115-1 in the repeater station 104-1.

Meanwhile, in the backward pumping part 115-1 in the repeater station 104-1, the wavelengths of the pump light for the Raman amplification and the WDM optical signal are multiplexed, and the pump light is outputted to the optical transmission line 102-1. Its structure will be described later with backward pumping parts 115-2, 115-3, . . . 115-$j$.

The WDM optical signal sent out from the transmitting station 101 to the optical transmission line 102-1, is Raman-amplified in the optical transmission line 102 by the pump light supplied from the forward pumping part 114-1 in the transmitting station 101 and the pump light supplied from the backward pumping part 115-1 in the repeater station 104-1, and made incident on the backward pumping part 115-1 in the repeater station 104-1. Therefore, the WDM optical signal which transmits through the optical transmission line 102-1 is subjected to a bidirectional pumping.

The WDM optical signal outputted from the backward pumping part 115-1 is amplified to a predetermined optical level in the optical amplifier 113-2 as described above, and sent out from the repeater station 104-1 to an optical transmission line 102-2.

The WDM optical signal transmits through the optical transmission line 102-2 to be made incident on the backward pumping part 115-2 in a repeater station 104-2. In the backward pumping part 115-2, the wavelengths of the pump light for the Raman amplification and the WDM optical signal are multiplexed, and the pump light is outputted to the optical transmission line 102-2. Therefore, the WDM optical signal which transmits through the optical transmission line 102-2 is subjected to a backward pumping.

The WDM optical signal which is outputted from the backward pumping part 115-2 is made incident on an OADM 116. The OADM 116 branches/inserts/passes the optical signal from/to/through the WDM optical signal. The OADM 116 is structured by including, for example, a coupler, a filter and a WDM coupler. In thus-structured OADM, the WDM optical signal which is made incident thereon is made incident on the coupler in which the light is divided into two. One of the divided WDM optical signals is used for receiving and processing the optical signals to be branched, and the other is made incident on the filter. The filter rejects the optical signals which are branched/inserted from/to the WDM optical signal and the rejected WDM optical signal is made incident on the WDM coupler. In the WDM coupler, the optical signals which should be inserted to the rejected WDM optical signal are multiplexed.

The WDM optical signal which is outputted from the OADM 116 is sent out to an optical transmission line 102-3 as the output from the repeater station 104-2.

The WDM optical signal transmits through the optical transmission line 102-3 to be made incident on the backward pumping part 115-3 in a repeater station 104-3. In the backward pumping part 115-, the wavelengths of the pump light for the Raman amplification and the WDM optical signal are multiplexed, and the pump light is outputted to the optical transmission line 102-3. Therefore, the WDM optical signal which transmits through the optical transmission line 102-2 is subjected to the backward pumping.

The WDM optical signal which is made incident on the backward pumping part 115-3 is amplified to the predetermined optical level in the optical amplifier 113-3, as described above, and made incident on the forward pumping part 114-2. In the forward pumping part 114-2, the wavelengths of the pump light for the Raman amplification and the WDM optical signal are multiplexed, and the pump light is outputted to an optical transmission line 102-4.

The WDM optical signal which is outputted from the forward pumping part 114-1 is made incident on the optical transmission line 102-4 as the output from the repeater station 104-3.

The WDM optical signal transmits through the optical transmission line 102-4 to be made incident on the optical amplifier 113-4 in a repeater station 104-4. Therefore, the WDM optical signal which transmits through the optical transmission line 102-4 is subjected to a forward pumping. These are amplified to the predetermined optical level in the optical amplifier 113-4, as described above, and made incident on the forward pumping part 114-3. In the forward pumping part 114-3, the wavelengths of the pump light for the Raman amplification and the WDM optical signal are multiplexed, and the pump light is outputted to an optical transmission line 102-5.

Thus, the WDM optical signal is repeated through multiple stages by transmitting through the plurality of the repeater stations 104, and made incident on the backward pumping part 115-$j$ in the receiving station 103. The receiving station 103 is structured by including the backward pumping part 115-$j$, the optical amplifier 113-$k$, a WDM coupler 117 and receivers (hereinafter abbreviated to "OR") 118.

In the backward pumping part 115-$j$, the wavelengths of the pump light for the Raman amplification and the WDM optical signal are multiplexed, and the pump light is outputted to an optical transmission line 102-$h$.

The WDM optical signal which is outputted from the backward pumping part 115-$j$ are amplified to such an optical level that the ORs 118 can receive these, in the optical amplifier 113-$k$ as a post amplifier. The amplified WDM optical signal is made incident on the WDM coupler 11 and demultiplexed by each ch. The optical signals corresponding to each ch. are made incident on ORs 118-1 to 118-32, respectively. The ORs 118 receives and processes the signals which are made incident thereon, and removes information therefrom.

As is clear from the above description, the repeater station 104 may include either of the forward pumping part 114 or the backward pumping part 115, both of the forward pumping part 114 and the backward pumping part 115, or it may include neither of these.

Next, the structure of the forward pumping part will be explained.

FIG. 11 shows the structure of the forward pumping part according to the third embodiment.

In FIG. 1, the forward pumping part 114 is structured by including connectors 131, 134, couplers 132, 138, photodiodes (hereinafter abbreviated to "PD") 135, 136, 137, 139, analog/digital converters (hereinafter abbreviated to "A/D") 140, 141, 142, 144, a light source 143, a memory 145, a central processing unit (hereinafter abbreviated to "CPU") 146 and a control signal circuit 147.

The WDM optical signal which are made incident on the forward pumping part 114 is made incident on the coupler 132 through the connector 131 which optically connects between optical circuits. The coupler 132 is an optical component which divides the light being made incident thereon into two and outputs these, which also applies to the other couplers, similarly. As the coupler, for example, a microoptic optical branching and coupling unit such as a half mirror can be used.

One of the WDM optical signals which are divided in the coupler 132 is made incident on the WDM coupler 133, and the other WDM optical signal is made incident on the PD 136. The PD 136 is a photoelectric converter, and generates a current corresponding to the optical power of the received light. This applies to the other PDs. The output from the PD 136 is inputted into the A/D 141. The A/D 141 converts the input from analog to digital and outputs it, similarly to the other A/Ds. The output from the A/D 141 is inputted into the CPU 146.

Eight-wave laser lights with the different wavelengths from each other can be oscillated by the light source 146, and a predetermined laser light of one wavelength is outputted out of these, based on the signal from the CPU 146. This laser light is the pump light used for Raman amplification in the optical transmission line 102, which will be referred to as pump laser light, hereinafter. The outputted pump laser light is made incident on the coupler 138. The pump laser light is divided in the coupler 138 and one of these is made incident on the WDM coupler 133 and the other is made incident on the PD 139. The PD 139 performs photoelectric conversion of the pump laser light, and its output is inputted through the A/D 144 into the CPU 146.

The WDM coupler 133 is an optical multiplexer/demultiplexer which multiplexes and demultiplexes the light with the two wavelength bands, and a wavelength which divides the wavelength bands (corresponding to a reject frequency) is designed between the wavelength band of the WDM optical signal and the wavelength of the pump laser light. In the WDM coupler 133, the wavelengths of the WDM optical signal outputted from the coupler 132 and the pump laser light outputted from the coupler 138 are multiplexed. The WDM optical signal which is multiplexed with the pump laser light is outputted from the connector 134 as the output from the forward pumping part 114.

Meanwhile, when the connector 134 is not connected to the optical transmission line 102 and when the optical transmission line 102 has a break near the connector 134, the pump laser light and the WDM optical signal are reflected.

The reflected pump laser light is made incident on the PD 137 through the WDM coupler 133 and the coupler 138. The PD 137 performs the photoelectric conversion of the reflected pump laser light, and its output is inputted into the CPU 146 through the A/D 142.

The memory 145 is connected to the CPU 146, and an optical damage testing program, a drive current value and element temperature for outputting an excited laser of a level P1, a drive current value and element temperature for outputting an excited laser of a level P2, allowances of an output Outpls1 and an output Outpls2, a corresponding table of the pump light number and the pump light wavelength, a drive current value and element temperature by each wavelength λ1 to λ8, predetermined values for detecting the disconnection of the optical transmission line 102 from the connectors 131, 134 and the like are stored therein as will be described later.

The control signal circuit 147 is connected to the CPU 146 and carries out bidirectional communications of a control signal with the other stations over a control line 106. The control signal includes information necessary for operating the optical communication system, such as a selection variable, the optical power of residual pump light, the ch. number of the transmitted WDM optical signal, maintenance information and state monitor.

Next, the structure of the backward pumping part 115 will be explained.

FIG. 12 shows the structure of the backward pumping part according to the third embodiment.

In FIG. 12, the backward pumping part 115 is structured by including connectors 151, 154, a coupler 156, PDs 155, 157, 158, A/Ds 159, 161, 162, a light source 160, a memory 163, a CPU 164 and a control signal circuit 165.

The WDM optical signal which is made incident on the backward pumping part 115 is made incident on the coupler 153 through the connector 151 which optically connects between optical circuits and the WDM coupler 152.

One of the WDM optical signals which are divided in the coupler 153 is outputted through the connector 154 as the output, and the other WDM optical signal is made incident on the PD 158. The PD 136 performs the photoelectric conversion of the WDM optical signal, and its output is inputted through the A/D 162 into the CPU 164.

Meanwhile, eight-wave laser lights with the different wavelengths from each other can be oscillated by the light source 160, and a predetermined laser light of one wavelength is outputted out of these, based on the signal from the CPU 164. The outputted pump laser light is made incident on the coupler 156. The pump laser light is divided in the coupler 156 and one of these is made incident on the WDM coupler 152 and the other is made incident on the PD 157. The PD 157 performs the photoelectric conversion of the pump laser light, and its output is inputted through the A/D 161 into the CPU 164.

The WDM coupler 152 is an optical multiplexer/demultiplexer which multiplexes and demultiplexes the light with the two wavelength bands, and a wavelength which divides the wavelength bands (corresponding to a reject frequency) is designed between the wavelength band of the WDM optical signal and the wavelength of the pump laser light. The WDM coupler 152 outputs the pump laser light which is outputted from the coupler 156 to the connector 151.

Meanwhile, when the connector 151 is not connected to the optical transmission line 102 and when the optical transmission line 102 has a break near the connector 151, the pump laser light is reflected.

The reflected pump laser light is made incident on the PD 155 through the WDM coupler 152 and the coupler 156. The PD 155 performs the photoelectric conversion of the reflected pump laser light, and its output is inputted into the CPU 164 through the A/D 159.

Incidentally, in order to detect the disconnection of the connector 154 to the optical transmission line 102 and the like, it is suitable to provide the PD and the A/D so that the PD receives the reflected WDM optical signal and its output is inputted into the CPU 164 through the A/D.

The memory 163 is connected to the CPU 164, and an optical damage testing program, a drive current value and element temperature for outputting an excited laser of a level P1, a drive current value and element temperature for outputting an excited laser of a level P2, allowances of an output Outpls1 and an output Outpls2, a corresponding table of the pump light number and the pump light wavelength, a drive current value and element temperature by each wavelength λ1 to λ8, predetermined values for detecting the disconnection of the optical transmission line 102 from the connectors 151, 154 and the like are stored therein as will be described later.

The control signal circuit 165 is connected to the CPU 164 and carries out the bidirectional communications of the control signal with the other stations over the control line 106.

Operation and Effects of the Third Embodiment

Next, the operation and the effects of the aforementioned optical communication system will be explained.

First, in order to test the optical damage, the WDM optical signal having appropriate optical power is transmitted from the transmitting station 101 and the optical damage testing program is started in the CPU 164 by an operator, when the optical communication system is installed and the pump laser light is supplied to the optical transmission line for the Raman amplification.

It should be mentioned that the appropriate optical power has such a level that the WDM optical signal can be detected in the respective stations when the pump laser light of the level P1 is supplied to the optical transmission line 102, as will be described later.

The CPU reads the optical damage-testing program which is stored in the memory 163, and operates as follows based on the program.

FIG. 13 shows the time variation of the optical power of the pump laser light in the optical damage test.

In FIG. 13, the CPU 164 makes the light source 160 emit the light for an adequately long time, compared with a frequency of relaxation oscillation of the LD inside the light source 160, and supplies the pump laser light to the optical transmission line 102. This is because of the possibility of an occurrence of excessive vibration of the optical power of the laser light and a breakage of the LD, if the light is suddenly emitted.

The CPU 164 controls the light source 160 so that the pump laser light is outputted at the level P1, for example, the optical power of about 10 dBm, which is lower enough than the optical damage levels of the connector 151 and the optical transmission line 102.

Further, the optical power of the WDM optical signal is detected in this case of the level P1, and the detection result is kept therein. That is, the CPU 164 receives the output from the PD 158 through the A/D 162, and stores the output Outpls1 in the memory 163.

The CPU 164 changes the level of the light source to a maximum output level Pmax. The maximum output level Pmax is the level larger than the optical power of an output level Pnom during the normal operation.

Incidentally, the optical power for testing the optical damage is the maximum output level Pmax in this embodiment, but it is suitable as long as its optical power is larger than the optical power during the normal operation. This is because the objective for the test is achieved when it is confirmed that the optical damage does not occur by the optical power of the normal operation.

The CPU 164 drives the light source 160 at the maximum output level Pmax for an adequately long time for an occurrence of the optical damage, that is, for several seconds. The CPU 164 drives the light source at the level P1 again. Then, the optical power of the WDM optical signal at the level P1 is detected and the detection result is stored therein.

Namely, the CPU 164 receives the output from the PD 158 through the A/D 162, and stores the output Outpls2 into the memory 163.

The CPU 164 compares the output Outpls1 with the Outpls2 which are stored in the memory 163.

After the comparison, the CPU 164 determines that the optical damage does not occur when the output Outpls1 and the Outpls2 are equal to each other within the range of the allowance, displays to that effect and completes the program.

Meanwhile, after the comparison, the CPU 164 determines that the optical damage occurs when the output Outpls1 and the Outpls2 are beyond the range of the allowance, gives a warning to that effect, and completes the program (broken line in FIG. 13). When the determination is made by, for example, subtracting the output Outpls1 from the output Outpls2, it will be a negative value which is larger than a value obtained by subtracting the allowance from 0, when the optical damage occurs. Further, when the determination is made by, for example, calculating a ratio between the output Outpls1 and the output Putpls2 (output Outpls2/output Outpls1), it will be a smaller value than a value obtained by subtracting the allowance from 1, when the optical damage occurs. This is because the optical power of the WDM optical signal is lost at the point of the optical damage, when the optical damage occurs.

Thus, according to the optical communication system of the third embodiment, the optical damage during the normal operation can be avoided by causing the possible optical damage to occur before starting the Raman amplification.

It should be noted that, in the case of the forward pumping, the optical damage can be tested similarly to the above when the structure for detecting the optical power of the WDM optical signal, for example, the structure of the coupler 153, the PD 158 and the A/D 162 as shown in FIG. 12 is provided in the station on the subsequent stage, and the CPU 146 receives the optical power of the WDM optical signal on the subsequent stage by using the control line through the control signal circuit 147.

Next, the wavelengths of the pump lights which are supplied from each forward pumping part 114 and each backward pumping part 115 will be explained.

First, a plurality of the wavelengths, for example, the eight wavelengths are set for the pump light. As in the explanation of the first embodiment, the eight wavelengths are set so that the wavelength band of the WDM optical signal almost matches with a range with large Raman gain coefficients, and a maximum value of the Raman gain coefficient by a fourth wavelength $\lambda 4$ almost matches with a center wavelength of the wavelength band of the WDM optical signal. The intervals between the respective wavelengths $\lambda 1$ to $\lambda 8$ are set fixedly.

Further, as shown in FIG. 14($a$), the pump light number is allocated to the eight wavelengths and the corresponding table of the pump light number and the pump light wavelength is prepared.

As the optical communication system starts its operation, the wavelengths of the respective pump lights are selected as follows.

Namely, in the following explanation, numerical subscripts, which are the same with those, added to the numerals of the forward pumping parts and the backward pumping parts are added in order to distinguish the components. For example, the CPU 164 of the backward pumping part 115-2 in the repeater station 104-2 is represented as CPU 164-2 by adding the subscript "-2" which is the same with the subscript "-2" being added to the numeral "115" of the backward pumping part 115-2.

First, the CPU 146-1 in the forward pumping part 114-1 divides a value which is the selection variable added with 1 by 8 which is the number of the pump light wavelength, and finds its remainder. The CPU 146-1 refers to the corresponding table of the pump light number and the pump light wavelength, and selects the pump light wavelength corresponding to the pump light number which is the same with the remainder.

It should be mentioned that the selection variable is a variable prepared for selecting the pump light number, and, for example, 0 is set as its initial value.

Accordingly, the CPU 146-1 divides 1, as the value 0 plus 1, by 8, and since its remainder is 1, it refers to the corresponding table to select the pump light wavelength $\lambda 1$ which corresponds to the pump light number 1.

The CPU 146-1 transmits the selection variable to the CPU 164-1 in the repeater station 104-1 on the subsequent stage through the control signal circuit 147-1, the control line and the control signal line 165-1.

Further, the CPU 164-1 in the backward pumping part 115-1 divides a value which is the selection variable added with 1 by 8 which is the number of the pump light wavelengths, and finds its remainder. The CPU 164-1 refers to the corresponding table of the pump light number and the pump light wavelength, and selects the pump light wavelength corresponding to the pump light number which is the same with the remainder.

Accordingly, since the transmitted value of the selection variable is 1, the CPU 164-1 divides 2, as the value 1 plus 1, by 8, and since its remainder is 2, it refers to the corresponding table to select the pump light wavelength λ2 which corresponds to the pump light number 2.

The CPU 164-1 transmits the selection variable to CPU 164-2 in the repeater station 104-2 on the subsequent stage through the control signal circuit 165-1, the control line 106 and the control signal line 165-2.

Similarly to the above, the selection variables are transmitted through the control signal circuits 147,165 and the control line 106 to the CPU 146 in the forward pumping part 114 and the CPU 164 in the backward pumping part 115, and the respective CPUs 146, 164 divide the values which are the selection variables added with 1 by 8 which is the number of the pump light wavelengths, and find its remainders. The CPU 146-1 refers to the corresponding table of the pump light number and the pump light wavelength, and selects the pump light wavelengths corresponding to the pump light numbers which are the same with the remainders.

Thus, the wavelengths of the pump lights of the forward pumping parts 114 and the backward pumping parts 115 which are provided in the respective stations are determined. The forward pumping parts 114 and the backward pumping parts 115 respectively supply the pump lights with the determined wavelengths to the optical transmission line 102. Focusing on an optical signal in the WDM optical signal, the signal is Raman amplified with the various gains while being transmitted from the transmitting station 101 to the receiving station 113. Hence, even though the signal is amplified with the Raman gain coefficient of the local minimum value by pump light supplied from a station, it is amplified with the Raman gain coefficient with the maximum value by pump light supplied from another station. For this reason, the optical powers of the respective optical signals in the WDM optical signal which are Raman amplified are almost equalized while being transmitted from the transmitting station 101 to the receiving station 113.

Incidentally, in the third embodiment, the pump light numbers are allocated in decreasing order of the pump light wavelengths, but these may be allocated on a random basis as shown in FIG. 14(*b*).

Further, in the third embodiment, the explanation is made about the case in which the number of the pump light wavelengths is eight, which is not restrictive. Any number of the wavelengths is suitable.

In the case of the two wavelengths, which is the minimum number thereof, one wavelength is set so that a wavelength with a first maximum value of the Raman gain which occurs by the pump light with this wavelength almost matches with a wavelength with a first local minimum value after the maximum value of the Raman gain which occurs by the pump light with the other wavelength. The forward pumping parts 114 and the backward pumping parts 115 respectively give notices of the wavelengths selected by themselves to the forward pumping parts 114 and the backward pumping parts 115 on the subsequent stages, and select the two wavelengths by turns.

Moreover, in the third embodiment, the CPUs 146, 164 select the pump light wavelength by the above calculation using the selection variable, but it is suitable to generate a random number in a range of the pump light number and to select the pump light wavelength corresponding to the random number in the forward pumping parts 114 and the backward pumping parts 115, respectively.

In this case, when the number of the prepared pump light wavelengths is the same with the number of the forward pumping parts 114 and the backward pumping parts 115, the CPUs 146, 164 give notices of the pump light number selected by themselves to the other stations through the control signal circuits 147,165 and the control line so that the repeated selection of the pump light wavelengths can be prevented.

Further, in this case, when the number of the prepared pump light wavelengths is less than the number of the forward pumping parts 114 and the backward pumping parts 115, an upper limit variable which shows the upper limit of the repeated selection of the pump light wavelength is provided, and the CPUs 146, 164 give notices of the upper limit variable to the other stations by subtracting 1 from the upper limit variable which corresponds to the pump light wavelength selected by themselves, which makes it possible to allocate uniformly the wavelengths of the pump light to the respective forward pumping parts 114 and the backward pumping parts 115.

Furthermore, in the third embodiment, the intervals between the wavelengths of the respective pump lights are fixed, which is not restrictive. The wavelengths of the respective pump lights may be set to vary according to statistical distribution such as normal distribution.

Next, operation and effects of the forward pumping part 114 and the backward pumping part 115 detecting the disconnection of the optical transmission line 102 from the connectors 131, 134, 151 will be explained.

First, the CPU 146 in the forward pumping part 114 monitors the output from the PD 136, and determines that the optical communication line is disconnected from the connector 131 when the output which is higher than a predetermined value is not inputted therein. When the optical transmission line is disconnected from the connector 131, the WDM optical signal which is made incident on the forward pumping part 114 is not received in the PD 136, and hence the output from the PD 136 becomes markedly low in value. Meanwhile, when the optical communication line is connected to the connector 131 and the WDM optical signal is made incident thereon, the output from the PD 136 becomes high in value, because the WDM optical signal is made incident on the PD 136.

Therefore, by setting the predetermined value as a threshold and distinguishing whether the output is higher than the predetermined value or not, the CPU 146 can detect the disconnection of the optical transmission line from the connector 131.

Further, the CPU 146 in the forward pumping part 114 detects the output from the PD 137 and determines that the optical transmission line is disconnected from the connector 134 when the output which is higher than the predetermined value is inputted therein.

When the optical transmission line is disconnected from the connector 134, the pump laser light is reflected by the connector 134 and the PD 135 receives the reflected pump laser light through the WDM coupler 133 and the coupler 138. Thus, the output from the PD 137 becomes high in value. Meanwhile, when the optical transmission line is connected to the connector 134, the PD 137 does not receive the pump laser light since the reflection does not occur, and hence the output from the PD 137 becomes markedly low in value.

Therefore, by setting the predetermined value as the threshold and distinguishing whether the output is higher than the predetermined value or not, the CPU 146 can detect the 110 disconnection of the optical transmission line from the connector 134.

As described above, when the determination is made that the optical transmission line is disconnected from the connectors 131,134, the CPU 146 inhibits the light source 143 from outputting the pump laser light. Thus, it is possible to keep the operator from being exposed to the pump laser light.

Incidentally, the disconnection of the optical transmission line from the connector 134 may be detected by providing the PD 135 and the A/D 140 as shown in the broken line in FIG. 11. The WDM optical signal which is reflected by the connector 134 is made incident on the PD 135 through the WDM coupler 133 and the coupler 132. Then, the PD 135 performs the photoelectric conversion of the reflected WDM optical signal, and its output is inputted through the A/D 140 into the CPU 146.

Therefore, the CPU 146 in the forward pumping part 114 monitors the output from the PD 135 and determines that the optical transmission line is disconnected from the connector 134 when the output which is higher than the predetermined value is inputted therein. When the optical transmission line is disconnected from the connector 134, the WDM optical signal is reflected by the connector 134 and the PD 135 receives the reflected WDM optical signal through the WDM coupler 133 and the coupler 132. Thus, the output from the PD 135 becomes high in value. Meanwhile, when the optical transmission line is connected to the connector 131, the PD 135 does not receive the WDM optical signal since the reflection does not occur, and hence the output from the PD 135 becomes markedly low in value.

Therefore, by setting the predetermined value as the threshold and distinguishing whether the output is higher than the predetermined value or not, the CPU 146 can detect the disconnection of the optical transmission line from the connector 134.

Meanwhile, the CPU 146 in the backward pumping part 115 monitors the output from the PD 155 and determines that the optical transmission line is disconnected from the connector 151 when the output higher than the predetermined value is inputted therein. When the optical transmission line is disconnected from the connector 151, the pump laser light is reflected by the connector 151 and the PD 155 receives the reflected pump laser light through the WDM coupler 152 and the coupler 156. Thus, the output from the PD 137 becomes high in value. Meanwhile, when the optical transmission line is connected to the connector 151, the PD 155 does not receive the pump laser light since the reflection does not occur, and hence the output from the PD 155 becomes markedly low in value.

Therefore, by setting the predetermined value as the threshold and distinguishing whether the output is higher than the predetermined value or not, the CPU 164 can detect the disconnection of the optical transmission line from the connector 151.

When the determination is made that the optical transmission line is disconnected from connector 151, the CPU 164 inhibits the light source 160 from outputting the pump laser light. Thus, it is possible to keep the operator from being exposed to the pump laser light.

As described above, the optical communication system carries out the optical damage testing, the selection of the pump light wavelengths and the check of the connector disconnection, and when anomaly is not found, it supplies the pump laser light to the optical transmission line 102 to start the Raman amplification.

Normally, the optical components such as the optical amplifier detect the optical powers of the input side, output side or the both, and control the gain and the output level based on the detection results. Further, the optical components such as the optical amplifier detect the reflected light of the light which is outputted to the output side so as to detect that the other optical components are not connected thereto. In the third embodiment, the pump light which is outputted from the forward pumping parts 114 and the backward pumping parts 115 may be made incident on the optical components without being attenuated sufficiently by the Raman amplification and the transmission loss in the optical transmission line 102. In such cases, the optical components may malfunction concerning the gain, the output level, the detection of the disconnection and the like.

Hence, in the case of the forward pumping with the residual pump light, an optical filter (hereinafter abbreviated to "FIL") which rejects the pump light and passes the WDM optical signal therethrough is connected to the optical transmission line 102 in the repeater station on the subsequent stage. For example, as shown in FIG. 10, a FIL 119-2 is connected between the optical transmission line 102-4 and the optical amplifier 113-4 so that the pump laser light which is outputted from the forward pumping part 114-2 in the repeater station 104-3 is not made incident on the optical amplifier 113-4.

Meanwhile, in the case of the backward pumping with the residual pump light, the FIL which rejects the pump light and passes the WDM optical signal therethrough is connected to the optical transmission line 102 in the repeater station on the preceding stage. For example, as shown in FIG. 10, a FIL 119-1 is connected between the optical transmission line 102-2 and the optical amplifier 113-2 so that the pump laser light which is outputted from the backward pumping part 115-2 in the repeater station 104-2 is not made incident on the optical amplifier 113-2. The reject frequency of the FIL 119 like this is designed between the wavelength band of the WDM optical signal and the pump laser light.

Further, in the third embodiment, it is suitable to detect the optical power of the residual pump light which is reflected by the FIL and use it for the detection of the presence or absence of the pump light and the adjustment of the optical power of the pump light.

FIG. 15 shows the structure of the repeater station which includes the residual pump light detecting part according to the third embodiment.

In FIG. 15, the WDM optical signal which has transmitted through the optical transmission line 102 transmits through the connector 151, the backward pumping part 115, a WDM coupler 171, an erbium-doped optical fiber (hereinafter abbreviated to "EDF") 172, a WDM coupler 173, a FIL 174 and the connector 154 to be sent out to the optical transmission line 102 to be transmitted to the subsequent stage.

Moreover, the LD 176 supplies the laser light which excites the EDF 172 through the WDM coupler 171, and the LD 177 supplies the laser light which excites the EDF 172 through the WDM coupler 173. The EDF 172 is excited from both directions and performs centralized amplification of the WDM optical signal.

Meanwhile, the pump laser light for the Raman amplification which is supplied from the station on the subsequent stage propagates through the optical transmission line 102 to be made incident on the FIL 174 through the connector 154, as the residual pump light.

The residual pump light is reflected by the FIL 174 and made incident on the PD 175. The residual pump light is subjected to the photoelectric conversion by the PD 175 and its output is inputted in the CPU 164 through the A/D 178. The reject wavelength of the FIL 174 is designed between the wavelength band of the WDM optical signal and the pump laser light.

It should be noted that, since the components of the backward pumping part 115 in this repeater station and the components of the backward pumping part 115 in the station on the subsequent stage are the same, "-a" is added to the numerals for the components of this repeater station, and "-b" is added to the numerals for the components of the station on the subsequent stage, for distinction.

The CPU 164-a sends out the output from the PD 175 which is inputted therein to the CPU 164-b through the control signal circuit 165-a and the control signal circuit 165-b.

A value of the residual pump light during the normal operation and a corresponding table of the optical power of the residual pump light and the optical power of the optimal pump light are added to storage contents of the memory 163-b in the backward pumping part 115-b on the subsequent stage. This corresponding table is a table which decides the optical powers of the Raman amplification and the pump light, in consideration of the splice loss of the optical transmission line 102.

The CPU 164-b compares the received value with the value of the residual pump light in the normal operation, which is stored in the memory 163-b, and when the received value is smaller, it judges occurrence of anomaly in the optical transmission line 102 or a disconnection of the connector, and stops the light source 160-b from supplying the excited laser.

Thus, controlling the light source 160-b prevents the operator who works with the optical communication system from being exposed to the excited laser.

Meanwhile, when the received value is larger, the CPU 164-b refers to the corresponding table based on the received value, and adjusts the pump laser light optimally. Being controlled as above, the optical communication system can measure the splice loss of the optical transmission line 102 to adjust the optical power of the pump laser light.

This kind of repeater station can be used instead of, for example, the repeater station 104-1 shown in FIG. 10.

A case of the backward pumping has been described above, but it can be applied to the forward pumping. In this case, it is suitable that the structure of the FIL 174, the PD 175 and the A/D 178 which detects the residual pump light is provided in the station opposing to the station from which the pump light is supplied, and the detection result is received through the control signal circuit. For example, the structure which detects the residual pump light is provided in the repeater station 104-4 shown in FIG. 10, and the forward pumping part 114-2 in the repeater station 104-3 receives the detection result.

Meanwhile, in the above explanation, the CPUs 146, 164 determine whether the optical transmission line 102 is disconnected from the connectors 134, 151 or not by monitoring the reflected pump light. In the case of the bidirectional pumping with smaller wavelength intervals between the respective pump lights as the optical transmission line 102-1 in FIG. 10, it may be sometimes difficult to separate the reflected pump light of the pump light which is supplied from its own station from the residual pump light of the pump light which is supplied from the station opposing to itself. In this case, it is preferable to use the forward pumping part 117 and the backward pumping part 118 as shown in FIG. 16 in the optical communication system.

FIG. 16 shows the structure when a low frequency is superimposed on the pump light according to the third embodiment.

In FIG. 16, the forward pumping part 117 is structured by including connectors 131, 134, a coupler 138, a WDM coupler 133, band-pass filters (hereinafter abbreviated to "BPF") 180, 181, 182, PDs 137, 139, A/Ds 183, 184, 186, a light source 185, a memory 187, a CPU 188 and a control signal circuit 147.

The WDM optical signal which is made incident on the forward pumping part 117 is sent out to the optical transmission line 102 through the connector 131, the WDM coupler 133 and the connector 134.

Meanwhile, eight-wave laser lights with the different wavelengths from each other can be oscillated by the light source 185, and predetermined laser light of one wavelength is outputted out of these, based on the signal from the CPU 188. Further, the light source 185 directly modulates the intensity of the pump laser light with a small amplitude of a low frequency f1. When it is modulated with the large amplitude, the Raman amplification becomes less stabilized because the gain of the Raman amplification depends on the optical power of the pump light, and hence it is modulated with the small amplitude. The outputted pump laser light is made incident on the coupler 138. The pump laser light is divided in the coupler 138 and one of these is made incident on the WDM coupler 133 and the other is made incident on the PD 139. The PD 139 performs the photoelectric conversion of the pump laser light, and its output is inputted into the CPU 188 through the BPF 182 and the A/D 186. A cut-off frequency of a pass band of the BPF 182 is set so that the frequency f1 passes therethrough and a frequency f2 is rejected therefrom.

The WDM coupler 133 is an optical multiplexer/demultiplexer, and a wavelength which divides the wavelength bands is designed between the wavelength band of the WDM optical signal and the wavelength of the pump laser light. The WDM coupler 133 multiplexes the wavelengths of the WDM optical signal and the pump laser light.

Meanwhile, when the connector 134 is not connected to the optical transmission line 102 and the like, the pump laser light and the WDM optical signal are reflected.

The reflected pump laser light is made incident on the PD 137 through the WDM coupler 133 and the coupler 138. The PD 137 performs the photoelectric conversion of the reflected pump laser light, and its output is inputted into the CPU 188 through the BPF 180 and the A/D 183. Further, the output from the PD 137 is inputted into the CPU 188 through the BPF 181 and the A/D 184. A cut-off frequency of a pass band of the BPF 180 is set so that the frequency f2 passes therethrough and the frequency f1 is rejected therefrom.

Further, the cut-off frequency of the pass band of the BPF 181 is set identically to the BPF 182.

The memory 187 is connected to the CPU 188, and an optical damage testing program, a drive current value and element temperature for outputting an excited laser of a level P1, a drive current value and element temperature for outputting an excited laser of a level P2, allowances of an output Outpls1 and an output Outpls2, a corresponding table of the pump light number and the pump light wavelength, drive current values and element temperature by each wavelength λ1 to λ8, the frequencies f1, f2, a predetermined value for detecting the disconnection of the optical transmission line from the connector 134 and the like are stored therein.

The control signal circuit 147 is connected to the CPU 188 and carries out bidirectional communications of the control signals over the control line 106 with the other stations.

Moreover, the backward pumping part 118 is structured by including connectors 151, 154, a coupler 156, a WDM coupler 152, PDs 155, 157, 158, BPFs 191, 192, 193, A/Ds 194, 195, 197, a light source 196, a memory 198, a CPU 199 and a control signal circuit 165.

The WDM optical signal which is made incident on the backward pumping part 118 from the optical transmission line 102 is made incident on the coupler 153 through the connector 151 and the WDM coupler 152.

The WDM optical signal is divided in the coupler 153 and one of these is outputted as the output through the connector 154 and the other is made incident on the PD 158. The PD 158 performs the photoelectric conversion of the WDM optical signal, and its output is inputted into the CPU 199 through the A/D 162.

Meanwhile, eight-wave laser lights with the different wavelengths from each other can be oscillated by the light source 196, and predetermined laser light of one wavelength is outputted out of these, based on the signal from the CPU 199. Further, the light source 196 directly modulates the intensity of the pump laser light with a small amplitude of a low frequency f2. The outputted pump laser light is made incident on the coupler 156. The pump laser light is divided in the coupler 156 and one of these is made incident on the WDM coupler 152 and the other is made incident on the PD 157. The PD 157 performs the photoelectric conversion of the pump laser light, and its output is inputted into the CPU 199 through the BPF 193 and the A/D 197.

The WDM coupler 152 is an optical multiplexer/demultiplexer, and a wavelength which divides the wavelength bands is designed between the wavelength band of the WDM optical signals and the wavelength of the pump laser light. The WDM coupler 152 outputs the pump laser light to the optical transmission line 102 through the connector 151.

Meanwhile, when the connector 151 is not connected to the optical transmission line 102 and the like, the pump laser light is reflected.

The reflected pump laser light is made incident on the PD 155 through the WDM coupler 152 and the coupler 156. The PD 155 performs the photoelectric conversion of the reflected pump laser light, and the output is inputted into the CPU 199 through the BPF 191 and the A/D 194. Further, the output from the PD 155 is inputted into the CPU 199 through the BPF 192 and the A/D 195. A cut-off frequency of a pass band of the BPF 191 is set so that the frequency f2 passes therethrough and the frequency f1 is rejected therefrom. Further, the cut-off frequency of the pass band of the BPF 192 is set identically to the BPF 193.

The memory 198 is connected to the CPU 199, and an optical damage testing program, a drive current value and element temperature for outputting an excited laser of a level P1, a drive current value and element temperature for outputting an excited laser of a level P2, allowances of an output Outpls1 and an output Outpls2, a corresponding table of the pump light number and the pump light wavelength, a drive current value and element temperature by each wavelength λ1 to λ8, the frequencies f1, f2, predetermined values for detecting the disconnection of the optical transmission line from the connectors 151, 154 and the like are stored therein.

The control signal circuit 165 is connected to the CPU 199 and carries out bidirectional communications of the control signals over a control line 106 with the other stations.

Incidentally, the above-described forward pumping part 117 and the backward pumping part 118 superimpose the low frequencies f1, f2 by directly modulating the light sources 185, 196, but the low frequency may be superimposed by using external modulators 189, 200 as shown in the broken lines. The external modulators are, for example, a magnetooptical modulator, an electric field absorption type optical modulator and the like.

In thus-structured forward pumping part 117, the CPU 188 receives the output from the BPF 182 and the BPF 181, which corresponds to the low frequency f1 being superimposed on the pump light supplied from its own station, and receives the output from the BPF 180, which corresponds to the low frequency f2 being superimposed on the pump light supplied from the opposing station. Therefore, the CPU 188 can distinguish whether the laser light which is received in the PD 137 is the reflected pump laser light or the residual pump laser light, by comparing the respective outputs from the BPF 180 and the BPF 181, with reference to the output from the BPF 182. Thus, the reflected pump laser light can be surely detected, and hence the CPU 188 can surely inhibit the operation of the light source 185 and protect the operator from being exposed to the pump laser light.

Moreover, in the backward pumping part 118, the CPU 199 receives the output from the BPF 193 and the BPF 191, which corresponds to the low frequency f2 being superimposed on the pump light supplied from its own station, and receives the output from the BPF 192, which corresponds to the low frequency f1 being superimposed on the pump light supplied from the opposing station. Therefore, the CPU 199 can similarly distinguish whether the laser light which is received in the PD 155 is the reflected pump laser light or the residual pump laser light, and hence the CPU 199 can surely inhibit the operation of the light source 196 and protect the operator from being exposed to the pump laser light.

Incidentally, in the third embodiment, the control signal is communicated bidirectionally between the control signal circuits 147, 165 by using the control line 106 which is an exclusive physical line besides the optical transmission line 102, but this is not restrictive. For example, the optical communication system may further include an optical signal for the control signal and transmits the optical signal through the optical transmission line 102 by multiplexing it to the WDM optical signal. Further, the optical communication system may sends the information of the control signal by using an undefined area in an overhead of SDH (synchronous digital hierarchy).

Structure of a Fourth Embodiment

The fourth embodiment relates to an optical communication system according to the present invention.

The optical communication system according to the fourth embodiment includes, similarly to the optical communication system shown in FIG. 5, a transmitting station in which a WDM optical signal with two wavelength bands is generated, an optical transmission line which transmits the optical signal sent out from the transmitting station, and a receiving station which receives and processes the transmitted optical signal, and a plurality of repeater stations are provided at some midpoints in the optical transmission line. The wavelength bands are C-band and L-band, respectively.

The WDM optical signal with the two wavelength bands which is made incident on the repeater station is made incident on a backward pumping part. The structure of the backward pumping part will be described later. The WDM optical signal with the two wavelength bands which is outputted from the backward pumping part is made incident on a WDM coupler and demultiplexed therein by each wavelength band. The demultiplexed WDM optical signal in the C-band is made incident on an optical amplifier in which the C-band can be amplified, for example, an erbium-doped optical fiber amplifier which is excited by pump lights with wavelengths of 1480 nm and 980 nm, and amplified therein. After the amplification, the WDM optical signal in the C-band is made incident on the WDM coupler.

Similarly, the demultiplexed WDM optical signal in the L-band is made incident on an optical amplifier in which the L-band can be amplified, for example, a gain shift erbium-doped optical fiber amplifier which is excited by the pump light with the wavelength of 1480 nm, and amplified therein. After the amplification, the WDM optical signal in the L-band is made incident on the WDM coupler.

The WDM optical signals in the respective bands which are made incident on the WDM coupler are multiplexed to become the WDM optical signal with the two wavelengths again. Then, the WDM optical signal with the two wavelength bands is sent out to the optical transmission line to be transmitted to the station on a subsequent stage.

In the above explanation, the WDM optical signal with the two wavelength bands is subjected to centralized amplification in the repeater station, but an OADM which branches/inserts/transmits the optical signal from/to/through the WDM optical signal may be provided in the repeater station, as explained in the second embodiment.

Next, the structure of the backward pumping part will be explained. FIG. 17 shows the structure of the backward pumping part according to the fourth embodiment.

In FIG. 17, the WDM optical signal with the two wavelength bands which is made incident on the backward pumping part is made incident on a coupler 211 through a connector 151, a WDM coupler 208 and a coupler 153.

The WDM optical signal with the two wavelength bands which is made incident on the coupler 211 is divided into two. One of the divided WDM optical signals with the two wavelength bands is outputted from the backward pumping part to the aforesaid WDM coupler, and the other is made incident on an OSA 212.

In the OSA 212, a spectrum of the WDM optical signal with the two wavelength bands, that is, a wavelength and optical power of the wavelength is measured. The detection result is outputted to a CPU 214.

Meanwhile, a light source 209 emits pump laser lights with predetermined wavelengths, based on the signal from the CPU 214. The wavelengths of the pump laser lights are 1450 nm and 1485 nm so that the WDM optical signal with the respective wavelength bands can be subjected to Raman amplification thereby. The outputted pump laser light is made incident on a coupler 156. The pump laser light is divided in the coupler 156 and one of these is made incident on the WDM coupler 208 and the other is subjected to a photoelectric conversion in a PD 157 and its output is inputted into the CPU 214 through an A/D 161.

The WDM coupler 208 is an optical multiplexer/demultiplexer which multiplexes and demultiplexes the light with the two wavelength bands, and a wavelength which divides the wavelength bands (corresponding to a reject frequency) is designed between the shortest wavelength of the WDM optical signal with the two wavelengths and the wavelength of the pump laser light. For example, it is designed at 1505 nm, 1510 nm, 1515 nm and so on. The WDM coupler 208 outputs the pump laser light which is outputted from the coupler 156 to the optical transmission line through the connector 151.

Meanwhile, the pump laser light is reflected when the connector 151 is not connected to the optical transmission line and when there is a break in the optical transmission line.

The reflected pump laser light is made incident on a PD 155 through the WDM coupler 208 and the coupler 156. In the PD 155, the reflected pump laser light is subjected to the photoelectric conversion, and its output is inputted into the CPU 214 through an A/D 159.

The memory 213 is connected to the CPU 214, and an optical damage testing program, a drive current value and element temperature for outputting an excited laser of a level P1, a drive current value and element temperature for outputting an excited laser of a level P2, allowances of an output Outpls1 and an output Outpls2, a drive current value and element temperature by each pump laser light, predetermined values for detecting the disconnection of the optical transmission line 102 from the connectors 151, 154 and the like 110 are stored therein.

It should be mentioned that the level P1 and the level P2 are the totaled optical powers of the pump laser lights of 1450 nm and 1485 nm.

A control signal circuit 165 is connected to the CPU 214, and carries out bidirectional communications of a control signal with the other stations over a control line.

Operation and Effects of the Fourth Embodiment

The optical damage test and the monitoring of the disconnection of the optical transmission line from the connector 151 are the same with those in the third embodiment, and hence the explanations thereof will be omitted. In this optical communication system, the optical damage during its operation can be avoided by the optical damage test, and the operator can be kept from being exposed to the pump laser light by monitoring the disconnection of the connector.

Next, settings of the optical powers of the respective pump lights will be explained.

First, the transmitting station sends out the WDM optical signal with the two wavelength bands. Then, the CPU 214 in the backward pumping part controls the light source 209 so that the pump light on a short wavelength side, that is, the pump laser light with the wavelength of 1450 nm is outputted with the optical power which is set for the regular operation.

The CPU 214 calculates an optical power Pc per 1 ch. of the C-band and an optical power PL per 1 ch. of the L-band from the output from the OSA 212, respectively.

The respective ch. numbers of the C-band and the L-band which are made incident on its own station are obtained from the control signal through the control line. Especially, when the optical communication system includes the OADM, the ch. number may be increased/decreased, and hence it is necessary to give notice of the ch. numbers of the respective bands to the other stations by using the control line.

The CPU 214 calculates Psub by subtracting the Pc from the PL, and determines whether the Psub is under a predetermined allowance or not. This allowance is a value determining the extent of flatness of the WDM optical signal with the two wavelength bands which is subjected to the Raman amplification in the optical transmission line, and the flatness is ensured more when the value becomes smaller.

When the Psub is a negative value, it means PL<Pc, and hence the CPU 214 controls the light source 209 so that the optical power of the pump light on a long wavelength side, that is, the pump laser light with the wavelength of 1485 nm increases.

When the Psub is larger than the allowance, it means PL>Pc, and hence the CPU 214 controls the light source 209 so that the optical power of the pump laser light with the wavelength of 1485 nm decreases.

The CPU 214 calculates the Pc and the PL based on the output from the OSA 212, respectively, to calculate the Psub again. Then, similarly to the above, the CPU 214 compares the Psub with the allowance and adjusts the optical power of the pump laser light with the wavelength of 1485 nm so that the Psub is lowered than the allowance.

The CPU 214 takes in the optical power of the pump laser light with the wavelength of 1485 nm, when the Psub is under the allowance, from the output from the PD 157, and stores the output value as a target value into the memory 213.

During the operation of the optical communication system, the CPU 214 refers to the target value stored in the memory 213 and controls the light source 209 in order to keep the target value.

By controlling the optical power of the pump laser light with the respective wavelengths, the WDM optical signal with the two wavelength bands after the Raman amplification can be almost flattened in the optical communication system according to the fourth embodiment. In other words, a deviation of a gain between the wavelength bands can be almost eliminated within the range of the predetermined allowance.

As described above, after checking the connector disconnection and the adjustment of the optical powers of the respective pump lights, the optical communication system supplies the pump laser light to the optical transmission line 102 to start the Raman amplification.

Incidentally, in the fourth embodiment, the deviation of the gain between the wavelength bands is retarded by keeping the optical power of the pump light on the short wavelength side in a constant manner and adjusting the optical power of the pump light on the long wavelength side, but it is suitable to adjust the optical power of the pump light on the short wavelength side by keeping the optical power of the pump light on the long wavelength side in the constant manner.

Further, in the fourth embodiment, it is controlled by calculating the Psub, but is may be controlled by calculating PL/Pc by dividing the PL by Pc.

Next, another embodiment will be explained.

Structure of a Fifth Embodiment

The fifth embodiment relates to an optical communication system according to the present invention.

The optical communication system according to the fifth embodiment includes, similarly to the optical communication system shown in FIG. 5, a transmitting station in which a WDM optical signal with two wavelength bands is generated, an optical transmission line which transmits the optical signal sent out from the transmitting station, and a receiving station which receives and processes the transmitted optical signal, and a plurality of repeater stations are provided at some midpoints in the optical transmission line. The wavelength bands are C-band and L-band, respectively.

The WDM optical signal with the two wavelength bands which is made incident on the repeater station is made incident on a backward pumping part. The structure of the backward pumping part will be described later. The WDM optical signal with the two wavelength bands which is outputted from the backward pumping part is made incident on a WDM coupler and demultiplexed therein by each wavelength band. The demultiplexed WDM optical signal in the C-band is made incident on an erbium-doped optical fiber amplifier and amplified therein. After the amplification, the WDM optical signal in the C-band is made incident on the WDM coupler. Similarly, the demultiplexed WDM optical signal in the L-band is made incident on a gain shift erbium-doped optical fiber amplifier, and amplified therein. After the amplification, the WDM optical signal in the L-band is made incident on the WDM coupler.

The WDM optical signals in the respective bands which are made incident on the WDM coupler are multiplexed therein to become the WDM optical signal with the two wavelengths again. Then, the WDM optical signal with the two wavelength bands is sent out to the optical transmission line to be transmitted to the station on a subsequent stage.

In the above explanation, the WDM optical signal with the two wavelength bands is subjected to centralized amplification in the repeater station, but the optical signal may be branched/inserted/transmitted from/to/through the WDM optical signal in the repeater station, as explained in the second embodiment.

Next, the structure of the backward pumping part will be explained.

FIG. 18 shows the structure of the backward pumping part according to the fifth embodiment.

In FIG. 18, the WDM optical signal with the two wavelength bands which is made incident on the backward pumping part is made incident on a coupler 211 through a connector 151, a WDM coupler 208 and a coupler 153.

The WDM optical signal with the two wavelength bands which is made incident on the coupler 211 is divided into two. One of the divided WDM optical signals with the two wavelength bands is outputted from the backward pumping part to the aforesaid WDM coupler through a connector 154, and the other is made incident on a WDM coupler 252.

The WDM coupler 252 demultiplexes the WDM optical signal with the two wavelengths by each wavelength band, that is, the C-band and the L-band.

The demultiplexed WDM optical signal in the C-band is made incident on a PD 253 to be subjected to a photoelectric conversion. The output from the PD 253 is inputted into a CPU 258 through an A/D 255. Meanwhile, the demultiplexed WDM optical signal in the L-band is made incident on a PD 254 to be subjected to the photoelectric conversion. The output from the PD 254 is inputted into the CPU 258 through an A/D 256. Therefore, the PD 253 measures the optical power of the WDM optical signal in the C-band and the PD 256 measures the optical power of the WDM optical signal in the L-band.

Meanwhile, a light source 209 emits pump laser lights with predetermined wavelengths, based on the signal from the CPU 258. The wavelengths of the pump laser lights are 1450 nm and 1485 nm so that the WDM optical signal with the respective wavelength bands can be subjected to Raman amplification thereby. The outputted pump laser light is made incident on a coupler 156. The pump laser light is divided in the coupler 156 and one of these is made incident on the WDM coupler 208 and the other is subjected to a photoelectric conversion in a PD 157 and its output is made incident on the CPU 258 through an A/D 161. A wavelength which divides the wavelength bands (corresponding to a reject frequency) of the WDM coupler 208 is designed between the shortest wavelength of the WDM optical signal with the two wavelengths and the wavelength of the pump laser light. The WDM coupler 208 outputs the pump laser light which is outputted from the coupler 156 to the optical transmission line through the connector 151.

Meanwhile, the pump laser light is reflected when the connector 151 is not connected to the optical transmission line and when there is a break in the optical transmission line.

The reflected pump laser light is made incident on a PD 155 through the WDM coupler 208 and the coupler 156. In the PD 155, the reflected pump laser light is subjected to the photoelectric conversion, and its output is inputted into the CPU 258 through an A/D 159.

The memory 257 is connected to the CPU 258, and an optical damage testing program, a drive current value and element temperature for outputting an excited laser of a level P1, a drive current value and element temperature for outputting an excited laser of a level P2, allowances of an output Outpls1 and an output Outpls2, a drive current value and element temperature by each pump laser light, predetermined values for detecting the disconnection of the optical transmission line 102 from the connectors 151, 154 and the like are stored therein.

It should be mentioned that the level P1 and the level P2 are the totaled optical powers of the pump laser lights of 1450 nm and 1485 nm.

A control signal circuit 165 is connected to the CPU 258, and carries out bidirectional communications of a control signal with the other stations over a control line.

Operation and Effects of the Fifth Embodiment

The backward pumping part according to the fifth embodiment is different from the backward pumping part according to the fourth embodiment, in that the structure of the WDM coupler 252, the PDs 253, 254 and the A/Ds 255, 256 is used instead of the OSA 212.

Namely, the optical power per 1 ch. of the respective bands is calculated based on the output from the OSA 212 in the fourth embodiment, but it is calculated based on the outputs from the PD 253 and the PD 254 in the fifth embodiment, which is the only difference therebetween. The rest of the operation and the effects are the same with those of the fourth embodiment, and hence the explanations thereof are omitted.

As described above, since the WDM coupler 252 demultiplexes the WDM optical signal with the two wavelength bands by each band, the light which is received by the PD 253 is the WDM optical signal in the C-band and the light which is received by the PD 254 is the WDM optical signal in the L-band. Therefore, the CPU 258 can calculate Pc by dividing the output from the PD 253 by the ch. number of the C-band. Further, the CPU 258 can calculate PL by dividing the output from the PD 254 by the ch. number of the L-band.

Thus, in the optical communication system according to the fifth embodiment, the WDM optical signal with the two wavelength bands after the Raman amplification can be almost flattened by controlling the optical power of the pump laser light with the respective wavelengths.

Next, another embodiment will be explained.

Structure of a Sixth Embodiment

The sixth embodiment relates to an optical communication system according to the present invention.

In the sixth embodiment, a forward pumping is performed, and hence it is different from the fourth and the fifth embodiments in which the backward pumping is performed.

FIG. 19 shows the structure of the optical communication system according to the sixth embodiment.

In FIG. 19, the optical communication system is structured by including a transmitting station 301, a optical transmission line 302 which transmits optical signals with a plurality of wavelength bands sent out from the transmitting station 301, a receiving station 13 which receives the optical signals outputted from the optical transmission line 302, and a repeater station 304 which is provided at one point or more in the optical transmission line 302.

In a C-band signal generating part 311-$c$ in the transmitting station 301, a WDM optical signal in the C-band is generated, and the WDM optical signal in the C-band is outputted to a WDM coupler 312. Similarly, in an L-band signal generating part 311-L in the transmitting station 301, a WDM optical signal in the L-band is generated, and the WDM optical signal in the L-band is outputted to the WDM coupler 312.

The C-band signal generating part 311-$c$ and the L-band signal generating part 311-L like the above can be structured by including, for example, the OSs 81, 82, the WDM couplers 83, 84, and the optical amplifiers 87, 86 as shown in FIG. 6.

The WDM optical signals in the respective bands are multiplexed in the WDM coupler 312 to become the WDM optical signal with the two wavelength bands. The WDM optical signal with the two wavelength bands is made incident on a forward pumping part 314-1 from which pump laser light is supplied, and sent out to an optical transmission line 302-1 with the pump laser light. The WDM optical signal with the two wavelength bands transmits through the optical transmission line 301 -1 while being subjected to the Raman amplification, and it is made incident on a band detecting part 315-1 in the repeater station 304-1.

The band detecting part 315-1 detects the optical powers of the optical signals by each band, which are amplified by the pump laser light. Then, the band detecting part 315-1 sends its detection result to the forward pumping part 314-1.

The structures of the forward pumping part 314-1 and the band detecting part 315-1 will be described later.

The WDM optical signal with the two wavelength bands which is outputted from the band detecting part 315-1 is made incident on a WDM coupler 316-1 and demultiplexed by each wavelength band. The demultiplexed WDM optical signals are respectively made incident on optical amplifiers 317-$c$1, 317-L1, and amplified therein. After the amplification, the respective WDM optical signals are made incident on a WDM coupler 318-1, and multiplexed therein to become the WDM optical signal with the two wavelength bands again. The WDM optical signal with the two wavelength bands is sent out through a forward pumping part 314-2 to an optical transmission line 302-2 to be sent out to a repeater station 304-2 on a subsequent stage.

Similarly to the above, the WDM optical signal with the two wavelength bands is repeated through multiple stages while being processed in the repeater station 304 to be made incident on a band detecting part 315-$q$ in the receiving station 303.

The WDM optical signal with the two wavelength bands which is outputted from the band detecting part 315-$q$ is made incident on a WDM coupler 321 to be demultiplexed by each band. The WDM optical signals which are demultiplexed by the each band are respectively received and processed in a C-band signal receiving part 322-c and an L-band signal receiving part 322-L.

Next, the structures of the forward pumping part 314 and the band detecting part 315 will be explained.

FIG. 20 shows the structure of the forward pumping part according to the sixth embodiment.

FIG. 21 shows the structure of the band detecting part according to the sixth embodiment.

In FIG. 20, the structure of the forward pumping part 314 is the same with that of the forward pumping part 114 shown in FIG. 11, except that a WDM coupler 331 is used instead of the WDM coupler 133, a light source 332 is used instead of the light source 143, a memory 333 is used instead of the memory 145, and a CPU 334 is used instead of the CPU 146, and hence the explanation thereof is omitted.

Three-wave laser light with the different wavelengths from each other can be oscillated by the light source 332, and predetermined laser light with two wavelengths is outputted out of these, based on the signal from the CPU 334. This laser light is the pump laser light, and the WDM optical signal in the C-band and the WDM optical signal in the L-band are subjected to the Raman amplification in the optical transmission line 302 thereby.

A wavelength which divides the wavelength bands (corresponding to a reject frequency) of the WDM coupler 331 is designed between the wavelength band of the WDM optical signal with the two wavelengths and the wavelength of the pump laser light which can be outputted from the light source 332. For example, when the pump laser light with the wavelengths 1440 nm, 1450 nm and 1485 nm can be outputted by the light source 332, the wavelength is set between the wavelengths 1485 nm and 1530 nm which is the shortest wavelength of the C-band.

The memory 333 is connected to the CPU 334, and an optical damage testing program, a drive current value and element temperature for outputting an excited laser of a level P1, a drive current value and element temperature for outputting an excited laser of a level P2, allowances of an output Outpls1 and an output Outpls2, a drive current value and element temperature by each pump laser light, predetermined values for detecting the disconnection of the optical transmission line from connectors 131, 134 and the like are stored therein.

It should be mentioned that the level P1 and the level P2 are the totaled optical powers of the pump laser lights of 1450 nm and 1485 nm. Meanwhile, in FIG. 21, the band detecting part 315 is structured by including connectors 351, 353, a coupler 352, a WDM coupler 354, PDs 355, 356, A/Ds 357, 358, a CPU 359 and a control signal circuit 360.

The WDM optical signal which is made incident on the band detecting part 315 is outputted from the connector 353 through the connector 351 and the coupler 352. The coupler 352 distributes a part of the WDM optical signal with the two wavelength bands to the WDM coupler 354. The WDM coupler 354 demultiplexes the WDM optical signal with the two wavelength bands by each wavelength band, that is, the C-band and the L-band.

The demultiplexed WDM optical signal in the C-band is made incident on the PD 355 to be subjected to a photoelectric conversion, and its output is inputted into the CPU 359 through the A/D 357. Meanwhile, the demultiplexed WDM optical signal in the L-band is made incident on the PD 356 to be subjected to the photoelectric conversion, and its output is inputted into the CPU 359 through the A/D 358. Therefore, the PD 355 measures the optical power of the WDM optical signal in the C-band and the PD 356 measures the optical power of the WDM optical signal in the L-band.

The control signal circuit 360 is connected to the CPU 359, and carries out bidirectional communications of a control signal with the other stations over a control line.

Operation and Effects of the Sixth Embodiment

In the optical communication system like this, since the WDM coupler 352 demultiplexes the WDM optical signal with the two wavelength bands by each band, the light which is received by the PD 355 is the WDM optical signal in the C-band and the light which is received by the PD 356 is the WDM optical signal in the L-band. Therefore, the CPU 359 can calculate Pc by dividing the output from the PD 355 by the ch. number of the C-band. Further, the CPU 359 can calculate PL by dividing the output from the PD 356 by the ch. number of the L-band.

The CPU 359 transmits the Pc and the PL into the CPU 334 in the forward pumping part 314 through the control signal circuit 360, the control line and the control signal circuit 147.

Incidentally, without the calculation of the Pc and the PL, the optical powers of the WDM optical signals in the respective bands are transmitted to the CPU 334 as they are, so that the CPU 334 calculates the Pc and the PL Thus, similarly to the fourth and the fifth embodiments, the CPU 334 controls the optical power of the pump laser light with the respective wavelengths which is outputted from the light source 332, whereby the WDM optical signal with the two wavelength bands after the Raman amplification can be almost flattened.

Incidentally, in the fourth and the fifth embodiments, the pump light outputted from the forward pumping part and the backward pumping part may not be attenuated enough in the optical transmission line. In such cases, optical components such as an optical amplifier may malfunction concerning a gain, an output level, detection of the disconnection and the like.

Hence, in the case of the forward pumping with the residual pump light, a FIL which rejects the pump light and passes the WDM optical signal therethrough is connected to the optical transmission line in the repeater station on the subsequent stage. Meanwhile, in the case of the backward pumping, the FIL is connected to the optical transmission line in the repeater station on the preceding stage. The reject frequency of the FIL like the above is designed between the wavelength band of the WDM optical signal with the two wavelength bands and the pump laser light.

Moreover, in the fourth and the sixth embodiments, as explained in the third embodiment with reference to FIG. 15, it is suitable to detect the optical power of the residual pump light which is reflected by the FIL and use it for the detection of the presence or absence of the pump light and the adjustment of the optical power of the pump light. Since the pump laser lights which correspond to the wavelength bands in terms of number are included in the residual pump light, the detecting part of the optical power of the residual pump light is structured to demultiplex the residual pump light which is reflected by the FIL respectively in the WDM coupler and to receive these in the respective PDs.

Next, the preferred light source according to the present invention will be explained.

FIRST STRUCTURAL EXAMPLE

Figure 22:
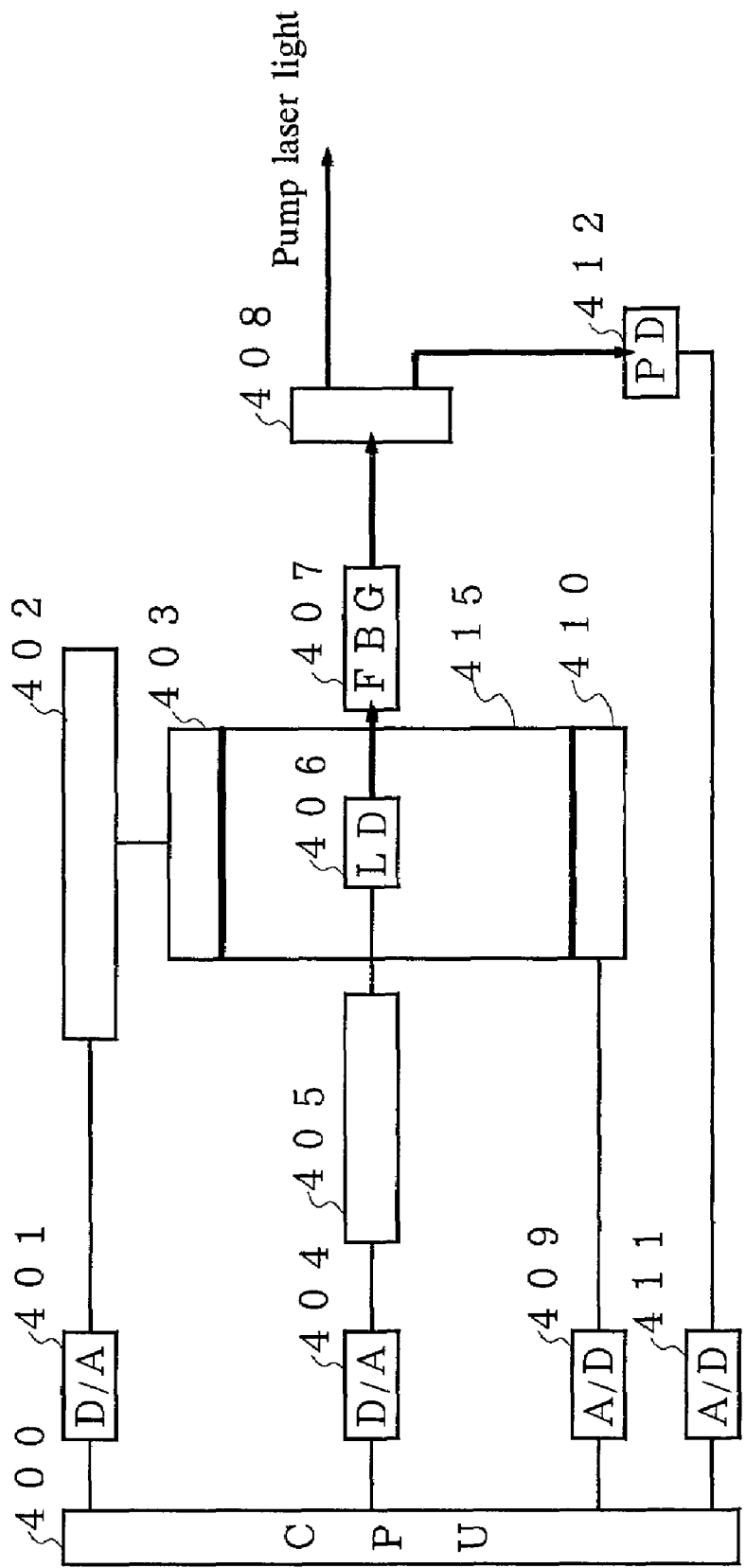

FIG. 22 shows the first structural example of the light source.

As shown in FIG. 22, in the first structural example of the light source, pump laser light by which the light being propagated through an optical transmission line is subjected to Raman amplification is oscillated by an LD 406 and outputted through a fiber Bragg reflection grating (hereinafter abbreviated to "FBG") 407 and a coupler 408.

A reflected center wavelength of the FBG 407 is set to a wavelength to be oscillated by the LD 406, and a reflection factor thereof is set less than 10 percent. Oscillation wavelength of the LD 406 is fixed by providing the FBG 407.

A drive current of the LD 406 is supplied from an LD drive circuit 405, which is controlled by a CPU 400 through a digital/analog converter (hereinafter abbreviated to "D/A") 404.

The CPU 400 controls element temperature of the LD 406 by controlling a drive current of a temperature adjuster 403 based on an output from a temperature detector 410. The temperature detector 410 is a temperature-measuring element such as a thermistor and a thermocouple, which is provided to closely contact with a base substrate 415, and its output is outputted into the CPU 400 through the A/D 409. The temperature detector 403 is a heat source such as a peltier element, which is provided to closely contact with the base substrate 415. Its drive current is supplied from a temperature adjuster drive circuit 402 through the D/A 401, which is controlled by the CPU 400.

A part of the pump laser light is made incident on a PD 412 by the coupler 408. The part of the pump laser light is subjected to a photoelectric conversion by the PD 412, and its output is inputted into the CPU 400 through an A/D 411. The CPU 400 detects the presence or absence of the pump laser light based on the output from the PD 412, and adjusts the output from the LD 406.

This kind of the light source according to the first structural example preferably outputs the pump laser light with one predetermined wavelength, and hence it can be applied to the light source of the first embodiment. Further, by preparing a plurality of the light sources like this, it can be applied to the light sources of the second, the fourth and the sixth embodiments. Incidentally, in such cases, the CPU 400 in FIG. 22 corresponds to the CPUs 214, 258, 334 in the respective embodiments. A control program, a set value and so on of the CPU 400 are stored in the memory in the respective embodiments.

SECOND STRUCTURAL EXAMPLE

FIG. 23 shows the second structural example of the light source.

As shown in FIG. 23, in the second structural example of the light source, pump laser light by which the light being propagated through an optical transmission line is subjected to Raman amplification is oscillated by a tunable laser diode (hereinafter abbreviated to "t-LD") 421 and outputted through a coupler 422, an isolator (hereinafter abbreviated to "ISO") 423 and a coupler 408.

The t-LD 421 is a laser element which can change its oscillation wavelength by changing its drive current and element temperature. For example, there are a wavelength variable distributed reflection type laser diode, a wavelength variable distributed feedback type laser diode, a multiple quantum well laser diode and the like. A drive current of the t-LD 421 is supplied from an LD drive circuit 430, which is controlled by a CPU 431 through a D/A 404.

The CPU 431 controls element temperature of the t-LD 421 by controlling a drive current of a temperature adjuster 403 based on an output from a temperature detector 410. The temperature detector 410 which is a temperature-measuring element is provided to closely contact with a base substrate 432, and its output is outputted into the CPU 431 through an A/D 409. The temperature detector 410 as a heat source is provided to closely contact with the base substrate 432. Its drive current is supplied from a temperature adjuster drive circuit 402 through a D/A 401, which is controlled by the CPU 431.

The coupler 422 distributes a part of the laser light which is outputted from the t-LD 421 to a Fabry-Perot etalon filter (hereinafter abbreviated to "ET filter") 425 and a PD 427. In the PD 427, the received laser light is subjected to a photoelectric conversion to a current corresponding to the optical power thereof, and its output is inputted into the CPU 431 through an A/D 429. The laser light which is outputted from the ET filter is subjected to the photoelectric conversion in a PD 426, and its output is inputted into the CPU 431 through the A/D 429.

Half a FSR (free spectral range) of the ET filter is set to be longer than an interval between the shortest oscillation wavelength and the longest oscillation wavelength of the t-LD 421. Further, light transmittance is allocated by each of a plurality of the wavelengths to be oscillated. Namely, target values corresponding to the respective wavelengths are disposed at shoulders of the light transmittance (curve between the two extremal values).

The CPU 431 measures the light transmittance of the ET filter based on the outputs from the PD 426 and the PD 427, and controls the element temperature of the t-LD 421 so that the light transmittance corresponding to a predetermined wavelength has the measured value. Thus, the oscillation wavelength of the t-LD 421 is controlled to the predetermined wavelength.

The ISO 423 is an optical component which passes through the light in only one direction, and hence it prevents the light which is reflected by, for example, a connecting part of the respective optical components in the system, from being propagated to the end, and particularly, it eliminates instability of the t-LD 421 because of the reflected light. The CPU 431 detects the presence or absence of the pump laser light and adjusts the output from the t-LD 421 by detecting a part of the pump laser light which is distributed by the coupler 408 in the PD 412 and an A/D 411,.

The pump laser light with the plurality of the wavelength can be stably outputted by this kind of the light source according to the second structural example, and hence it can be applied to the light source of the first and the third embodiments. Further, by preparing a plurality of the light sources like this, it can be applied to the light sources of the second, the fourth and the sixth embodiments. Incidentally, in such cases, the CPU 431 in FIG. 23 corresponds to the CPUs 146, 164, 214, 258,334 in the respective embodiments. A control program, a set value and so on of the CPU 431 are stored in the memory in the respective embodiments.

THIRD STRUCTURAL EXAMPLE

FIG. 24 shows the third structural example of the light source.

As shown in FIG. 24, in the third structural example of the light source, pump laser light by which the light being propagated through an optical transmission line is subjected to Raman amplification is outputted by an LD array part 440 and outputted through a laser diode amplifier (hereinafter abbreviated to "SOA") 443, an ISO 423 and a coupler 408.

The LD array part 440 is structured by including eight LDs 441 with different oscillation wavelengths from each other and a WDM coupler 442, and laser lights outputted from the respective LDs 441 are multiplexed in the WDM coupler 442 and outputted as an output from the LD array part 440. A drive current of the LD array part 440 is supplied from an LD drive circuit 445, and which LD 441 is to be supplied with the drive current is controlled by a CPU 448 through a D/A 404. Therefore, the laser light with one wavelength or the laser light with a plurality of the wavelengths can be outputted from the LD array part 440, based on the control by the CPU 448.

Incidentally, in this structural example, the explanation is made about the eight wavelengths, but any number is suitable.

The CPU 448 controls temperature of the LD array part 440 by controlling a drive current of a temperature adjuster 403 based on an output from a temperature detector 410. The temperature detector 410 which is a temperature-measuring element is provided to closely contact with a base substrate 449, and its output is outputted into the CPU 448 through an A/D 409. The temperature detector 403 which is a heat source is provided to closely contact with the base substrate 449. Its drive current is supplied from a temperature adjuster drive circuit 402 which is controlled by the CPU 448 through a D/A 401.

In the SOA 443, the laser light which is outputted from the LD array part 440 is amplified to a predetermined optical power. Its drive current is supplied from an SOA drive circuit 446 which is controlled by the CPU 448 through a D/A 447.

The CPU 448 detects the presence or absence of the pump laser light and adjusts a gain of the SOA 443 by detecting a part of the pump laser light which is distributed by the coupler 408 in a PD 412 and an A/D 411.

The pump laser light with one wavelength or the laser light including the plurality of the wavelengths can be outputted by this kind of the light source according to the third structural example, and hence it can be applied to the light source of the first and the sixth embodiments. Incidentally, in such cases, the CPU 448 in FIG. 24 corresponds to CPUs 146, 164, 214, 258, 334 in the respective embodiments. A control program, a set value and so on of the CPU 448 are stored in the memory in the respective embodiments.

It should be noted that, as shown in the broken lines in FIG. 11, FIG. 12, FIG. 17, FIG. 18, FIG. 20 and FIG. 21, it is suitable to separate each of the forward pumping part, the backward pumping part and the band detecting part into a first unit which is integrated to the optical transmission line and a second unit from which the pump light is supplied. For example, the forward pumping part 114 is divided so that the first unit including the connectors 131, 134, the couplers 132, 135, 138, the WDM coupler 133 and the PDs 135, 136, 137, 139 and the second unit including the A/Ds 140, 141, 142, 144, the light source 143, the memory 145, the CPU 146 and the control signal circuit 147 are separated. Thus, by allowing these to be separated, the unit for performing the Raman amplification can be added to the optical communication system as necessary, after the installation thereof.

The invention is not limited to the above embodiments and various modifications may be made without departing from the spirit and the scope of the invention. Any improvement may be made in part or all of the components.

What is claimed is:

1. An optical communication system comprising:
   a transmitting station;
   an optical transmission line for transmitting a wavelength division multiplexed (WDM) optical signal sent from said transmitting station;
   a receiving station for receiving said optical signal outputted from said optical transmission line;
   a repeater station provided in said optical transmission line between said transmitting station and said receiving station;
   a first pump light source, located in one of said transmitting station, said receiving station, and said repeater station, supplying pump light at a first wavelength to said optical transmission line;
   a second pump light source, located in a different one of said transmitting station, said receiving station and said repeater station, supplying pump light at second wavelength, different from the first wavelength, to said optical transmission line, wherein the pump light at the first wavelength and the pump light at the second wavelength cause Raman amplification of said optical signal to occur in different spans of said optical transmission line, and thereby cause the optical signal to be amplified by a combined Raman amplification as the optical signal travels through the different spans, the first and second wavelengths being selected to reduce gain tilt of the combined Raman amplification and thereby provide a substantially flat gain over wavelengths of the optical signal; and
   a controller centrally controlling settings of the first and second wavelengths through communication lines to the first and second pump light sources, to reduce the gain tilt, wherein the controller controls the setting of the first and second wavelengths in a repeating, sequential order.

2. The optical communication system according to claim 1, wherein
   said optical transmission line has a Raman gain as a function of wavelength in which an interval between a minimum value and a maximum value of a wavelength of said pump light coincides with a width of an amplifying wavelength band
   when a maximum value first appeared after a Raman gain generated by said pump light starts showing coincides with a center wavelength of the amplifying wavelength band.

3. The optical communication system according to claim 1, wherein:
   said second wavelength is set so that a maximum value first appeared after a Raman gain generated by said pump light at said second wavelength starts showing substantially coincides with
   a local minimum value first appeared after a Raman gain generated by said pump light at said first wavelength starts showing.

4. The optical communication system according to claim 1, further comprising:
   a shielding part provided in a station opposing said one or said different one of said transmitting station, said receiving station and said repeater station to shield said opposing station from residual pump light provided by said one or said different one of said transmitting station, said receiving station and said repeater station.

5. The optical communication system according to claim 1, further comprising:

a residual light detector, provided in a station opposing said one or said different one of said transmitting station, said receiving station and said repeater station, detecting optical power of residual pump light supplied by the pump light source in said one or said different one of said transmitting station, said receiving station and said repeater station;

an adjustor, provided in said one or said different one of said transmitting station, said receiving station and said repeater station, adjusting optical power of said pump light provided by said one or said different one of said transmitting station, said receiving station and said repeater station so that a detection result from said residual light detector falls within a predetermined fixed range; and a detection result transmitter, provided in a same station as said residual light detector, transmitting said detection result from said residual light detector to said adjustor.

6. The optical communication system according to claim 1, further comprising:

a residual light detector, provided in a station opposing said one or said different one of said transmitting station, said receiving station and said repeater station, detecting optical power of residual pump light of the pump light provided by said one or said different one of said transmitting station, said receiving station and said repeater station;

a stopper, provided in said one or said different one of said transmitting station, said receiving station and said repeater station, stopping supply of the pump light provided by said one or said different one of said transmitting station, said receiving station and said repeater station when a detection result from said residual light detector is equal to or lower than a predetermined value; and a detection result transmitter, provided in a same station as said residual light detector, transmitting said detection result from said residual light detector to said stopper.

7. The optical communication system according to claim 1, further comprising:

an optical signal detector provided in said one or said different one of said transmitting station, said receiving station and said repeater station, detecting optical power of said optical signal; and a stopper stopping supply of said pump light provided by said one or said different one of said transmitting station, said receiving station and said repeater station when a detection result from said optical signal detector is outside a predetermined fixed range.

8. The optical communication system according to claim 1, further comprising:

a reflected light detector provided in said one or said different one of said transmitting station, said receiving station and said repeater station, detecting optical power of reflected pump light of said pump light provided by said one or said different one of said transmitting station, said receiving station and said repeater station; and a stopper stopping supply of said pump light provided by said one or said different one of said transmitting station, said receiving station and said repeater station when a detection result from said reflected light detector is equal to or higher than a predetermined value.

9. The optical communication system according to claim 8, further comprising superimposing means for superimposing a low frequency on said pump light provided by said one or said different one of said transmitting station, said receiving station and said repeater station, and wherein said stopper detects said low frequency to verify said reflected pump light.

10. The optical communication system according to claim 1, further comprising:

a detector provided in said one or said different one of said transmitting station, said receiving station and said repeater station, detecting optical power of said optical signal amplified by said pump light provided by said one or said different one of said transmitting station, said receiving station and said repeater station; and a stopper provided in said one or said different one of said transmitting station, said receiving station and said repeater station, stopping supply of said pump light provided by said one or said different one of said transmitting station, said receiving station and said repeater station when a comparison result between first and second detection results is within a predetermined range, the first detection result being obtained by said detector when pump light having a first optical power is supplied by the pump light source in said one or said different one of said transmitting station, said receiving station and said repeater station, the second detection result being obtained by said detector when a pump light having a second optical power larger than said first optical power is supplied by the pump light source in said one or said different one of said transmitting station, said receiving station and said repeater station.

11. An optical communication system comprising:

a transmitting station;

an optical transmission line for transmitting an optical signal sent from said transmitting station;

a receiving station for receiving said optical signal outputted from said optical transmission line;

a repeater station provided in said optical transmission line between said transmitting station and said receiving station;

a first pump light source, located in one of said transmitting station, said receiving station, and said repeater station, supplying pump light at a first wavelength to said optical transmission line, and a second pump light source, located in a different one of said transmitting station, said receiving station and said repeater station, supplying pump light at a second wavelength, different from the first wavelength, to said optical transmission line, wherein the pump light at the first wavelength and the pump light at the second wavelength cause Raman amplification of said optical signal to occur in different spans of said optical transmission line, and thereby cause the optical signal to be amplified by a combined Raman amplification as the optical signal travels through the different spans, the first and second wavelengths being selected to reduce gain tilt of the combined Raman amplification;

a detector, provided in said one or said different one of said transmitting station, said receiving station and said repeater station, said detector detecting optical power of said optical signal Raman amplified by the pump light supplied by the pump light source located in said one or said different one of said transmitting station, said receiving station and said repeater station; and a stopper, provided in said one or said different one of said transmitting station, said receiving station and said repeater station, stopping supply of the pump light supplied by the pump light source located in said one or said different one of said transmitting station, said receiving station and said repeater station, when a comparison result between first and second detection results is within a predetermined range, the first detection result being obtained by said detector when the pump light supplied by the pump light source located in said one or said different one of said transmitting station, said receiving station and said repeater station has a first optical power, the second detection result being obtained by said detector when the pump light supplied by the pump light source located in said one or said different one of said transmitting station, said receiving station and said repeater station has a second optical power larger than said first optical power.

12. The optical communication system according to claim 11, further comprising:
a controller centrally controlling settings of the first and second wavelengths through communication lines to the first and second pump light sources, to reduce the gain tilt.

13. An optical communication system comprising:
a transmitting station;
an optical transmission line for transmitting an optical signal which has first and second wavelength bands and is sent from said transmitting station;
a receiving station for receiving said optical signal outputted from said optical transmission line;
a repeater station provided in said optical transmission line between said transmitting station and said receiving station;
a first pump light source, located in one of said transmitting station, said receiving station, and said repeater station, supplying pump light at a first wavelength corresponding to the first wavelength band to said optical transmission line, so that Raman amplification of said optical signal occurs in the first wavelength band;
a second pump light source, located in a different one of said transmitting station, said receiving station and said repeater station, supplying pump light at a second wavelength corresponding to the second wavelength band to said optical transmission line, so that Raman amplification of said optical signal occurs in the second wavelength band;
a band detector detecting optical power of said optical signal amplified by said first and second pump lights in said first and second wavelength bands; and
a band adjustor adjusting optical powers of said first and second pump lights according to a detection result from said band detector so as to keep optical power detected in each of said first and second wavelength bands within a predetermined fixed range.

14. The optical communication system according to claim 13, wherein:
said first and second wavelength bands are C-band and L-band, respectively; and
said first and second pump lights are at wavelengths of 1440 nm and 1485 nm, respectively.

15. The optical communication system according to claim 13, wherein at least one of the first and second pump light sources is a laser light source which oscillates laser lights with wavelengths of 1440 nm, 1450 nm, and 1485 nm, the optical communication system further comprising
a controller controlling said pump light source to output laser light with the wavelength of 1450 nm when only said optical signal having C-band wavelengths is transmitted, laser light with the wavelength of 1485 nm when only said optical signal having L-band wavelengths is transmitted, and laser lights with the wavelengths of 1440 nm and 1485 nm when said optical signal having both C-band and the L-band wavelengths is transmitted.

16. The optical communication system according to claim 13, further comprising:
a shield provided in a station opposing said one or different one of said transmitting station, said receiving station and said repeater station to shield said opposing station from residual pump light provided by said one or said different one of said transmitting station, said receiving station and said repeater station.

17. The optical communication system according to claim 13, further comprising:
a residual light detector provided in a station opposing said one or different one of said transmitting station, said receiving station and said repeater station, detecting optical power of residual pump light from said one or different one of said transmitting station, said receiving station and said repeater station;
an adjustor provided in said one or different one of said transmitting station, said receiving station and said repeater station, adjusting optical power of pump light supplied by the pump light source in said one or different one of said transmitting station, said receiving station and said repeater station so that a detection result from said residual light detector falls within a predetermined fixed range; and
a detection result transmitter transmitting said detection result from said residual light detector to said adjustor.

18. The optical communication system according to claim 13, further comprising:
a residual light detector provided in a station opposing to said one or different one of said transmitting station, said receiving station and said repeater station, detecting optical power of residual pump light from said one or different one of said transmitting station, said receiving station and said repeater station;
a stopper stopping supply of pump light from said one or different one of said transmitting station, said receiving station and said repeater station when a detection result from said residual light detector is equal to or lower than a predetermined value; and
a detection result transmitter transmitting said detection result from said residual light detector to said stopper.

19. The optical communication system according to claim 13, further comprising:
an optical signal detector provided in said one or different one of said transmitting station, said receiving station and said repeater station, detecting optical power of said optical signal; and
a stopper stopping supply of pump light provided by the pump light source in said one or different one of said transmitting station, said receiving station and said repeater station when a detection result from said optical signal detector is outside a predetermined fixed range.

20. The optical communication system according to claim 13, further comprising:
a reflected light detector provided in said one or different one of said transmitting station, said receiving station and said repeater station, detecting optical power of reflected pump light; and
a stopper stopping supply of pump light from said one or different one of said transmitting station, said receiving station and said repeater station when a detection result from said reflected light detector is equal to or higher than a predetermined value.

21. A method comprising:

supplying a first pump light to an optical transmission line, the first pump light causing an optical signal having a first wavelength band traveling through the optical transmission line to be Raman amplified;

supplying a second pump light to the optical transmission line, the second pump light causing an optical signal having a second wavelength band traveling through the optical transmission line to be Raman amplified, the second wavelength band not overlapping with the first wavelength band;

detecting optical power of the Raman amplified optical signal having the first wavelength band;

detecting optical power of the Raman amplified optical signal having the second wavelength band; and maintaining deviation of Raman amplification gain between the first and second wavelength bands within a predetermined deviation range by adjusting a power level of the second pump light so that the detected optical powers both fall within a predetermined fixed range.

22. An optical communication system comprising:

a transmitting station;

an optical transmission line for transmitting an optical signal sent from said transmitting station a receiving station for receiving said optical signal outputted from said optical transmission line a repeater station provided in said optical transmission line between said transmitting station and said receiving station;

a first pump light source, located in one of said transmitting station, said receiving station, and said repeater station, supplying pump light at a first wavelength to said optical transmission line;

a second pump light source, located in a different one of said transmitting station, said receiving station and said repeater station, supplying pump light at second wavelength, different from the first wavelength, to said optical transmission line, wherein the pump light at the first wavelength and the pump light at the second wavelength cause Raman amplification of said optical signal to occur in different spans of said optical transmission line, and thereby cause the optical signal to be amplified by a combined Raman amplification as the optical signal travels through the different spans, the first and second wavelengths being selected to reduce gain tilt of the combined Raman amplification;

a residual light detector, provided in a station opposing said one or said different one of said transmitting station, said receiving station and said repeater station, detecting optical power of residual pump light supplied by the pump light source in said one or said different one of said transmitting station, said receiving station and said repeater station;

an adjustor, provided in said one or said different one of said transmitting station, said receiving station and said repeater station, adjusting optical power of said pump light provided by said one or said different one of said transmitting station, said receiving station and said repeater station so that a detection result from said residual light detector falls within a predetermined fixed range; and a detection result transmitter, provided in a same station as said residual light detector transmitting said detection result from said residual light detector to said adjustor.

23. An optical communication system comprising:

a transmitting station;

an optical transmission line for transmitting an optical signal sent from said transmitting station;

a receiving station for receiving said optical signal outputted from said optical transmission line;

a repeater station provided in said optical transmission line between said transmitting station and said receiving station;

a first pump light source, located in one of said transmitting station, said receiving station, and said repeater station, supplying pump light at a first wavelength to said optical transmission line;

a second pump light source, located in a different one of said transmitting station, said receiving station and said repeater station, supplying pump light at second wavelength, different from the first wavelength, to said optical transmission line, wherein the pump light at the first wavelength and the pump light at the second wavelength cause Raman amplification of said optical signal to occur in different spans of said optical transmission line, and thereby cause the optical signal to be amplified by a combined Raman amplification as the optical signal travels through the different spans, the first and second wavelengths being selected to reduce gain tilt of the combined Raman amplification;

a residual light detector, provided in a station opposing said one or said different one of said transmitting station, said receiving station and said repeater station, detecting optical power of residual pump light of the pump light provided by said one or said different one of said transmitting station, said receiving station and said repeater station;

a stopper, provided in said one or said different one of said transmitting station, said receiving station and said repeater station, stopping supply of the pump light provided by said one or said different one of said transmitting station, said receiving station and said repeater station when a detection result from said residual light detector is equal to or lower than a predetermined value; and a detection result transmitter, provided in a same station as said residual light detector transmitting said detection result from said residual light detector to said stopper.

24. An optical communication system comprising:

a transmitting station;

an optical transmission line for transmitting an optical signal sent from said transmitting station a receiving station for receiving said optical signal outputted from said optical transmission line;

a repeater station provided in said optical transmission line between said transmitting station and said receiving station;

a first pump light source, located in one of said transmitting station, said receiving station, and said repeater station, supplying pump light at a first wavelength to said optical transmission line;

a second pump light source, located in a different one of said transmitting station, said receiving station and said repeater station, supplying pump light at second wavelength, different from the first wavelength, to said optical transmission line, wherein the pump light at the first wavelength and the pump light at the second wavelength cause Raman amplification of said optical signal to occur in different spans of said optical transmission line, and thereby cause the optical signal to be amplified by a combined Raman amplification as the optical signal travels through the different spans, the first and second wavelengths being selected to reduce gain tilt of the combined Raman amplification;

an optical signal detector provided in said one or said different one of said transmitting station, said receiving station and said repeater station, detecting optical power of said optical signal; and a stopper stopping supply of said pump light provided by said one or said different one of said transmitting station, said receiving station and said repeater station when a detection result from said optical signal detector is outside a predetermined fixed range.

25. An optical communication system comprising:

a transmitting station;

an optical transmission line for transmitting an optical signal sent from said transmitting station a receiving station for receiving said optical signal outputted from said optical transmission line;

a repeater station provided in said optical transmission line between said transmitting station and said receiving station;

a first pump light source, located in one of said transmitting station, said receiving station, and said repeater station, supplying pump light at a first wavelength to said optical transmission line;

a second pump light source, located in a different one of said transmitting station, said receiving station and said repeater station, supplying pump light at second wavelength, different from the first wavelength, to said optical transmission line, wherein the pump light at the first wavelength and the pump light at the second wavelength cause Raman amplification of said optical signal to occur in different spans of said optical transmission line, and thereby cause the optical signal to be amplified by a combined Raman amplification as the optical signal travels through the different spans, the first and second wavelengths being selected to reduce gain tilt of the combined Raman amplification;

a reflected light detector provided in said one or said different one of said transmitting station, said receiving station and said repeater station, detecting optical power of reflected pump light of said pump light provided by said one or said different one of said transmitting station, said receiving station and said repeater station; and a stopper stopping supply of said pump light provided by said one or said different one of said transmitting station, said receiving station and said repeater station when a detection result from said reflected light detector is equal to or higher than a predetermined value.

26. The optical communication system according to claim 25, further comprising superimposing means for superimposing a low frequency on said pump light provided by said one or said different one of said transmitting station, said receiving station and said repeater station, and wherein said stopper detects said low frequency to verify said reflected pump light.

27. An optical communication system comprising:

a transmitting station;

an optical transmission line for transmitting an optical signal sent from said transmitting station a receiving station for receiving said optical signal outputted from said optical transmission line a repeater station provided in said optical transmission line between said transmitting station and said receiving station;

a first pump light source, located in one of said transmitting station, said receiving station, and said repeater station, supplying pump light at a first wavelength to said optical transmission line;

a second pump light source, located in a different one of said transmitting station, said receiving station and said repeater station, supplying pump light at second wavelength, different from the first wavelength, to said optical transmission line, wherein the pump light at the first wavelength and the pump light at the second wavelength cause Raman amplification of said optical signal to occur in different spans of said optical transmission line, and thereby cause the optical signal to be amplified by a combined Raman amplification as the optical signal travels through the different spans, the first and second wavelengths being selected to reduce gain tilt of the combined Raman amplification;

a detector provided in said one or said different one of said transmitting station, said receiving station and said repeater station, detecting optical power of said optical signal amplified by said pump light provided by said one or said different one of said transmitting station, said receiving station and said repeater station; and a stopper provided in said one or said different one of said transmitting station, said receiving station and said repeater station, stopping supply of said pump light provided by said one or said different one of said transmitting station, said receiving station and said repeater station when a comparison result between first and second detection results is within a predetermined range, the first detection result being obtained by said detector when pump light having a first optical power is supplied by the pump light source in said one or said different one of said transmitting station, said receiving station and said repeater station , the second detection result being obtained by said detector when a pump light having a second optical power larger than said first optical power is supplied by the pump light source in said one or said different one of said transmitting station, said receiving station and said repeater station.

* * * * *

UNITED STATES PATENT AND TRADEMARK OFFICE
CERTIFICATE OF CORRECTION

PATENT NO. : 7,233,742 B2 Page 1 of 1
APPLICATION NO. : 10/021079
DATED : June 19, 2007
INVENTOR(S) : Takeshi Hoshida et al.

It is certified that error appears in the above-identified patent and that said Letters Patent is hereby corrected as shown below:

Column 49, Line 27, after "station" insert --;--.

Column 49, Line 29, after "line" insert --;--.

Column 50, Line 2, after "detector" insert --,--.

Column 50, Line 47, after "detector" insert --,--.

Column 50, Line 53, after "station" insert --;--.

Column 51, Line 21, after "station" insert --;--.

Column 52, Line 9, after "station" insert --;--.

Column 52, Line 11, after "line" insert --;--.

Signed and Sealed this

Sixth Day of November, 2007

JON W. DUDAS
*Director of the United States Patent and Trademark Office*